United States Patent [19]
Kawashima et al.

[11] Patent Number: 6,079,862
[45] Date of Patent: Jun. 27, 2000

[54] AUTOMATIC TRACKING LIGHTING EQUIPMENT, LIGHTING CONTROLLER AND TRACKING APPARATUS

[75] Inventors: Toshikazu Kawashima, Shijonawate; Minoru Yoshida, Katano; Satoshi Furukawa, Hirakata; Kenichi Hagio, Katano, all of Japan

[73] Assignee: Matsushita Electric Works, Ltd., Osaka, Japan

[21] Appl. No.: 08/878,071

[22] Filed: Jun. 18, 1997

[30] Foreign Application Priority Data

| Feb. 22, 1996 | [JP] | Japan | 8-034770 |
| Jun. 19, 1996 | [JP] | Japan | 8-158639 |
| Jun. 19, 1996 | [JP] | Japan | 8-158640 |

[51] Int. Cl.$^7$ .............. G05B 19/18; H04N 7/18
[52] U.S. Cl. ............. 364/167.6; 700/57; 700/58; 700/59; 382/103; 382/181; 348/169
[58] Field of Search ................ 700/56, 57, 58, 700/59, 60, 83; 382/103, 181, 190; 348/125, 143, 155, 169, 170

[56] References Cited

U.S. PATENT DOCUMENTS

| 4,386,848 | 6/1983 | Clendenin et al. | 356/5 |
| 5,023,709 | 6/1991 | Kita et al. | 358/125 |
| 5,062,056 | 10/1991 | Lo et al. | 364/516 |
| 5,204,749 | 4/1993 | Toyama et al. | 358/227 |
| 5,434,617 | 7/1995 | Bianchi | 348/170 |
| 5,506,912 | 4/1996 | Nagasaki et al. | 382/103 |
| 5,739,857 | 4/1998 | Kaneda | 348/349 |

FOREIGN PATENT DOCUMENTS

| 64-33803 | 2/1989 | Japan . |
| 1296502 | 11/1989 | Japan . |
| 5-46041 | 7/1993 | Japan . |
| 6260002 | 9/1994 | Japan . |

OTHER PUBLICATIONS

Patent Abstracts of Japan vol. 18, No. 663 (M–1723), for JP–6–260002, to Kansei Corp., published Dec. 14, 1994.
Patent Abstracts of Japan vol. 97, No. 007, for JP–9–063314, to Matsushita Electric Works, Ltd., published Mar. 7, 1997.
An English Language Abstract of JP 6–260002.
An English Language Abstract of JP 1–296502.
An English Language Abstract of JP 64–33803.

*Primary Examiner*—Paul P. Gordon
*Attorney, Agent, or Firm*—Greenblum & Bernstein, P.L.C.

[57] ABSTRACT

Automatic tracking lighting equipment for automatically tracking a target to be illuminated. A spotlight is supported for pivoting in horizontal and vertical directions on a ceiling surface. A horizontal drive mechanism changes the horizontal angle of the spotlight and a vertical drive mechanism changes the vertical angle of the spotlight. A CCD camera picks up the image of a target area to be illuminated. An image recognition unit processes the image from the CCD camera to recognize the target to be illuminated and to specify its coordinates. A coordinate calculation unit calculates how far to move the spotlight based on a distance of the target to be illuminated. A movable control unit converts the output of the coordinate calculation unit into drive signals for the horizontal drive mechanism and for the vertical drive mechanism and outputs drive signals to pivot the spotlight in a desired direction.

29 Claims, 43 Drawing Sheets

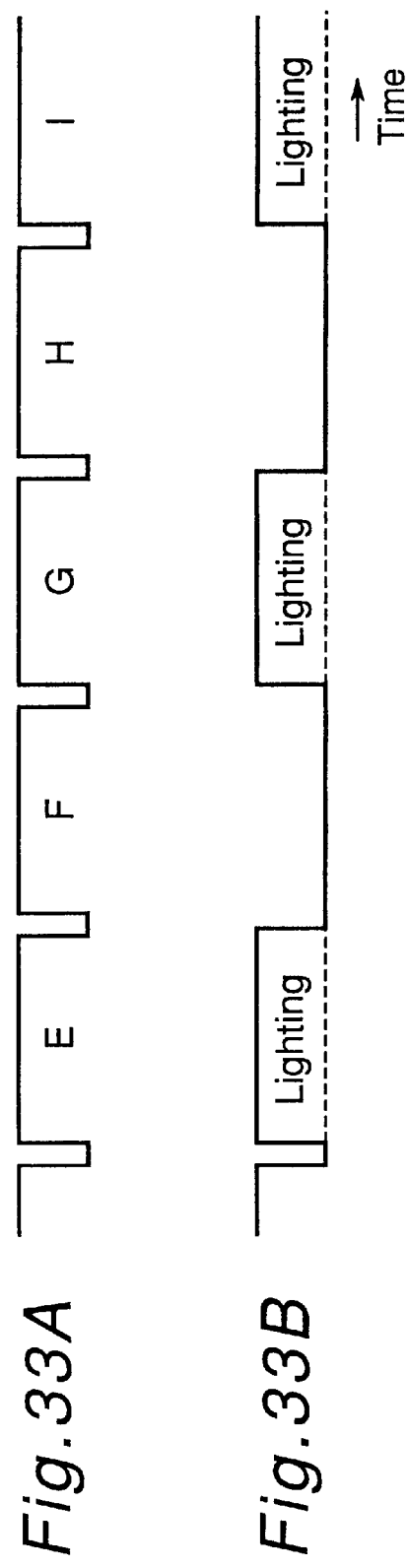

AUTOMATIC TRACKING LIGHTING EQUIPMENT, LIGHTING CONTROLLER AND TRACKING APPARATUS

BACKGROUND OF THE INVENTION

1. Field of the Invention

The present invention relates to automatic tracking lighting equipment, lighting controller and tracking apparatus, which can automatically track a performer or another object in a space and floodlight it in a site such as a banquet hall, a hall or a stage.

2. Description of the Prior Art

Conventionally, as automatic tracking lighting equipment for automatically tracking a moving target to be lighted such as a person and floodlighting it, for example, Japanese Patent Laid-Open Publication No. SHO 64-33803 discloses one constituted by making the person who is the target to be lighted carry a transmitter of a supersonic wave or a radio wave, providing about twenty receiver sensors on, for example, a ceiling surface of a lighting space having an area of 15 m×7.5 m, specifying the transmitter, i.e., the position of the person carrying the transmitter from a reception signal from the receiver sensor and making the lighting direction of a lighting fixture to automatically track the person.

In the automatic tracking lighting equipment having the above construction, in order to correctly specify the position of the transmitter, it has been required to provide a number of receivers on the ceiling surface of the lighting space and clarify a positional relation between the receivers in the lighting space, leading to the problem that an inferior workability results.

By the way, as is commonly known, the lighting controller is to control the direction of a lighting fixture for floodlighting a person or another object moving on a stage and making the lighting position track the position of the person who is the target to be lighted with the movement of the person.

Among the conventional lighting controllers, there is a lighting controller having a constitution in which an operator is located in the vicinity of a space to be lighted (i.e., located in a position where the operator can get the direct view of at least the lighting position), operates the lighting with a remote controller or the like by getting the direct view of the space desired to be lighted and continues operating so that the target lighting position and the lighting position of the lighting fixture coincide with each other.

There is another lighting controller having a constitution in which a camera is fixed to the light body section of the lighting fixture so that the lighting direction of the lighting fixture and the image pickup direction of the camera are arranged in parallel to each other, and the operator continues operating so that the target lighting position and the lighting position of the lighting fixture coincide with each other not by getting the direct view of the space desired to be lighted but by viewing an image picked up by the camera by means of a touch panel or the like provided at the display device that is displaying the image.

There is a further lighting controller having a constitution in which a camera of which image pickup direction is fixed is placed in the vicinity of a lighting fixture, and when an operator inputs a target lighting position while viewing the image picked up by the camera, the lighting direction is moved from the current lighting position to a designated target lighting position.

However, in the lighting controller operated by a remote controller among the aforementioned lighting controllers, the operator must be located in the vicinity of the space desired to be lighted and the operator is required to continue operating while viewing the lighting position until the lighting position reaches the target lighting position. This arrangement has the problem that the operator is required to have a skill to a certain extent and labor and burden are imposed on the operator.

In the lighting controller having the constitution in which the camera is fixed to the light body section of the lighting fixture so that the lighting direction of the lighting fixture and the image pickup direction of the camera are arranged in parallel to each other, and the lighting direction is controlled based on the image picked up by the camera, the operator is not required to be located in the vicinity of the space desired to be lighted, however, the operator is required to continue operating until the lighting position reaches the target lighting position similarly to the above case. This arrangement has the problem that labor and burden are imposed on the operator.

In the lighting controller which controls the lighting direction by the image of the camera of which image pickup direction is fixed, the operator is not required to continue operating until the lighting position reaches the target lighting position once the target lighting position is inputted, however, the mounting positions of the spotlight, camera and so forth are required to be inputted before executing the control. Therefore, the mounting positions must be measured, and this causes the problem that a considerable labor is required for the initial setting.

By the way, in recent years, a tracking apparatus for tracking an object to be tracked is used for the uses of automatically picking up the image of a bride or another object by means of a TV camera and automatically floodlighting the object to be tracked according to the movement of the object in a banquet hall such as a wedding ceremony hall and a hotel. Tracking apparatuses of this kind have been roughly classified into two types of one which tracks an unspecified object to be tracked and the other one of which object to be tracked is predetermined.

The former is to preparatorily store the characteristics (e.g., color and shape) of the object to be tracked displayed on a screen which displays an image picked up by an image pickup means and detect a position in which the highest similarity to the aforementioned characteristics is achieved is detected from the images inputted successively. As a concrete method of this type, there is so-called the template matching. The template matching is to store image data of a region including an object to be tracked as a template, sort the successively inputted images into blocks having the same size as that of the template, calculate every pixel the absolute value of a difference between the template and each block, accumulate the absolute values and adopt the position of the block having the minimum cumulative value as the position of the object to be tracked.

The latter is to detect the position of an object to be tracked by detecting the marker of an infrared light transmitter, a color chart or a reflection tape etc. attached to the object to be tracked by using position detecting sensors, or by extracting them by so-called the binarizing process.

For example, Japanese Patent Laid-Open Publication No. HEI 6-260002 discloses a constitution which detects the position of an object to be tracked by receiving the infrared light from an infrared light transmitter carried with the object to be tracked by light receiving element of the position detecting sensor mounted to the body of the spotlight, and control the lighting derection of the spotlight.

Further, Japanese Patent Publication No. HEI 5 -46041 discloses a constitution which detects the position of an object to be tracked, after attaching a reflection marker such as reflection tape or the like to the object, by extracting high luminance points by binarizing the image from pickup means.

According to the prior art tracking apparatus utilizing the template matching, the difference between the values of pixels located at the relatively same coordinates of the template and the block is taken. Therefore, when the shape of the object to be tracked changes (e.g., when the object to be tracked is a human being), the cumulative value of the absolute values of the difference in the correct position disadvantageously increases, and this has sometimes led to a failure in tracking the object to be tracked. Furthermore, there has been the problem that a degraded tracking accuracy has resulted in an environment where a number of objects having a shape similar to that of the object to be tracked exist.

In order to solve these problems of template matching, a method for extracting color information of the object to be tracked and having, for example, a characteristic value as a histogram has been proposed. This method has the characteristic that the histogram does not depend on the shape, the characteristic that the color information has a relative tolerance to a change in lighting and so forth. However, the color information changes when the distance and angle between the object to be tracked and the light changes in the course of tracking, and therefore, the stored color information cannot be extracted, possibly leading to a difficulty in tracking.

On the other hand, the method of tracking by detecting the position of the marker has the characteristic that an output power can be increased when the infrared light transmitter is used as a marker because the infrared light is invisible to the human being and tracking can be stably executed when the infrared light can be stably received. However, there has been the problem that the marker is sometimes made invisible by the object to be tracked itself or another object, and a number of markers (infrared light transmitters) must be attached to the object to be tracked in order to prevent the occurrence of it. Furthermore, depending on the environment of use, it is sometimes the case where a light source having an infrared component such as distance measuring equipment or a halogen lamp of a camera exists other than the infrared light transmitter, when the infrared light from other than the infrared light transmitter is disadvantageously tracked, causing a failure in tracking the object to be tracked.

Also, when a reflection marker such as reflection tape or the like is employed, in case there exist a plurality of high luminance points in the lighting rigion by existence of another reflective object, the possibility of wrong recognition of the object to be tracked become higher, by using of the method which specifies the position of the object only by the binarizing data of luminance, and it causes lack of utility.

The present invention has been developed in view of the aforementioned problems and has an object to provide automatic tracking lighting equipment of which workability is improved.

Further, the present invention has been developed for improving the aforementioned problems and has another object to provide a lighting controller capable of fixing the target lighting position while viewing the lighting position on a display device without requiring the operator to be located in the vicinity of the lighting position and capable of moving the lighting position into the target lighting position by designating once the target lighting position, thereby lightening the burden on the operator, obviating the need for inputting the mounting positions of the lighting fixture, camera and so forth and requiring no substantial labor for the initial setting.

Furthermore, the present invention has been developed for the aforementioned reasons and has further object to provide a tracking apparatus capable of surely tracking the object to be tracked with high accuracy.

SUMMARY OF THE INVENTION

In order to achieve the aforementioned object, and to solve the aforementioned problems, the first aspect of the present invention comprises: a lighting means having a directivity; a drive means for changing a lighting direction of the lighting means; an image pickup means for picking up an image in a direction identical to the lighting direction while changing its image pickup direction together with the lighting direction; an image recognizing means for recognizing a target to be lighted from an image from the image pickup means and specifying coordinates of the target to be lighted; a calculating means for calculating a quantity of movement in the lighting direction from a quantity of movement of the target to be lighted in the image recognizing means; and a control means for controlling driving of the drive means based on a result of calculation of the calculating means. Therefore, this equipment can also cope with a target to be lighted having neither transmitter nor the like. Furthermore, there is no need to provide a number of receivers or the like on the ceiling surface, and therefore, the workability can be improved. Furthermore, in an initial setting stage, the lighting direction of the lighting means can be visually made to coincide with the coordinates of the target to be lighted of the image recognizing means.

Further, the second aspect of the present invention comprises: a lighting means having a directivity; a drive means for changing a lighting direction of the lighting means; an image pickup means provided in a lighting space so as to be able to pick up an image in the lighting space of the lighting means; an image recognizing means for recognizing a target to be lighted from an image from the image pickup means and specifying coordinates of the target to be lighted; a calculating means for calculating a quantity of movement in the lighting direction from coordinates of the target to be lighted in the image recognizing means and a positional relation between the lighting means and the image pickup means in the lighting space; and a control means for controlling driving of the drive means based on a result of calculation of the calculating means. Therefore, this equipment can also cope with, for example, a lighting fixture of which lighting direction is changed through reflection on a mirror, and it can control a plurality of lighting means.

Furthermore, the third aspect of the present invention comprises: a lighting means having a directivity; a first drive means for changing a lighting direction of the lighting means; an image pickup means provided in a lighting space so as to be able to pick up an image in the lighting space of the lighting means; a second drive means for changing an image pickup direction of the image pickup means; a storage means for storing the image pickup direction of the image pickup means; an image recognizing means for recognizing a target to be lighted from an image from the image pickup means and specifying coordinates of the target to be lighted; a second calculating means for calculating a quantity of movement of the second drive means from a quantity of movement of the target to be lighted in the image recognizing means; a first calculating means for calculating a quantity of movement in the lighting direction of the lighting means from a result of calculation of the second calculating means, a positional relation between the image pickup means and the lighting means in the lighting space and an image pickup direction of the image pickup means stored in the storage means; a first control means for controlling driving of the first drive means based on a result of calculation of the first calculating means; and a second control means for controlling driving of the second drive means based on a result of calculation of the second calculating means. Therefore, a lens having not so wide angle can be used for the image pickup means, thereby allowing even the image of a target to be lighted located far away to be clearly picked up and allowing image recognition to be easily executed.

Furthermore, the fourth aspect of the present invention, based on the third aspect of the present invention, comprises a plurality of the image pickup means, whereby the second calculating means calculates three-dimensional coordinates of the target to be lighted in the lighting space from image pickup directions of the plurality of the image pickup means. Therefore, the target to be lighted can be correctly captured even when the floor surface of the lighting space has an unevenness.

Also, in order to solve the aforementioned problems, according to the fifth aspect of the present invention, there is provided a lighting controller including: a lighting fixture for radiating light from a light source; a drive section for pivoting the lighting fixture around an axis; an image pickup means being pivotable around an axis, for picking up an image in an image pickup region and outputting an image; a display device for displaying the image; and an input device for designating a point on the display image displayed on the display device, the lighting controller comprising a pivoting quantity calculating section for calculating a quantity of pivoting of the lighting fixture for floodlighting the designated point from a relative distance between the position on the display image designated by the input device and the position of origin of the display image, whereby the drive section pivots the lighting fixture based on the quantity of pivoting.

Further, according to the sixth aspect of the present invention, there is provided a lighting controller including: a lighting fixture for radiating light from a light source; a drive section for pivoting the lighting fixture around a pan axis and a tilt axis; an image pickup means being pivotable around an axis, for picking up an image in an image pickup region and outputting an image; a display device for displaying the image; and an input device for designating a point on the display image displayed on the display device, the lighting controller comprising a pivoting quantity calculating section for calculating a quantity of pivoting around the pan axis of the lighting fixture for floodlighting the designated point from a relative distance in a horizontal direction between the position on the display image designated by the input device and the position of origin of the display image and for calculating a quantity of pivoting around the tilt axis of the lighting fixture for floodlighting the designated point from a relative distance in a vertical direction between the position on the display image designated by the input device and the position of origin of the display image, whereby the drive section pivots the lighting fixture based on the quantities of pivoting.

Furthermore, according to the seventh aspect of the present invention, said image pickup means is mounted to the lighting fixture parallel to an optical axis of light radiated from the lighting fixture, and pivots together with the lighting fixture.

Furthermore, according to the eighth aspect of the present invention, the pivoting quantity calculating section multiplies the relative distance between the position on the display image designated by the input device and the position of origin of the display image by a specified constant of proportionality so as to calculate a relative distance between both points in a projection plane formed in the image pickup means, thereby calculating a quantity of pivoting of the image pickup means from the relative distance in the projection plane and a focal distance of the image pickup means, and calculating a quantity of pivoting of the lighting fixture.

Furthermore, according to the ninth aspect of the present invention, a constant calculating section for calculating the constant of proportionality by pivoting the image pickup means by a specified quantity of pivoting based on a relative distance between the position of a specified point of the lighting space before pivoting on the display image and the position of the specified point after pivoting on the display image and the specified quantity of pivoting is provided.

Furthermore, according to the tenth aspect of the present invention, a focal distance changing means for changing the focal distance of the image pickup means is provided, and a plurality of constants of proportionality are held in correspondence with the focal distance to be changed.

Furthermore, according to the eleventh aspect of the present invention, the position of the specified point after the pivoting of the lighting space on the display image is inputted by an operator by means of the input device.

Furthermore, according to the twelfth aspect of the present invention, there are included: an image extracting means for extracting an image in a specified area including the position of the specified point before the pivoting of the lighting space on the display image from the display image; a searching means for searching an area approximate to the image in the specified area extracted from the display image after the pivoting; and a post-pivoting position calculating means for calculating the position of the specified point after the pivoting of the lighting space on the display image from the position of the searched area on the display image.

Also, in order to achieve the aforementioned object, according to the thirteenth aspect of the present invention, there is provided a tracking apparatus comprises: an image pickup means for picking up an image in a specified area; a marker detecting means for detecting a marker attached to an object to be tracked based on a first video signal from the image pickup means; a tracking object setting means for setting a region including the object to be tracked in a second video signal from the image pickup means as a tracking object region; a characteristic value storage means for storing a characteristic value of the tracking object region set by the tracking object setting means; an object extracting means for calculating a similarity with respect to the characteristic value of the object to be tracked stored in the characteristic value storage means from the second video signal from the image pickup means and obtaining a position in which the object to be tracked exists based on a result of calculation; and a position detecting means for detecting the position of the object to be tracked in the video signal inputted successively by using the marker detecting means and/or the object extracting means. The object to be tracked can be stably tracked even when the shape or color of it is changed in the case where the marker can be detected. In the case where the marker cannot be detected, the object to be tracked is tracked by utilizing the characteristic values of color, shape and the like of the object to be tracked. Therefore, the object to be tracked can be surely continuously tracked with high accuracy.

Further, according to the fourteenth aspect of the present invention, based on the thireenth aspect of the present invention, the marker is provided by an infrared light transmitter, and the infrared light transmitter transmits in synchronization with the video signal. With this arrangement, the marker can be stably extracted without being influenced by the infrared light from other than the infrared light transmitter, and therefore, the object to be tracked can be tracked with high accuracy.

Furthermore, according to the fifteenth aspect of the present invention, based on the thirteenth aspect of the present invention, the position detecting means uses the object extracting means when the marker detecting means cannot detect the marker. With this arrangement, the object extraction, which takes much time for processing, is not required to be executed when the marker is detected, and therefore, the position of the object to be tracked can be detected at high speed.

Furthermore, according to the sixteenth aspect of the present invention, based on the thirteenth aspect of the present invention, the position detecting means uses the object extracting means when the marker detecting means detects a plurality of proposed markers. With this arrangement, the object extraction, which takes much time for processing, is not required to be executed when only one marker is detected. Therefore, the position of the object to be tracked can be detected at high speed, and the tracking reliability can be improved by executing object extraction when a plurality of proposed markers exist.

Furthermore, according to the seventeenth aspect of the present invention, based on the thirteenth aspect of the present invention, the position detecting means obtains the position of the object to be tracked by using the position of a proposed marker detected by the marker detecting means and an output result of the object extracting means. Therefore, the tracking reliability can be improved.

Furthermore, according to the eighgteenth aspect of the present invention, based on the thirteenth aspect of the present invention, a characteristic value updating means for updating the characteristic value stored in the characteristic value storage means based on the position of the object to be tracked detected by the position detecting means is incorporated. Therefore, the tracking reliability can be improved.

Furthermore, according to the ninteenth aspect of the present invention, based on any of the thirteenth through eighteenth aspects of the present invention, an image pickup direction adjusting means for adjusting an image pickup direction of the image pickup means is incorporated, and the image pickup direction of the image pickup direction adjusting means is adjusted based on an output of the position detecting means. Therefore, the object to be tracked can be tracked in a wide range.

Furthermore, according to the twentyth aspect of the present invention, based on any of the thirteenth through ninteenth aspects of the present invention, lighting equipment which is installed in a place located apart from the image pickup means, has a directivity and is capable of changing its lighting direction and a lighting control means for controlling the lighting direction of the lighting equipment based on the position of the object to be tracked detected by the position detecting means so that the lighting equipment floodlights the object to be tracked are incorporated. Therefore, the object to be tracked can be tracked with high accuracy and the object to be tracked can be surely floodlighted.

BRIEF DESCRIPTION OF THE DRAWINGS

FIGS. 33A and 33B are explanatory views of the operation of the above embodiment;

DETAILED DESCRIPTION OF THE PREFERRED EMBODIMENTS

Preferred embodiments of the present invention will be described with reference to the drawings.

FIRST EMBODIMENT

Figure 1:
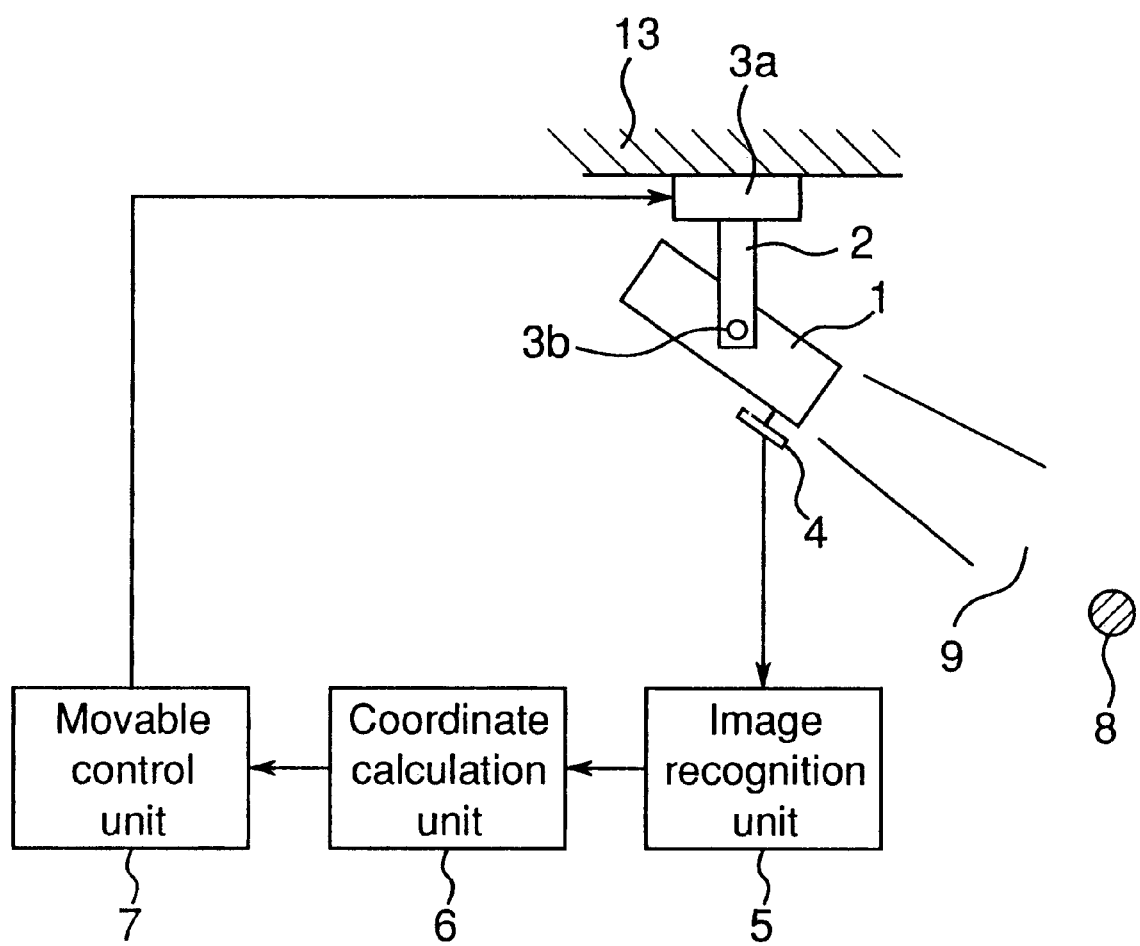
FIG. 1 is a schematic diagram showing the automatic tracking lighting equipment of the first embodiment.
Figure 2:
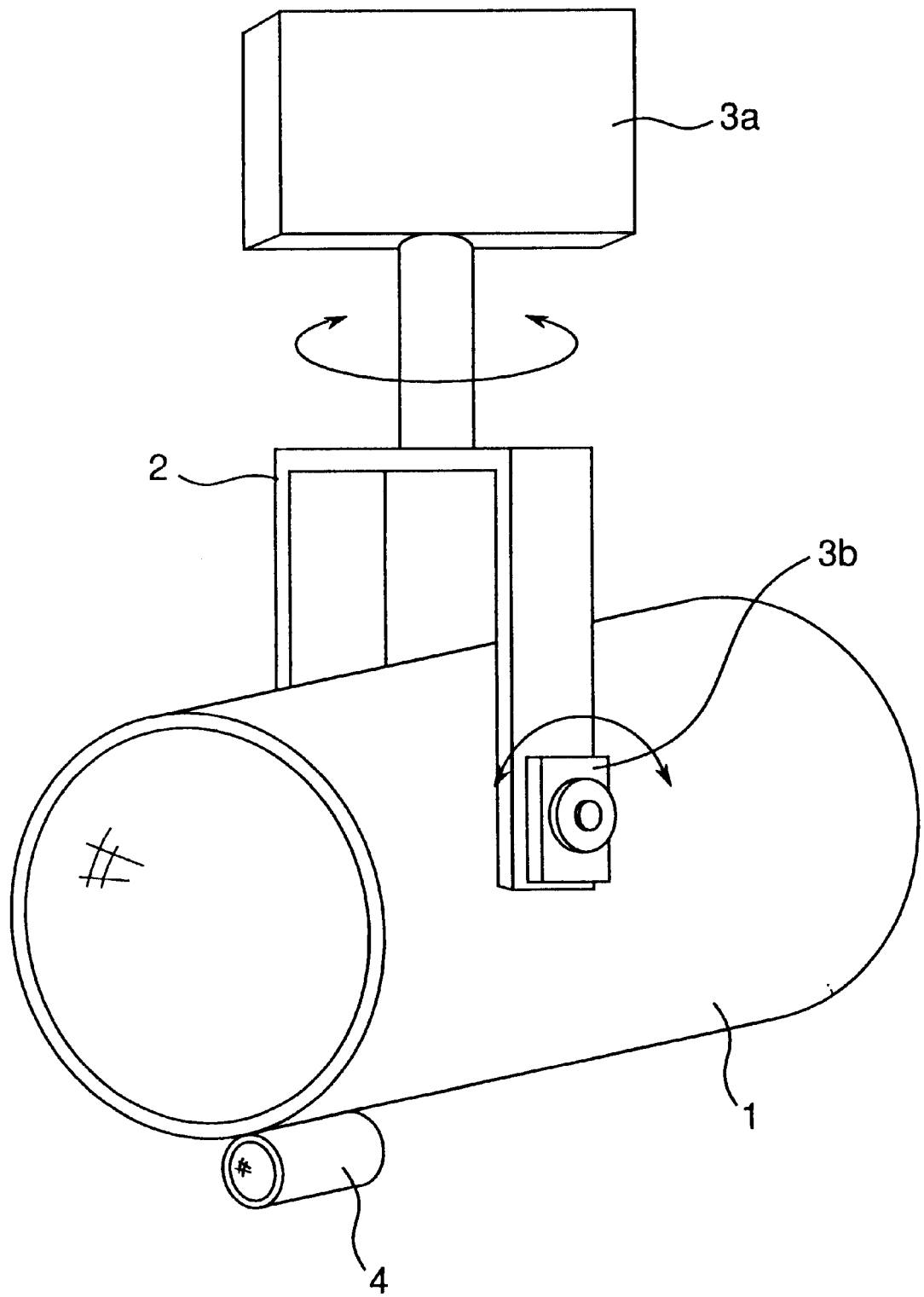
FIG. 2 is a perspective view showing the appearance of the above automatic tracking lighting equipment.

As shown in FIGS. 1 and 2, the automatic tracking lighting equipment of the present embodiment comprises: a spotlight 1 which serves as a lighting means provided on a ceiling surface 13 for tracking a target to be lighted 8 in a lighting space 9; a bracket 2 which supports the spotlight 1 pivotally in a horizontal direction and a vertical direction; a horizontal drive means 3a which changes a horizontal angle (PAN) of the lighting direction of the spotlight 1 by pivoting the bracket 2 in the horizontal direction; a vertical drive means 3b which changes a vertical angle (TILT) of the lighting direction of the spotlight 1 by pivoting the spotlight 1 in the vertical direction; a compact CCD camera 4 which serves as an image pickup means provided beside the spotlight 1 and picks up an image in a direction identical to the lighting direction of the spotlight 1; an image recognition unit 5 which serves as an image recognizing means for recognizing a target to be lighted 8 such as a person from an image from the image pickup means and specifying the coordinates of the target to be lighted 8; a coordinate calculation unit 6 which serves as a calculating means for calculating the quantity of movement in the lighting direction of the spotlight 1 from the quantity of movement of the coordinates of the target to be lighted 8 in the image recognition unit 5; and a movable control unit 7 which serves as a control means for converting a result of calculation from the coordinate calculation unit 6 into drive signals for the motors of the horizontal drive means 3a and the vertical drive means 3b and outputting the signals to the horizontal drive means 3a and the vertical drive means 3b.

Figure 3:
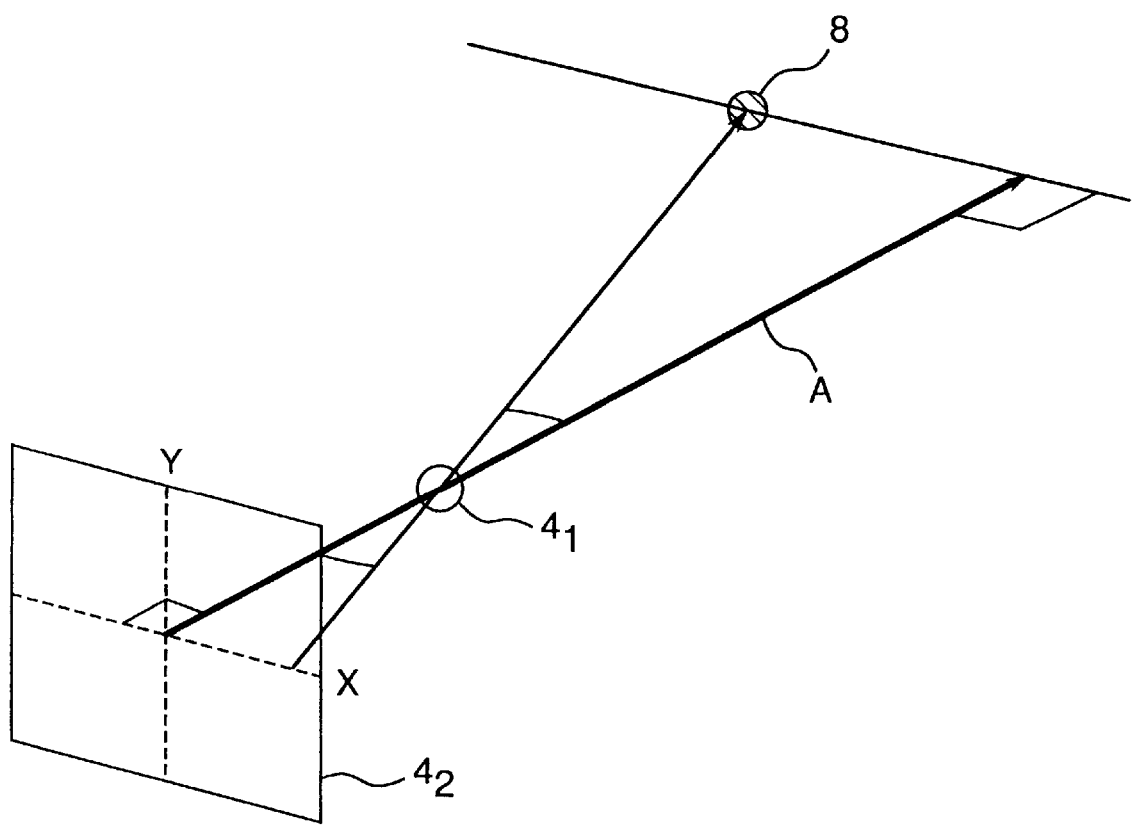
FIG. 3 is a view showing a relation between the image pickup plane of a CCD camera of the above equipment and the actual lighting space.
Figure 4:
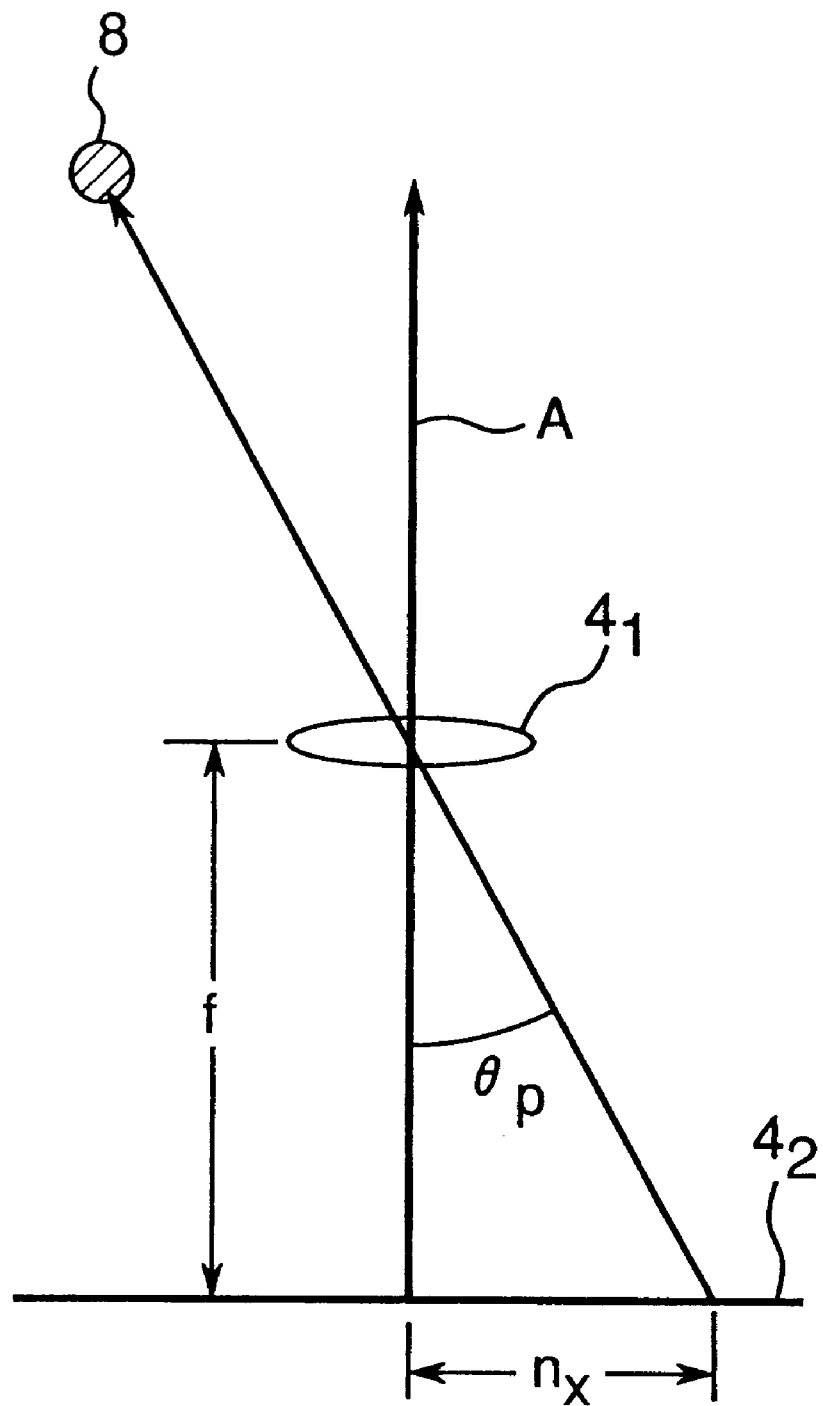
FIG. 4 is a detailed view showing the relation between the image pickup plane of the above CCD camera and the actual lighting space.

The operation of this automatic tracking lighting equipment will be described with reference to FIGS. 3 and 4. It is assumed that an image pickup plane $4_2$ of the CCD camera 4 has a horizontal angle directed in an X-direction and a vertical angle directed in a Y-direction. In the present embodiment, only the X-direction will be described for the sake of simplicity of explanation.

First, the image recognition unit 5 processes the image from the CCD camera 4 by means of the existing image processing techniques of pattern matching, color matching and the like.

Figure 17:
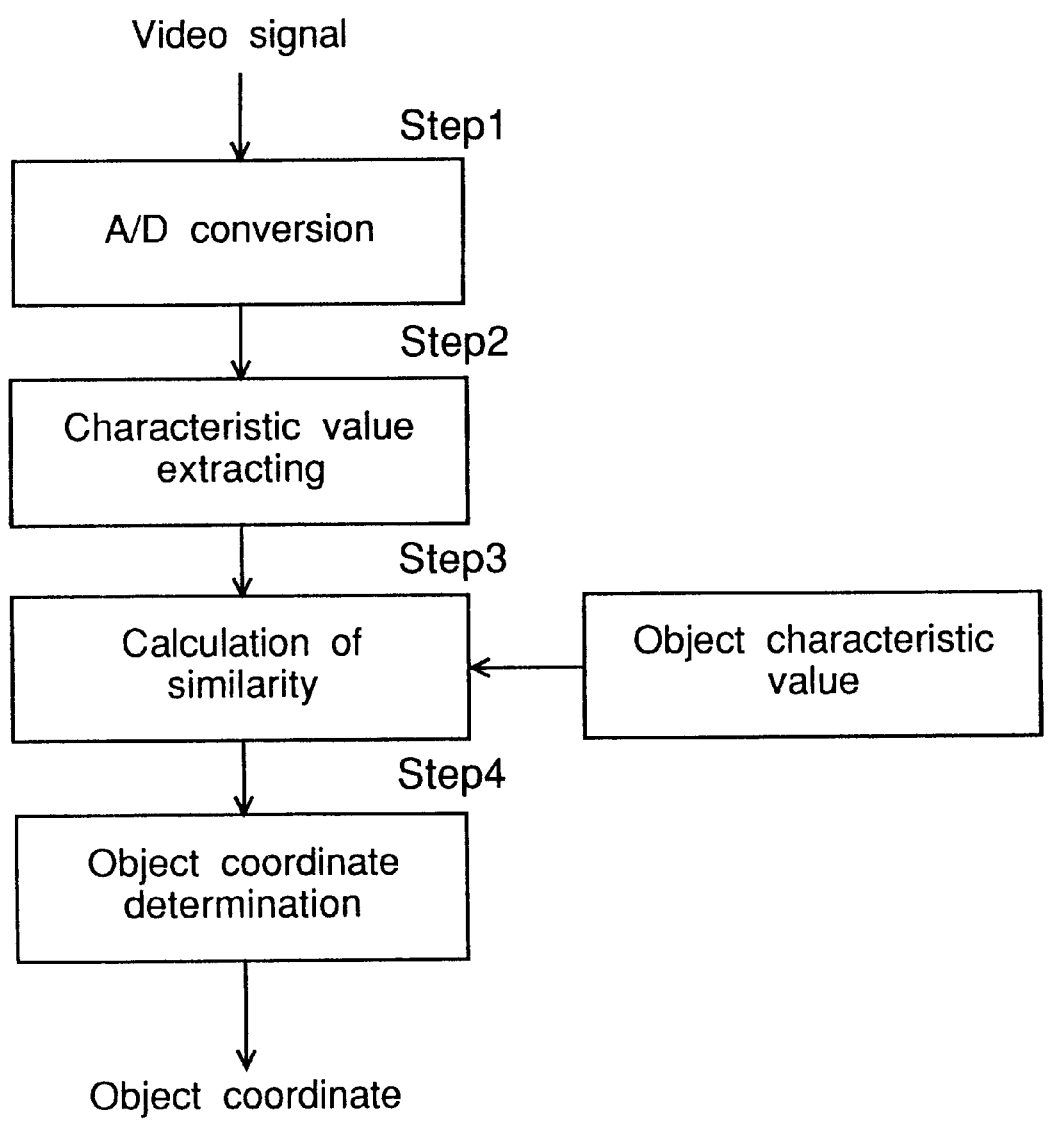
FIG. 17 is a flow chart showing an example of basic process of pattern matching method.

FIG. 17 is a flow chart which explains an example of basic process of a conventional pattern matching method. The image recognition unit 5 executes the image processing by pattern matching, for example, according to the flow chart. The image recognition unit 5 converts the video signal input from CCD camera into a digital signal by A/D convertion process (Step 1), then extracts predetermined characteristic value(pattern) from the obtained image(Step 2). Next, the image recognition unit 5 compares the extracted characteristic value with the object characteristic value(standerd pattern) stored previously, and calculates the similarity between them(Step 3). And, when the similarity over the specified value is obtained, the object coordinate is determined(Step 4).

The image recognition unit 5 recognizes the pattern of the object (target to be lighted 8) by such a process and detects a displacement of the target to be lighted 8 from the center of the image pickup plane $4_2$ in the image pickup plane $4_2$ of the CCD camera 4.

Next, the coordinate calculation unit 6 calculates the quantity of movement in the lighting direction of the spotlight 1 from the displacement of the target to be lighted 8 from the center of the image pickup plane $4_2$. When the current lighting direction (the direction A in FIGS. 3 and 4) of the spotlight 1 is located in the approximate center of the image pickup plane $4_2$ of the CCD camera 4, the displacement of the target to be lighted 8 from the center of the image pickup plane $4_2$ is assumed to be $n_x$. In order to make the lighting direction of the spotlight 1 coincide with the target to be lighted 8, it is required to move the spotlight 1 by a movement angle quantity $\theta_p$ in the horizontal direction. Assuming that the lens $4_1$ of the CCD camera 4 has a focal distance f, then the movement angle quantity $\theta_p$ in the horizontal direction of the spotlight 1 becomes $$\theta_p = \tan^{-1}(n_x/f)$$

Similarly, in regard to the vertical direction, the movement angle quantity in the lighting direction of the spotlight 1 can be obtained in a similar procedure.

Further, the movable control unit 7 converts the result of calculation of the coordinate calculation unit 6 into the drive signal of the horizontal drive means 3a and outputs the signal to the horizontal drive means 3a. For example, when the motors of the horizontal drive means 3a and the vertical drive means 3b are servo-driven by feeding back a detection value from a sensor such as a potentiometer, the movable control unit 7 outputs the drive signals for the motors of the horizontal drive means 3a and the vertical drive means 3b from the detection value of the sensor corresponding to a desired angle of rotation, thereby operating the motors of the horizontal drive means 3a and the vertical drive means 3b.

Through the aforementioned series of processing cycle, when the target to be lighted 8 is displaced from the center of the image pickup plane $4_2$ of the CCD camera 4 consequent upon the movement of the target to be lighted 8, the movable control unit 7 sequentially drives the horizontal drive means 3a and the vertical drive means 3b so that the displacement is eliminated, i.e., the lighting direction of the spotlight 1 is made to coincide with the target to be lighted 8. Then, by repeating this series of processing cycle, the spotlight 1 can track and floodlight the target to be lighted 8.

SECOND EMBODIMENT

Figure 5:
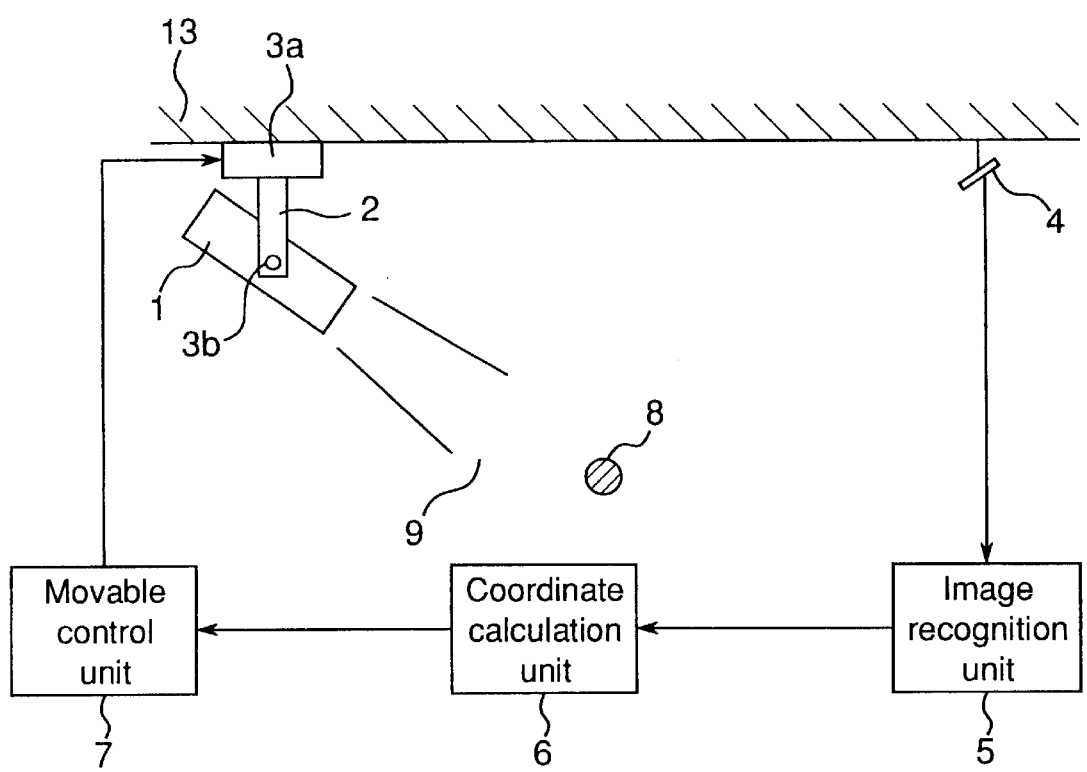
FIG. 5 is a schematic diagram showing the automatic tracking lighting equipment of the second embodiment.

As shown in FIG. 5, the automatic tracking lighting equipment of the present embodiment comprises: a spotlight 1 which serves as a lighting means provided on a ceiling surface 13 of a lighting space 9 for tracking and floodlighting a target to be lighted 8 such as a person in the lighting space 9; a bracket 2 which supports the spotlight 1 pivotally in a horizontal direction and a vertical direction; a horizontal drive means 3a which pivots the spotlight 1 in the horizontal direction; a vertical drive means 3b which pivots the spotlight 1 in the vertical direction; a compact CCD camera 4 which serves as an image pickup means provided on the ceiling surface 13 in a position different from the position of the spotlight 1 and picks up an image in the lighting space 9; an image recognition unit 5 which serves as an image recognizing means for specifying the coordinates of the target to be lighted 8 by processing an image picked up by the CCD camera 4; a coordinate calculation unit 6 which serves as a calculating means for calculating the quantity of movement in the lighting direction of the spotlight 1 from the quantity of movement of the target to be lighted 8 in the image recognition unit 5; and a movable control unit 7 which serves as a control means for converting a result of calculation from the coordinate calculation unit 6 into drive signals for the motors of the horizontal drive means 3a and the vertical drive means 3b and outputting the signals to the horizontal drive means 3a and the vertical drive means 3b.

Figure 6:
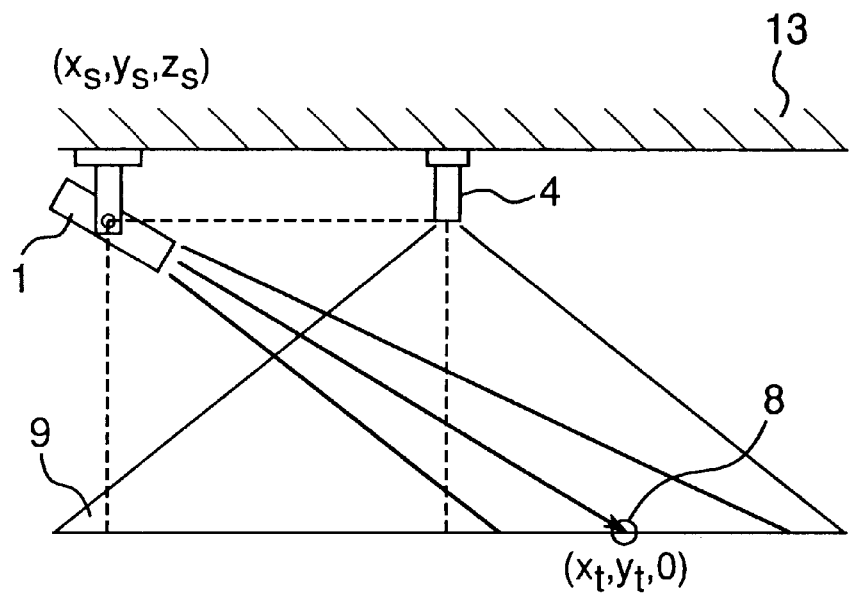
FIG. 6 is a side view showing a positional relation between the above automatic tracking lighting equipment and a target to be lighted.

The operation of this automatic tracking lighting equipment will be described with reference to FIGS. 6 through 10. It is now considered the case where the CCD camera 4 is provided at the approximate center of the ceiling surface 13 of the lighting space 9 as shown in FIG. 6 for the simplicity of explanation.

In an initial setting stage, by arranging the spotlight 1 and the CCD camera 4 in specified positions on the ceiling surface 13, thereafter making the spotlight 1 pivot and floodlight a specified position in the lighting space 9 and visually making the lighting direction coincide with the position of the target to be lighted obtained by the image recognition unit 5, parameters of the mounting positions, mounting angles and so forth of the spotlight 1 and the CCD camera 4 can be obtained. Then, in a normal use stage, the coordinate calculation unit 6 calculates the quantity of movement of the spotlight 1 from the quantity of movement of the target to be lighted based on the parameters obtained in the initial setting stage. Therefore, it is not required to inspect the coordinates of the spotlight 1 and the CCD camera 4 from design drawings in the initial setting stage and input the coordinates, so that the labor in the working time can be saved.

When the coordinates of the spotlight 1 and the CCD camera 4 are obtained from the design drawings or the like, it is sometimes the case where the actual mounting positions of the spotlight 1 and the CCD camera 4 are displaced from the positions in the design drawings. A displacement is generated in the lighting direction of the spotlight 1 due to the displacement of the mounting positions, and therefore, it has been required to readjust the mounting positions of the spotlight 1 and the CCD camera 4 or set again the coordinates. However, according to the automatic tracking lighting equipment of the present embodiment, the lighting direction of the spotlight 1 is visually adjusted in the initial setting stage. Therefore, the displacement of the actual mounting positions from the mounting positions in the design drawings can be absorbed, thereby allowing the lighting direction of the spotlight 1 to be controlled with higher accuracy.

Figure 7:
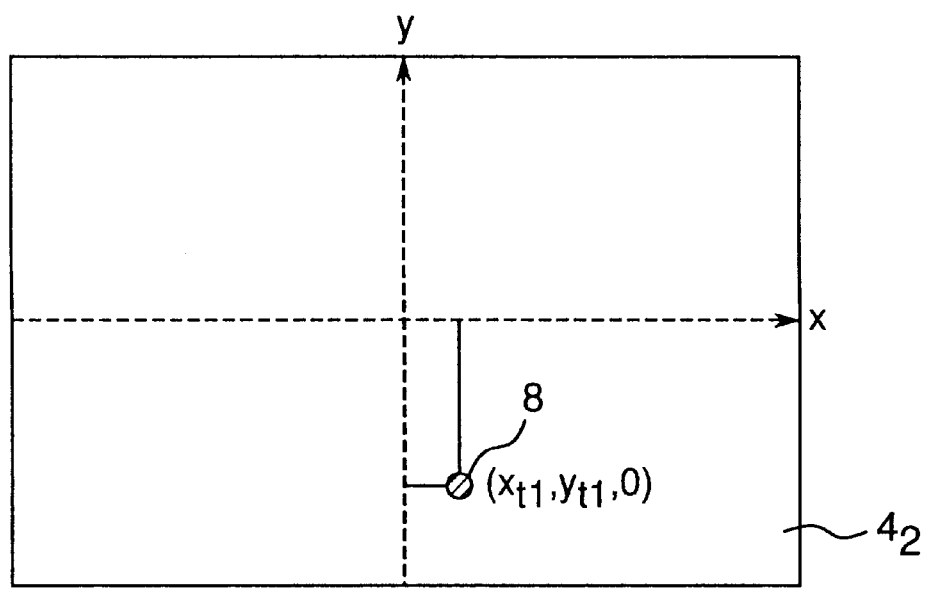
FIG. 7 is a view showing the image pickup plane of the above CCD camera.

In the normal use stage, firstly the image recognition unit 5 processes the image from the CCD camera 4 by means of the existing image processing techniques of pattern matching, color matching and the like so as to recognize the target to be lighted 8 and specify its coordinates. As a result, it is assumed that coordinates $(x_{t1}, y_{t1}, 0)$ in the image pickup plane $4_2$ of the target to be lighted 8 have been obtained as shown in FIG. 7. In this case, it is considered that the target to be lighted 8 is existing on the floor surface (horizontal surface) of the lighting space 9, and its Z-coordinate is assumed to be 0. It is further assumed that the coordinates of the CCD camera 4 are (0, 0, z) and the coordinates of the spotlight 1 are $(x_s, y_s, z_s)$.

The coordinates in the image pickup plane $4_2$ of the CCD camera 4 and the coordinates in the actual lighting space 9 can be expressed by a simple proportional relation. Assuming that the constants of proportionality in the x- and y-directions are $k_x$ and $k_y$ respectively, then the coordinates $(x_t, y_t, 0)$ of the target to be lighted 8 in the actual lighting space 9 can be expressed by the following equations.

$$x_t = k_x \times x_{t1}$$

$$y_t = k_y \times y_{t1}$$

Figure 8:
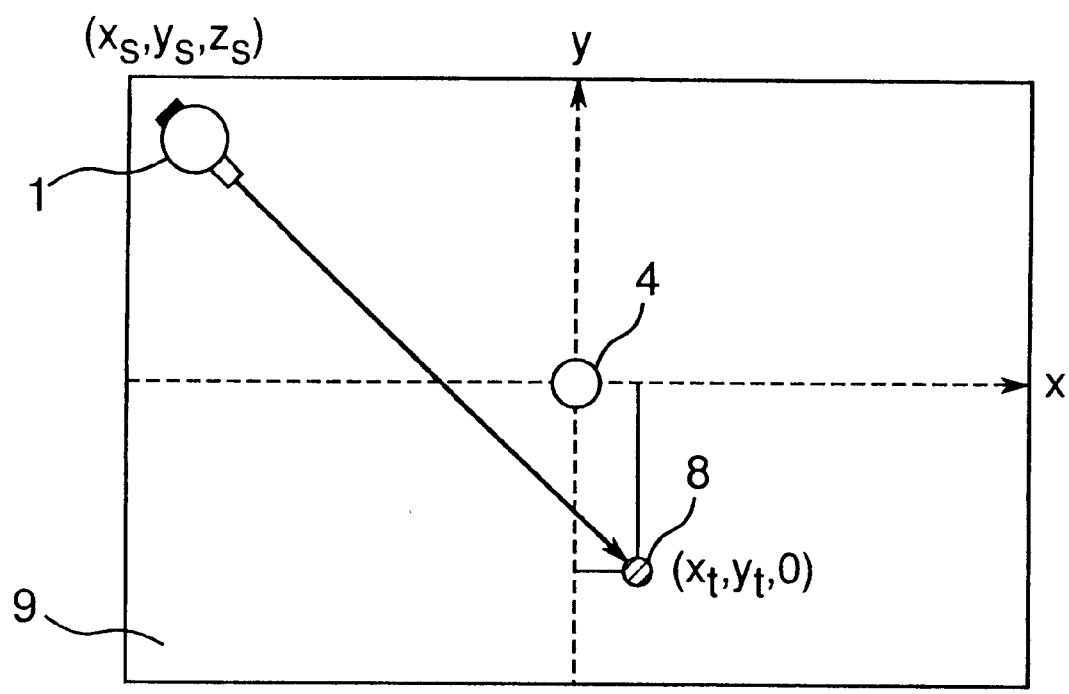
FIG. 8 is a plane view showing a positional relation between a spotlight of the above equipment and the target to be lighted.
Figure 9:
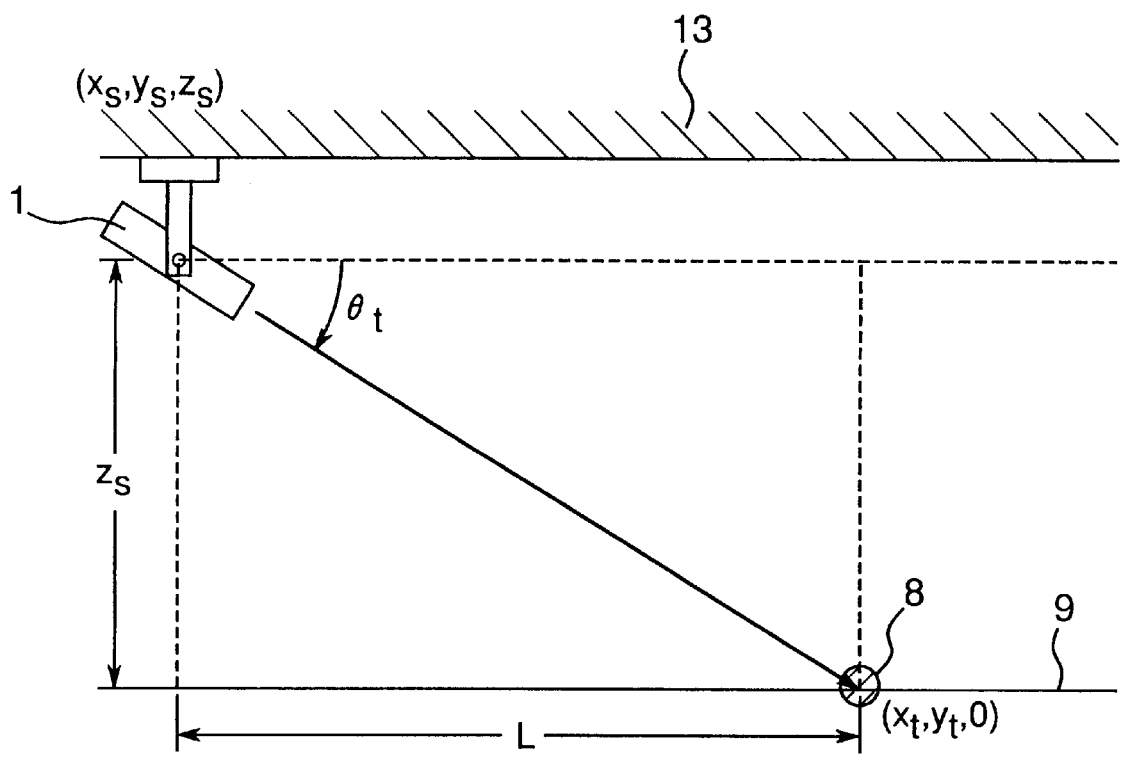
FIG. 9 is a side view showing the positional relation between the above spotlight and the target to be lighted.
Figure 10:
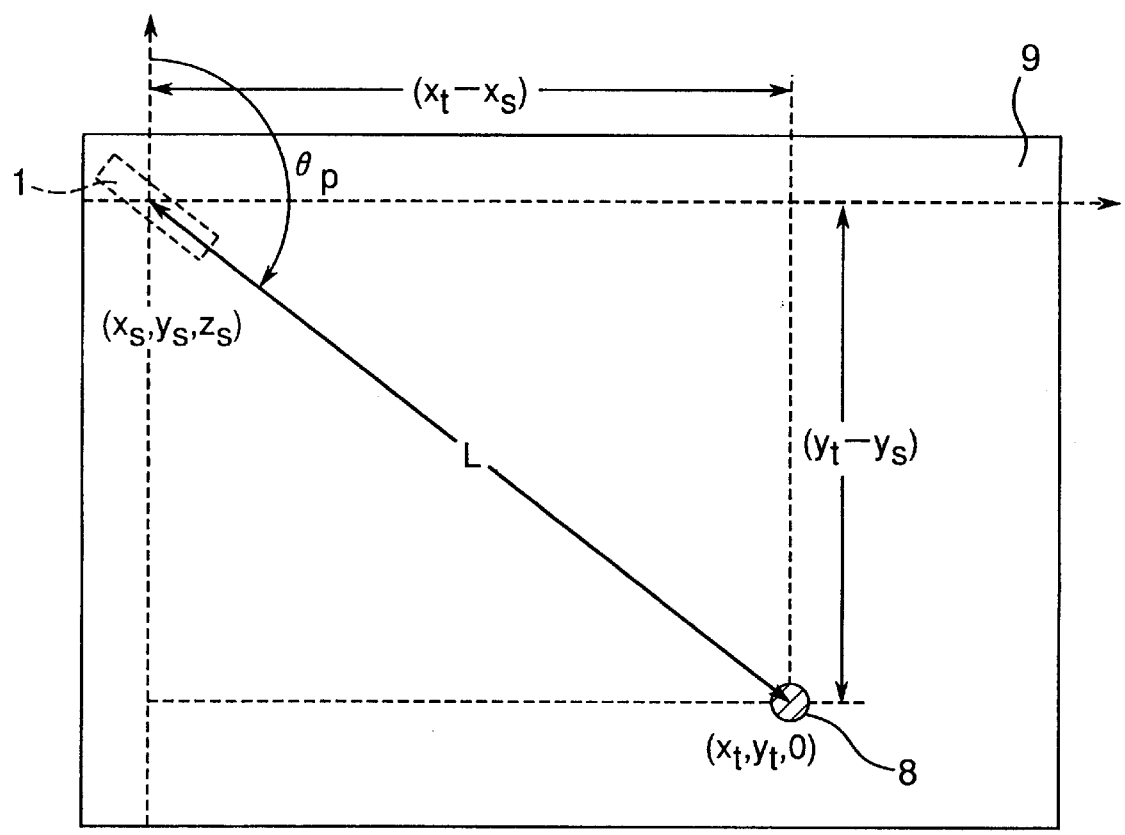
FIG. 10 is a projection drawing of the above spotlight on a floor surface.

In this case, when a positional relation between the spotlight 1 and the target to be lighted 8 is obtained as shown in FIG. 8 in the actual lighting space 9, the horizontal angle and the vertical angle of the spotlight 1 can be calculated from the coordinates of both of them. The coordinates of the spotlight 1 are $(x_s, y_s, z_s)$, and therefore, the coordinates of the target to be lighted 8 viewed from the spotlight 1 can be expressed as $(x_t-x_s, y_t-y_s, -z_s)$. A distance L from a point $(x_s, y_s, 0)$ at which the spotlight 1 is projected on the floor surface of the lighting space 9 to the target to be lighted 8 can be expressed by the following equation.

$$L = ((x_t-x_s)^2 + (y_t-y_s)^2)^{1/2}$$

By using this distance L, the horizontal angle $\theta_p$ and the vertical angle $\theta_t$ of the spotlight 1 can be expressed by the following equations.

$$\theta_p = \cos^{-1}((y_t-y_s)/L)$$

$$\theta_t = \tan^{-1}(z_s/L)$$

In a manner as described above, the coordinate calculation unit 6 calculates the quantity of movements of the horizontal angle $\theta_p$ and the vertical angle $\theta_t$ of the spotlight 1 from the quantity of movement of the target to be lighted 8, and the movable control unit 7 converts the horizontal angle $\theta_p$ and the vertical angle $\theta_t$ into the drive signals of the horizontal drive means 3a and the vertical drive means 3b respectively and outputs the signals to the horizontal drive means 3a and the vertical drive means 3b. Thus, the horizontal drive means 3a and the vertical drive means 3b pivot the spotlight 1 by the horizontal angle $\theta_p$ in the horizontal direction and by the vertical angle $\theta_t$ in the vertical direction, so that the lighting direction of the spotlight 1 is controlled to coincide with the target to be lighted 8. When the image recognition unit 5 detects the displacement of the coordinates of the target to be lighted 8 in the next processing cycle; the coordinate calculation unit 6 calculates the quantity of movement of the spotlight 1 according to the quantity of movement of the target to be lighted 8, and the movable control unit 7 controls the horizontal drive means 3a and the vertical drive means 3b based on the result of calculation of the coordinate calculation unit 6, thereby making the spotlight 1 track the target to be lighted 8. By repeating this series of processing cycle, the spotlight 1 can track the movement of the target to be lighted 8.

THIRD EMBODIMENT

Figure 11:
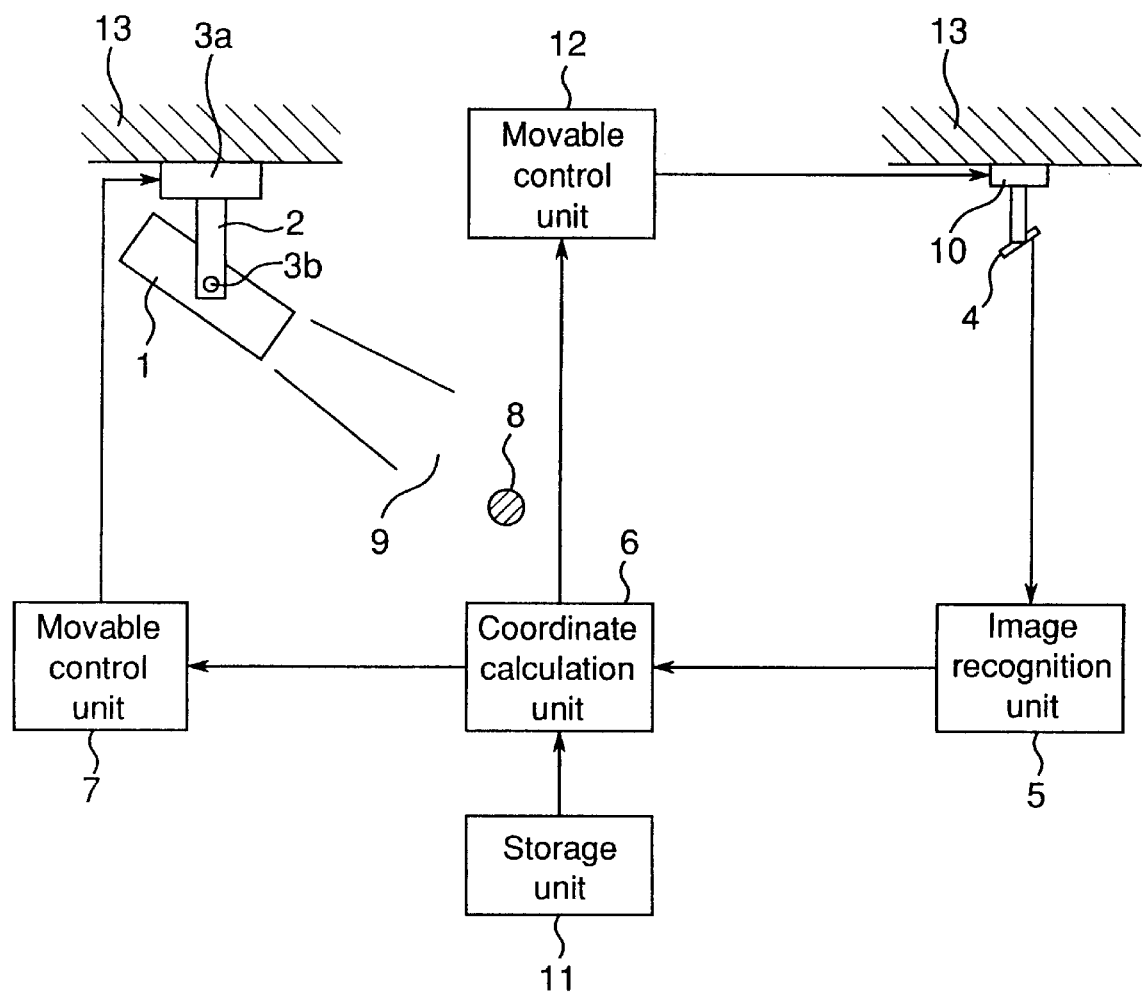
FIG. 11 is a schematic diagram showing the automatic tracking lighting equipment of the third embodiment.

As shown in FIG. 11, the automatic tracking lighting equipment of the present embodiment comprises: a spotlight 1 which serves as a lighting means for tracking and floodlighting a target to be lighted 8 in a lighting space 9; a bracket 2 which supports the spotlight 1 pivotally in a horizontal direction and a vertical direction; a horizontal drive means 3a and a vertical drive means 3b which serve as a first drive means for pivoting the spotlight 1 in the horizontal direction and the vertical direction, respectively; a compact CCD camera 4 which serves as an image pickup means for picking up the image of the target to be lighted 8 in the lighting space 9; a rotating table 10 which serves as a second drive means for making the CCD camera 4 track the movement of the target to be lighted 8; a storage unit 11 which serves as a storage means for storing the image pickup direction of the CCD camera 4; an image recognition unit 5 which serves as an image recognizing means for recognizing the target to be lighted 8 by the existing image processing techniques from an image from the CCD camera 4 and specifying the coordinates of the target to be lighted 8; a coordinate calculation unit 6 which serves as first and second calculating means for calculating the quantity of movements of the spotlight 1 and the CCD camera 4 from the quantity of movement of the target to be lighted 8 in the image recognition unit 5 and the image pickup direction of the CCD camera 4 stored in the storage unit 11; a movable control unit 7 which serves as a first control means for converting a result of calculation from the coordinate calculation unit 6 into drive signals for the motors of the horizontal drive means 3a and the vertical drive means 3b and outputting the signals to the horizontal drive means 3a and the vertical drive means 3b; and a movable control unit 12 which serves as a second control means for converting the result of calculation of the coordinate calculation unit 6 into a drive signal of the rotating table 10 and outputting the signal to the rotating table 10.

The operation of this automatic tracking lighting equipment will be described with reference to FIGS. 11 through 13.

In this case, since the movable control unit 12 makes the image pickup direction of the CCD camera 4 coincide with the target to be lighted 8 based on the result of calculation of the coordinate calculation unit 6 by executing an operation similar to that of the first embodiment, no description is provided for it.

Now, the current image pickup direction of the CCD camera 4 is stored in the storage unit 11. A horizontal angle $\theta_{mp}(t)$ and a vertical angle $\theta_{mt}(t)$ of the CCD camera 4 are calculated by accumulating the quantity of movement of the rotating table 10 with the y-axis direction shown in FIG. 12 and the horizontal direction shown in FIG. 13 served as a reference, and the image pickup direction ($\theta_{mp}(t)$, $\theta_{mt}(t)$) can be expressed by the following equations.

$$\theta_{mp}(t)=\Delta\theta_{mp}+\theta_{mp}(t-1)$$

$$\theta_{mt}(t)=\Delta\theta_{mt}+\theta_{mt}(t-1)$$

In this case, $\theta_{mp}(t-1)$ and $\theta_{mt}(t-1)$ are respectively the horizontal angle and the vertical angle of the CCD camera 4 in the preceding processing cycle, while $\Delta\theta_{mp}$ and $\Delta\theta_{mt}$ are the quantity of movement of the horizontal angle and the quantity of movement of the vertical angle of the CCD camera 4 in the current processing cycle.

Figure 13:
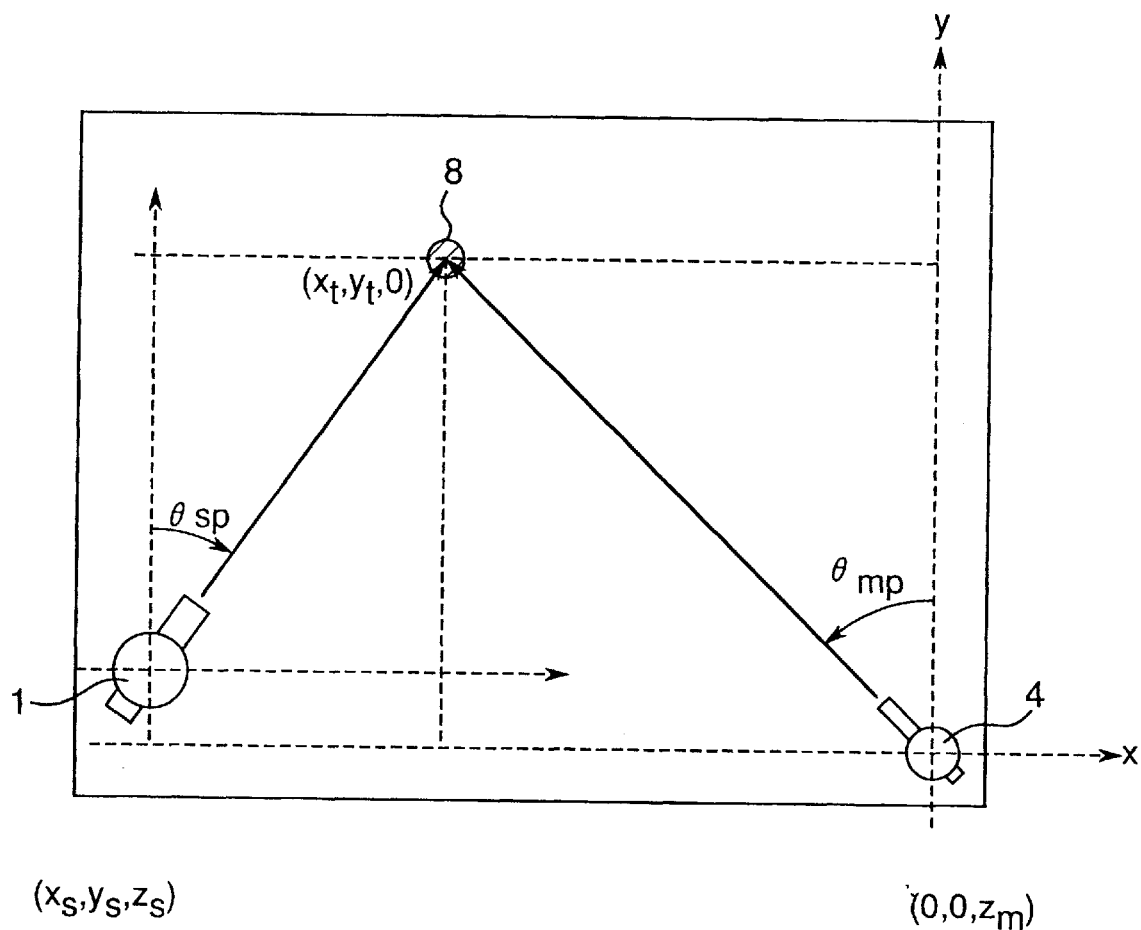
FIG. 13 is a projection drawing of the above automatic tracking lighting equipment on the floor surface.

As shown in FIG. 13, when the spotlight 1 and the CCD camera 4 are projected on the floor surface of the lighting space 9, a distance $L_m$ from a point (0, 0, 0) at which the CCD camera 4 is projected on the floor surface to the target to be lighted 8 can be expressed by means of the vertical angle $\theta_{mt}(t)$ of the CCD camera 4 by the following equation.

$$L_m = z_m / \tan(\theta_{mt}(t))$$

Further, the coordinates ($x_t$, $y_t$, 0) of the target to be lighted 8 can be expressed by the following equations.

$$x_t = L_m \cdot \cos(\theta_{mp}(t))$$

$$y_t = L_m \cdot \sin(\theta_{mp}(t))$$

In this case, assuming that the coordinates of the spotlight 1 are ($x_s$, $y_s$, $z_s$), then the coordinates of the target to be lighted 8 viewed from the spotlight 1 become ($x_t-x_s$, $y_t-y_s$, $-z_s$), and a distance $L_s$ from a point ($x_s$, $y_s$, 0) at which the coordinates of the spotlight 1 are projected on the floor surface of the lighting space 9 to the target to be lighted 8 can be expressed by the following equation.

$$L_s = ((x_t-x_s)^2 + (y_t-y_s)^2)^{1/2}$$

By means of this distance $L_s$, a horizontal angle $\theta_{sp}$ and a vertical angle $\theta_{st}$ of the spotlight 1 can be expressed respectively by the following equations.

$$\theta_{sp} = \cos^{-1}((y_t-y_s)/L_s)$$

$$\theta_{st} = \tan^{-1}(z_s/L_s)$$

When the horizontal angle $\theta_{sp}$ and the vertical angle $\theta_{st}$ of the spotlight 1 are thus obtained, the movable control unit 7 converts the horizontal angle $\theta_{sp}$ and the vertical angle $\theta_{st}$ into drive signals of the horizontal drive means 3a and the vertical drive means 3b, respectively and outputs the signals to the horizontal drive means 3a and the vertical drive means 3b similarly to the first embodiment so as to pivot the spotlight 1 in a desired direction and make the lighting direction of the spotlight 1 track the target to be lighted 8. By repetitively executing the processing as described above, the spotlight 1 can be made to track the target to be lighted 8.

According to the present embodiment, the image pickup direction of the CCD camera 4 is made to track the target to be lighted 8, and therefore, a lens having not so wide angle can be used as the lens of the CCD camera 4. Therefore, even the image of a target to be lighted 8 located far away can be clearly picked up, so that the target to be lighted 8 can be easily recognized in executing the image processing.

Since the lighting direction of the spotlight 1 is visually made to coincide with the position of the target to be lighted obtained by the image recognition unit 5 in the initial setting stage by a method similar to that of the second embodiment, no description is provided for it.

FOURTH EMBODIMENT

According to the present embodiment, the automatic tracking lighting equipment of the third embodiment is provided with two CCD cameras which serve as image pickup means for picking up the image of a target to be lighted in a lighting space.

Figure 14:
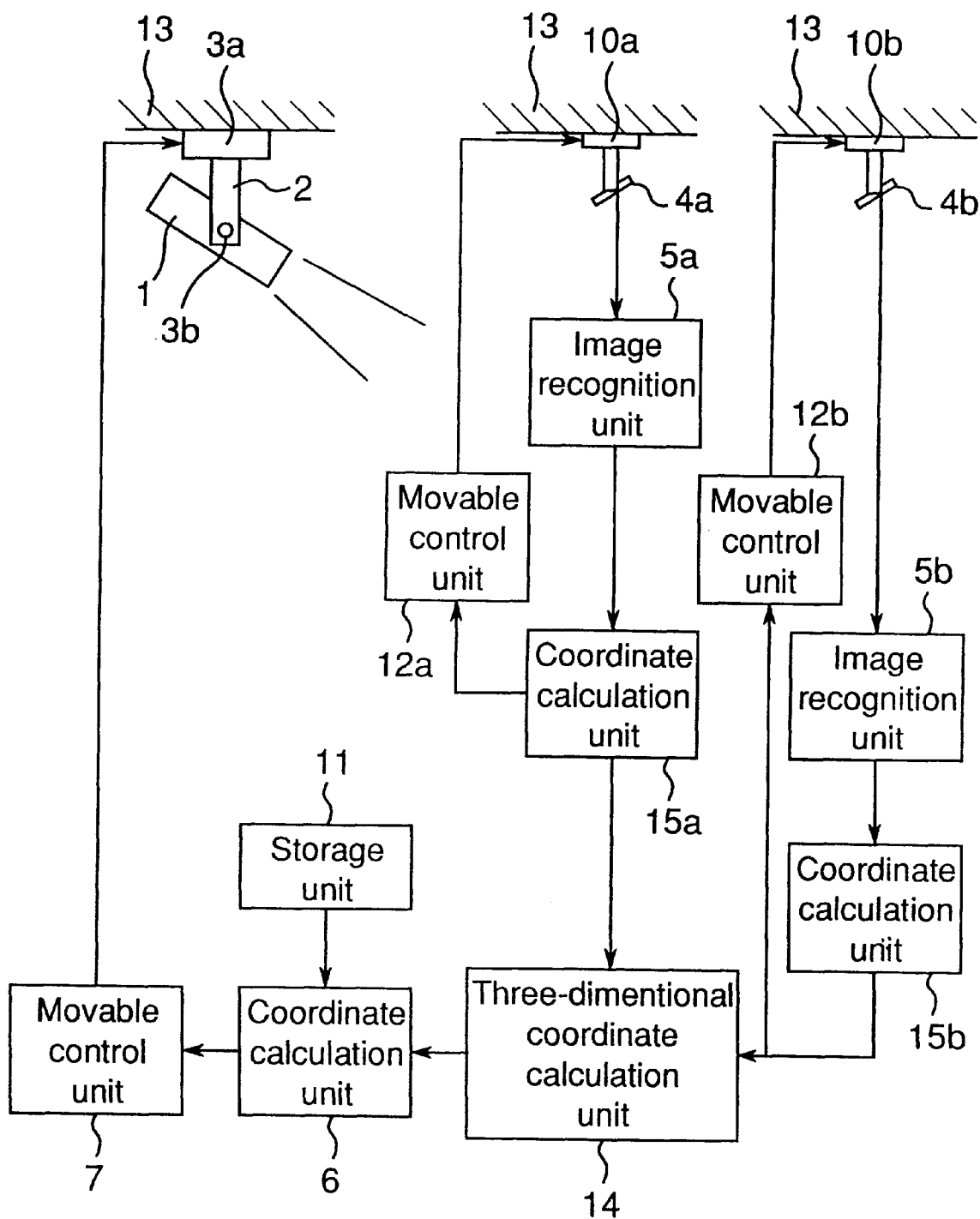
FIG. 14 is a schematic diagram showing the automatic tracking lighting equipment of the fourth embodiment.

As shown in FIG. 14, this automatic tracking lighting equipment comprises: a spotlight 1 which serves as a lighting means for floodlighting a target to be lighted 8 in a lighting space 9; a bracket 2 which supports the spotlight 1 pivotally in a horizontal direction and a vertical direction; a horizontal drive means 3a and a vertical drive means 3b which serve as a first drive means for pivoting the spotlight 1 in the horizontal direction and the vertical direction, respectively; two CCD cameras 4a and 4b which serve as image pickup means for picking up the image of the target to be lighted 8 in the lighting space 9; rotating tables 10a and 10b which serve as second drive means for making the respective CCD cameras 4a and 4b track the movement of the target to be lighted 8; image recognition units 5a and 5b which serve as image recognizing means for recognizing the target to be lighted 8 by the existing image processing techniques from an image from the CCD cameras 4a and 4b and detecting the coordinates of the target to be lighted 8; coordinate calculating units 15a and 15b which serve as second calculating means for calculating the quantities of movement of the respective CCD cameras 4a and 4b from the quantity of movement of the target to be lighted 8 detected by the image recognition units 5a and 5b; movable control units 12a and 12b which serve as second control means for outputting signals for driving the respective rotating tables 10a and 10b from results of calculation of the coordinate calculating units 15a and 15b; a storage unit 11 which serves as a storage means for storing image pickup directions of the CCD cameras 4a and 4b; a three-dimensional coordinate calculation unit 14 for calculating three-dimensional coordinates of the target to be lighted 8 from the coordinates detected by the coordinate calculating units 15a and 15b, respectively; a coordinate calculation unit 6 which serves as a first calculating means for calculating the lighting direction of the spotlight 1 from a result of calculation of the three-dimensional coordinate calculation unit 14 and the image pickup directions of the CCD cameras 4a and 4b stored in the storage unit 11; and a movable control unit 7 which serves as a first control means for converting a result of calculation from the coordinate calculation unit 6 into drive signals of the horizontal drive means 3a and the vertical drive means 3b and outputting the signals to the horizontal drive means 3a and the vertical drive means 3b.

Figure 15:
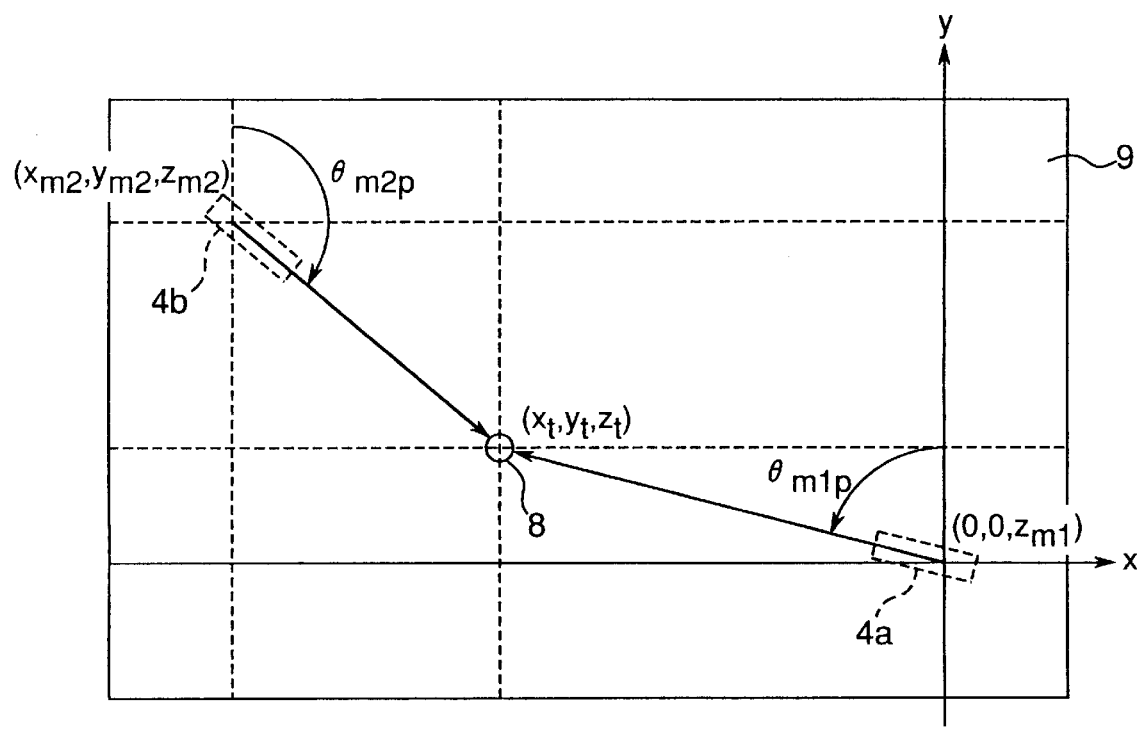
FIG. 15 is a projection drawing of CCD cameras of the above equipment on the floor surface.
Figure 16:
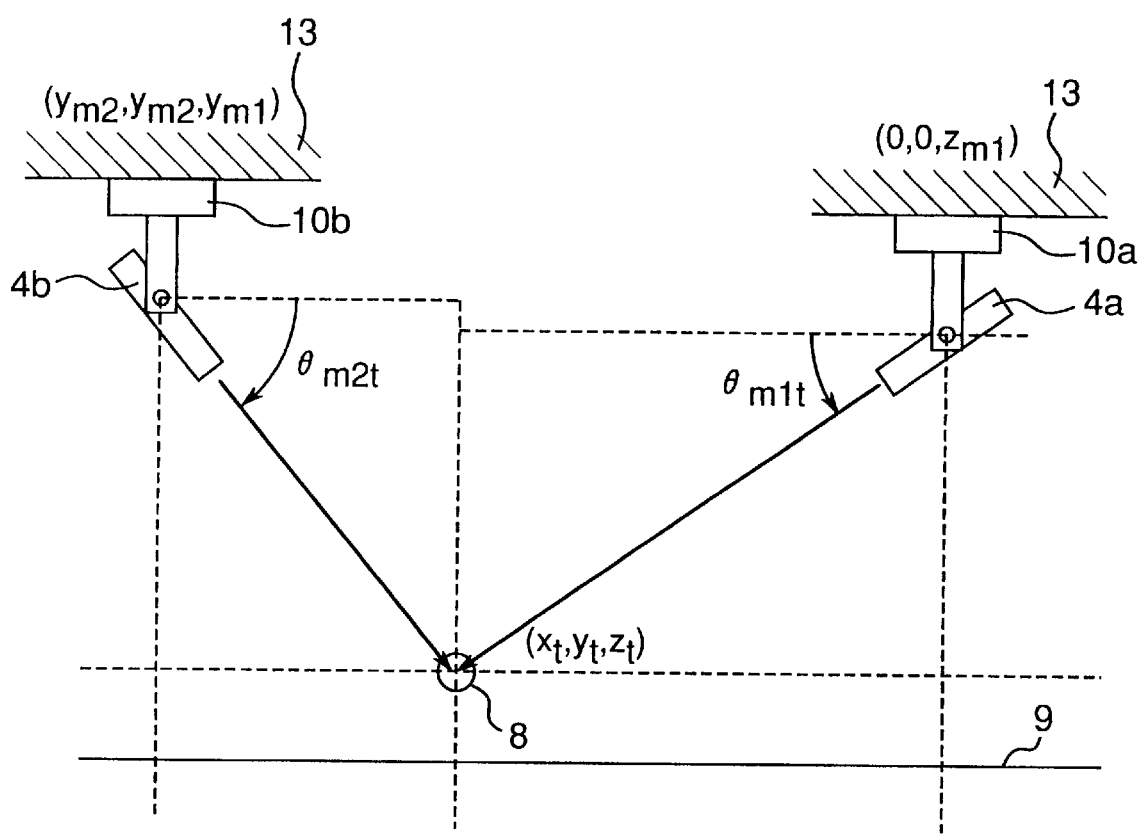
FIG. 16 is a side view showing a positional relation between the above CCD cameras and a target to be lighted.

The operation of this automatic tracking lighting equipment will be described with reference to FIGS. 14 through 16. In this case, since the CCD cameras 4a and 4b and the rotating tables 10a and 10b operate in a processing cycle similar to those of the first and third embodiments, respectively, no description is provided for them. It is to be noted that the CCD cameras 4a and 4b are operating synchronously in the series of processing cycle.

In this stage, assuming that the coordinates of the CCD cameras 4a and 4b are $(0, 0, z_{m1})$ and $(x_{m2}, y_{m2}, z_{m2})$, the CCD camera 4a has a horizontal angle $\theta_{m1p}$ and a vertical angle $\theta_{m1t}$ and the CCD camera 4b has a horizontal angle $\theta_{m2p}$ and a vertical angle $\theta_{m2t}$, then a straight line representing the image pickup direction of the CCD camera 4a is expressed by the following equations.

$$x = t \cdot \cos(\theta_{m1t}) \cdot \sin(\theta_{m1p}) \tag{A1}$$

$$y = t \cdot \cos(\theta_{m1t}) \cdot \cos(\theta_{m1p}) \tag{A2}$$

$$z = -t \cdot \sin(\theta_{m1t}) + z_{m1} \tag{A3}$$

and a straight line representing the image pickup direction of the CCD camera 4b is expressed by the following equations.

$$x = r \cdot \cos(\theta_{m2t}) \cdot \sin(\theta_{m2p}) + x_{m2} \tag{A4}$$

$$y = r \cdot \cos(\theta_{m2t}) \cdot \cos(\theta_{m2p}) + y_{m2} \tag{A5}$$

$$z = -r \cdot \sin(\theta_{m2t}) + z_{m2} \tag{A6}$$

In this case, t and r are parameters representing respective straight lines. Since an intersection of the two straight lines has the coordinates $(x_t, y_t, z_t)$ of the target to be lighted 8. Therefore, by solving the aforementioned equations postulating that the coordinates of the two straight lines are identical from the equations (1) through (6), the parameter t can be obtained by the following equation.

$t=(x_{m2}\cdot\cos(\theta_{m2t})-y_{m2}\cdot\sin(\theta_{m2p}))/[\cos(\theta_{m1t})\times(\sin(\theta_{m1p})\cdot\cos(\theta_{m2p})-\cos(\theta_{m1p})\cdot\sin(\theta_{m2p}))]$ When the above equations are substituted into the equations (1) through (3), the coordinates $(x_t, y_t, z_t)$ of the target to be lighted 8 can be obtained by the following equations.

$$x_t = t \cdot \cos(\theta_{m1t}) \cdot \sin(\theta_{m1p})$$

$$y_t = t \cdot \cos(\theta_{m1t}) \cdot \cos(\theta_{m1p})$$

$$z_t = -t \cdot \sin(\theta_{m1t}) + z_{m1}$$

By using the intersection of the two straight lines obtained through the above processing, i.e., the coordinates $(x_t, y_t, z_t)$ of the target to be lighted 8, subsequently similarly to the second embodiment, the coordinate calculation unit 6 calculates the quantities of movement of the horizontal angle and the vertical angle of the spotlight 1, and the movable control unit 7 converts the result of calculation of the coordinate calculation unit 6 into the drive signals of the horizontal drive means 3a and the vertical drive means 3b and outputs the signals to the horizontal drive means 3a and the vertical drive means 3b. Then, the horizontal drive means 3a and the vertical drive means 3b pivot the spotlight 1 in the desired direction based on the drive signals. Thus, by repetitively executing this processing cycle, the lighting direction of the spotlight 1 can be made to track the movement of the target to be lighted 8.

When the mounting coordinates of the CCD cameras 4a and 4b differ only in height and overlap vertically, i.e., when $x_{m2}=0$ and $y_{m2}=0$, the parameter t is obtained as expressed by the following equation, and therefore, the intersection of the two straight lines, i.e., the coordinates of the target to be lighted 8 can be obtained similarly.

$t=\cos(\theta_{m2t})\times(z_{m1}-z_{m2})/(\sin(\theta_{m1t})\cdot\cos(\theta_{m2t})-\cos(\theta_{m1t})\cdot\sin(\theta_{m2t}))$ The three-dimensional coordinate calculation unit 14 thus calculates the three-dimensional coordinates of the target to be lighted 8 and the coordinate calculation unit 6 calculates the quantity of movement of the spotlight 1 based on the three-dimensional coordinates. Therefore, even when the floor surface of the lighting space 9 has an unevenness, the target to be lighted 8 can be correctly tracked.

Since the lighting direction of the spotlight 1 is visually made to coincide with the position of the target to be lighted obtained by the image recognition units 5a and 5b in the initial setting stage by a method similar to that of the second embodiment, no description is provided for it.

The lighting controller according to a fifth embodiment of the present invention will be described with reference to FIGS. 18 through 23, a sixth embodiment will be described with reference to FIGS. 24 and 25, a seventh embodiment will be described with reference to FIGS. 26 and 27, and a eighth embodiment will be described with reference to FIGS. 28.

FIFTH EMBODIMENT

Figure 18:
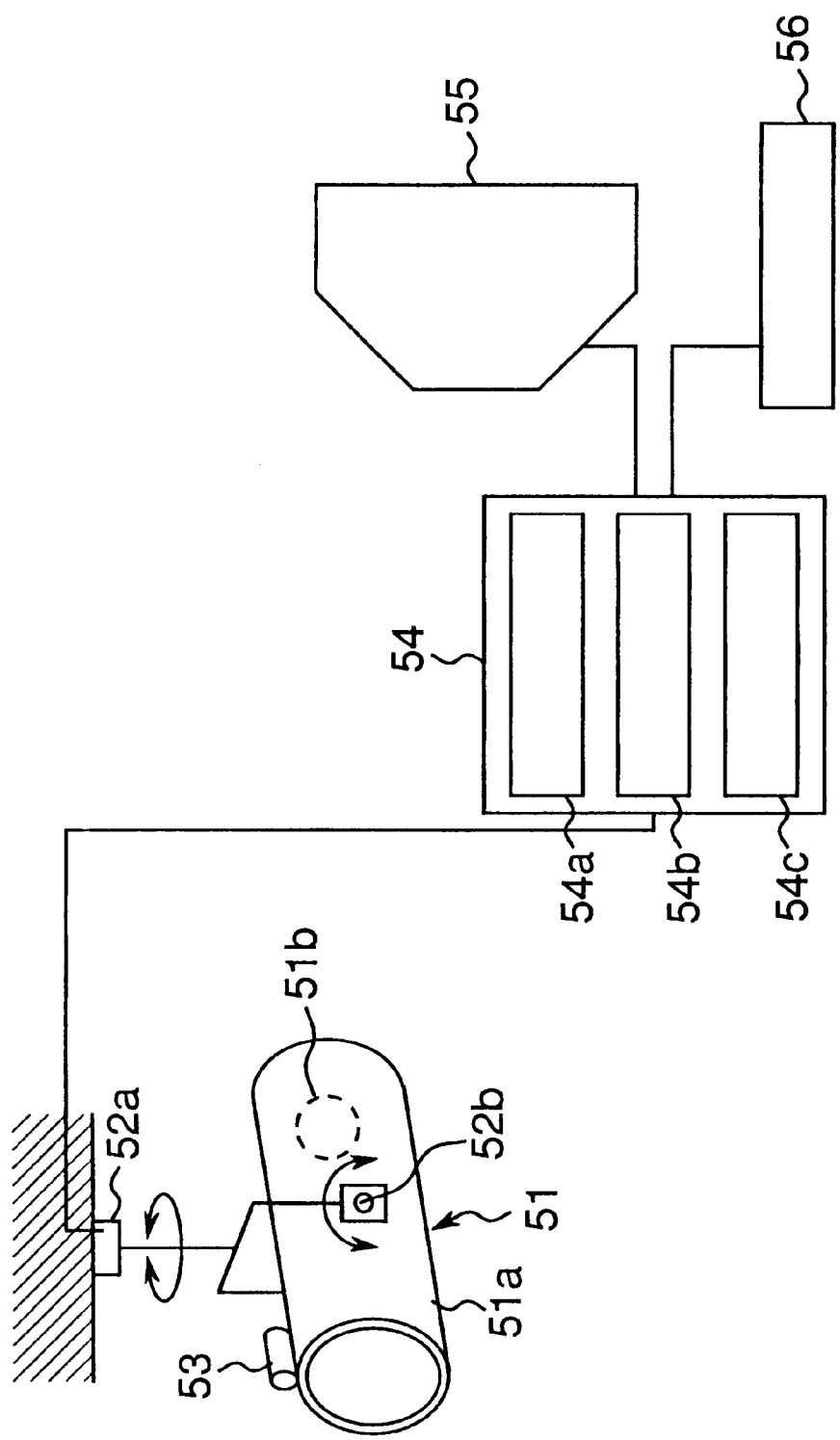
FIG. 18 is a schematic view for explaining the construction of the fifth embodiment of the lighting controller of the present invention.
Figure 19:
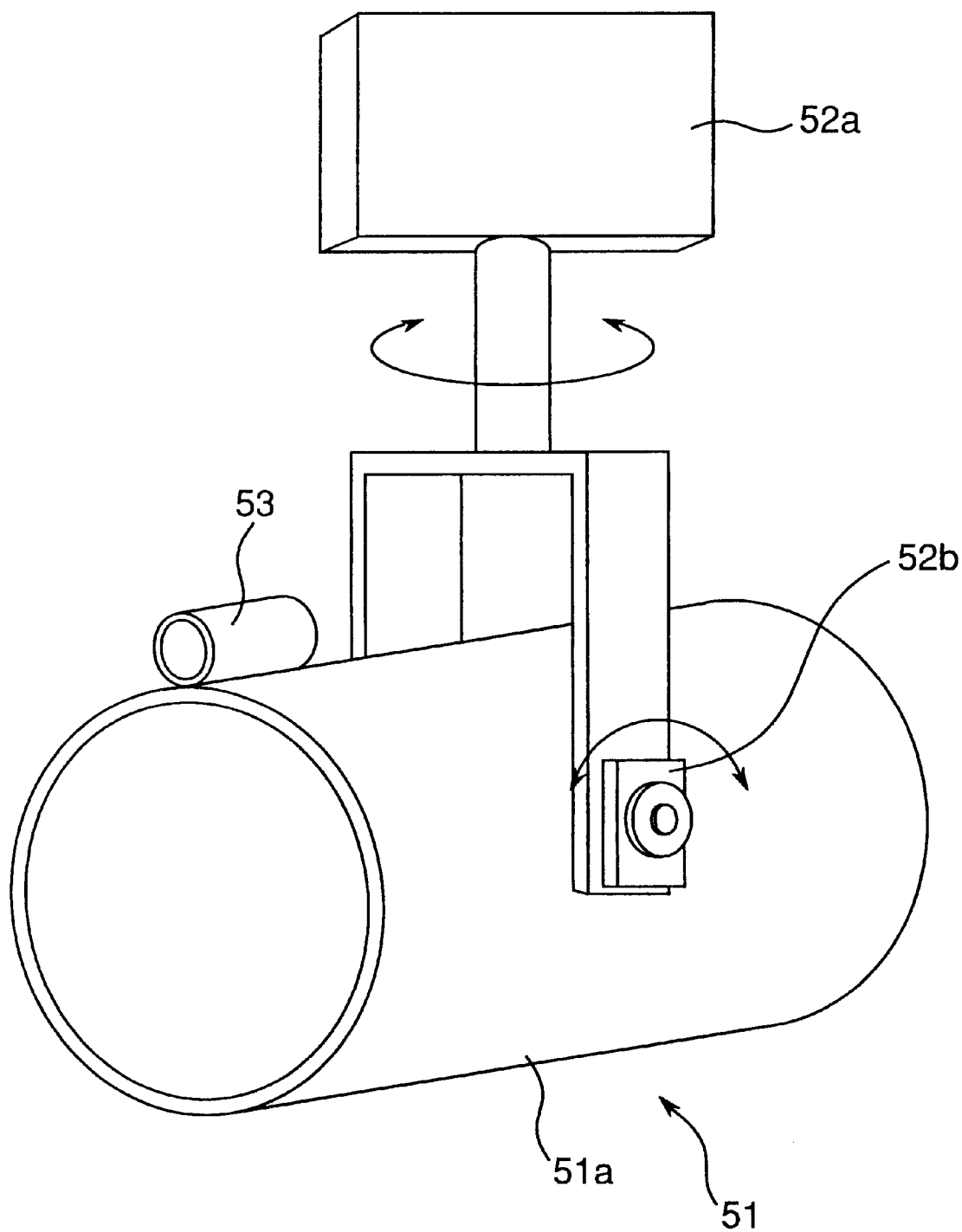
FIG. 19 is a perspective view of a lighting fixture, an image pickup means and a drive section.
Figure 20:
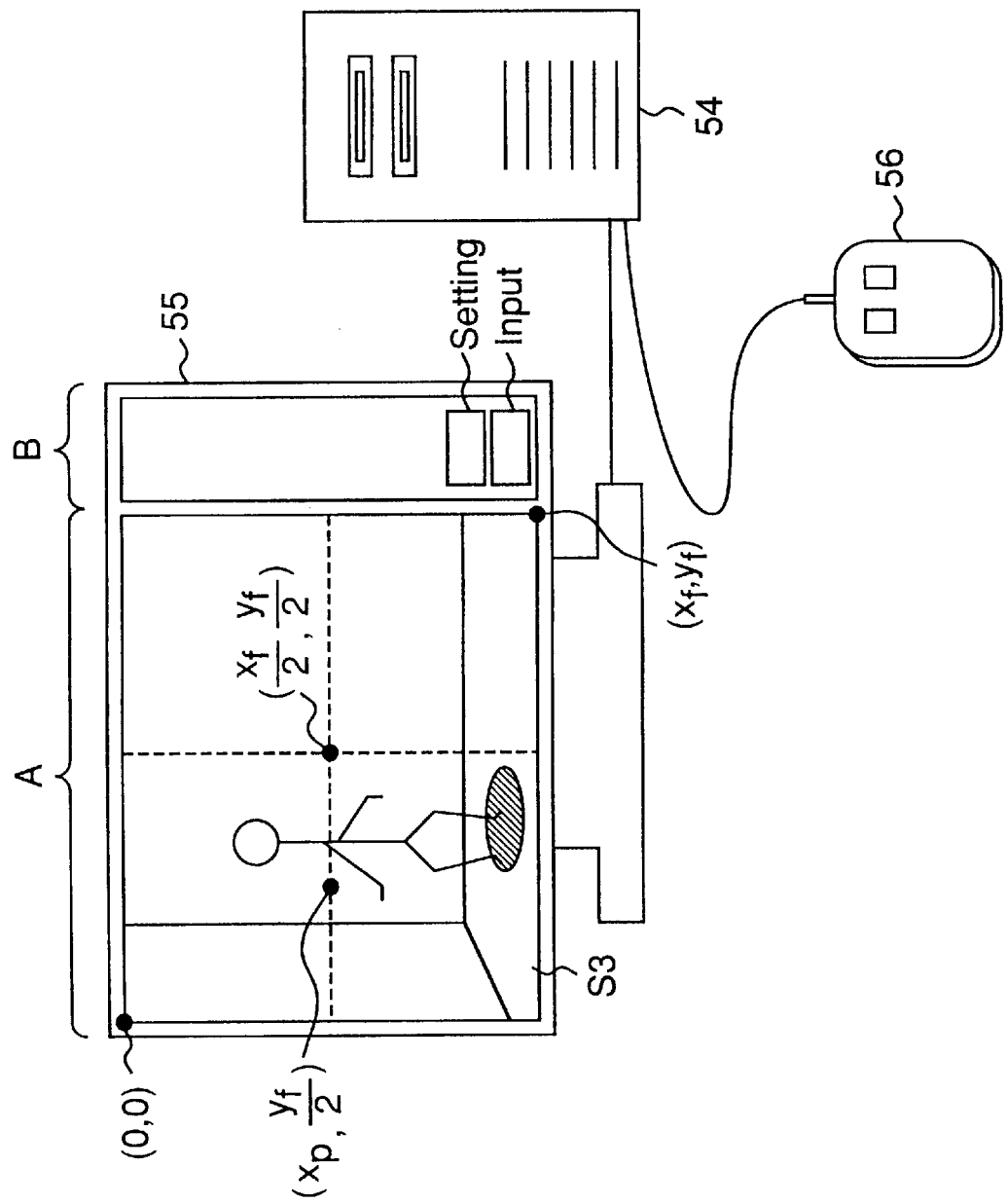
FIG. 20 is a front view for explaining a display device and a display image.
Figure 21:
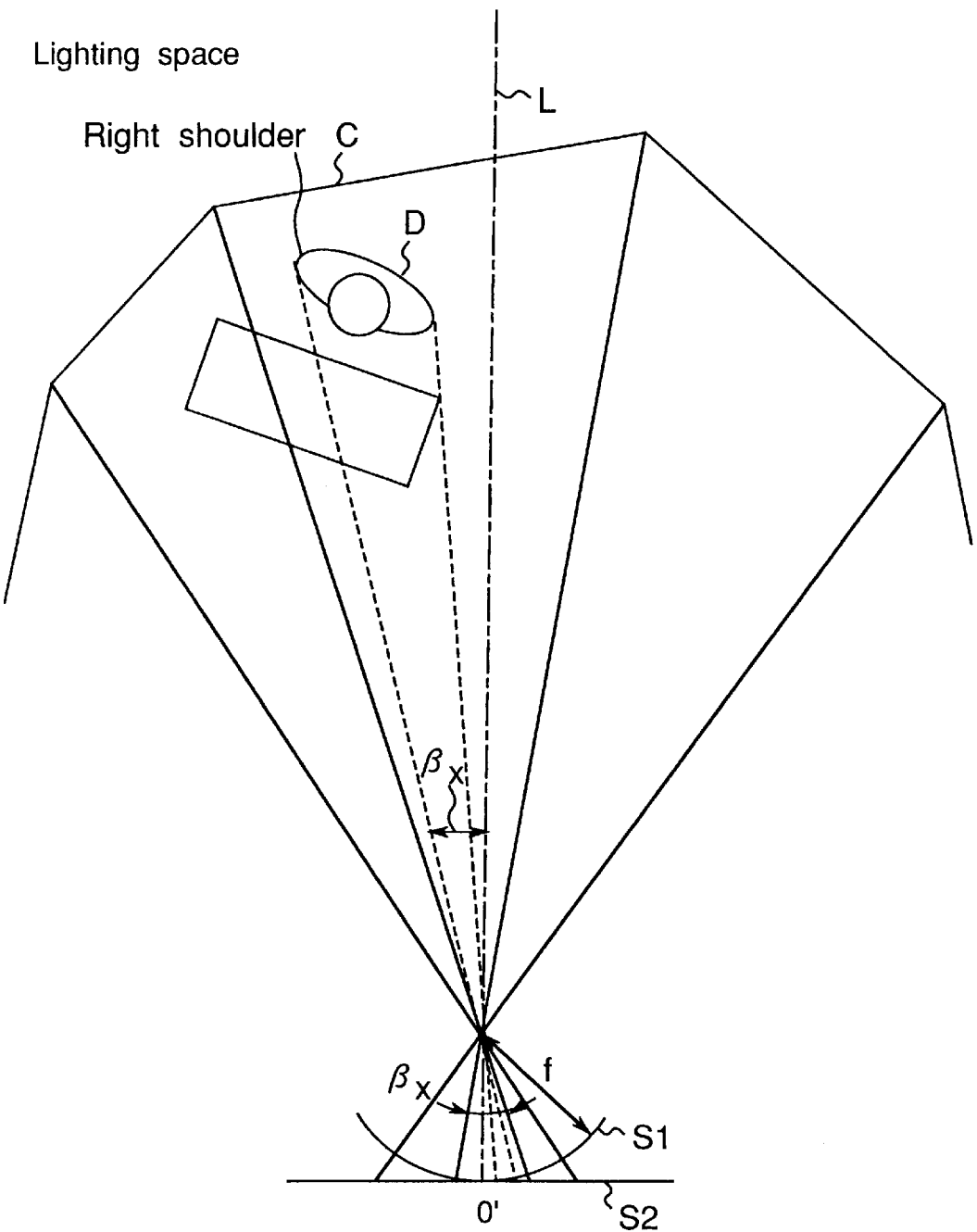
FIG. 21 is an explanatory view for explaining a relation between a lighting space and a projection plane.
Figure 22:
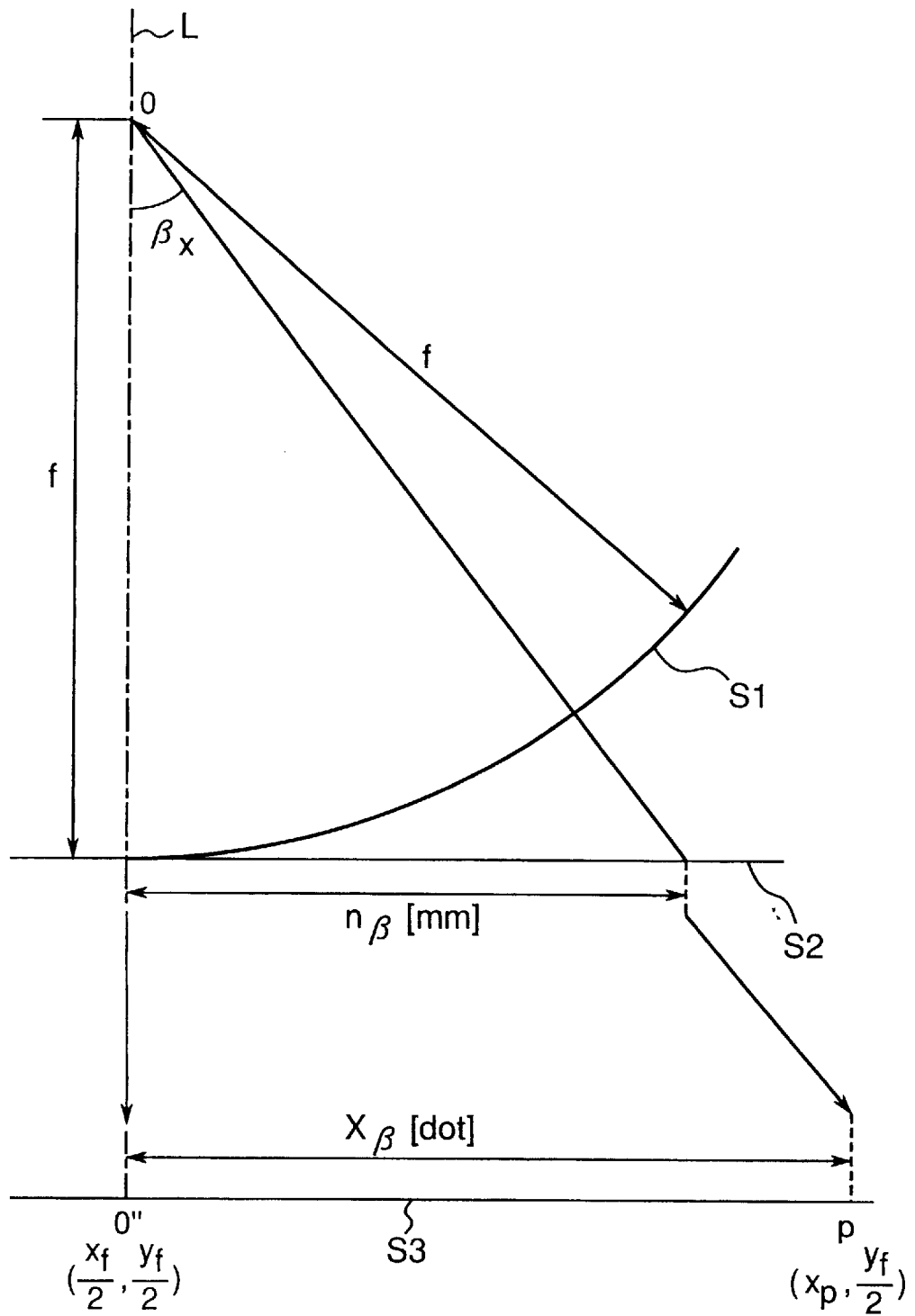
FIG. 22 is an explanatory view for explaining a relation between the projection plane and the display image.

FIG. 18 is a schematic view for explaining the construction of a lighting controller. FIG. 19 is a perspective view of a lighting fixture, an image pickup means and a drive section. FIG. 20 is a front view for explaining a display device and a display image. FIG. 21 is an explanatory view showing a relation between a lighting space and a projection plane. FIG. 22 is an explanatory view showing a relation between the projection plane and the display image. FIG. 23 is front view of a display image for explaining a setting method of a constant of proportionality.

In FIG. 18, the reference numeral 51 denotes a lighting fixture. The lighting fixture 51 has a light source 51b in its light body section 51a and operates to radiate light onto a stage or the like.

A drive section 52a is to pivot the lighting fixture 51 in a panning direction, while a drive section 52b is to pivot the lighting fixture 51 in a tilting direction. The drive sections 52a and 52b execute driving based on a drive signal inputted from a central processing unit 54 described later. The lighting fixture 51 and the drive sections 52a and 52b are provided at a hind portion or the like in the room of a stage facility.

As shown in FIG. 19, a camera 53 which serves as an image pickup means is fixed to the outer side surface of the light body section 51a of the lighting fixture 51 so that its image pickup direction is arranged parallel to the lighting direction of the lighting fixture 51, and it is provided by a CCD camera of NTSC system in the present embodiment. The camera 53 picks up an image in an image pickup region continuously at specified time intervals of $\frac{1}{30}$ sec or $\frac{1}{10}$ sec and outputs the pickup image to the central processing unit 54. The camera 53 is constituted with a single or a plurality of lenses, and the focal distance of the camera 53 is known.

The central processing unit 54 has an image input display section 54a, a pivoting quantity calculating section 54b and a constant calculating section 54c. According to the present embodiment, a personal computer having a video board for inputting a signal of NTSC system inserted in its expansion slot is used as the central processing unit 54.

The image input display section 54a outputs the pickup image inputted from the camera 53 to the display device 55 so as to display the image on the display screen.

The display device 55 is provided by a CRT display or the like, and as shown in FIG. 20, it displays a pickup image displaying section A for displaying a display image S3 described later and an operating image section B for operating the lighting controller.

An input device 56 is a pointing device such as a mouse or joystick for moving a mouse cursor displayed on the display device 55. Designation of operation to the lighting controller is executed by locating the mouse cursor on an icon in the operating image section B or the display image S3 displayed in the pickup image displaying section A on the display screen and clicking the input device 56. Further, the display image S3 corresponds to an image storage region on a memory (not shown) of the central processing unit 54, where, for example, one pixel corresponds to one byte.

When an operator designates and clicks a point on the display image S3 in the pickup image displaying section A of the display device 55 by means of the input device 56, the pivoting quantity calculating section 54b calculates the quantity of pivoting around the pan axis and the quantity of pivoting around the tilt axis of the lighting fixture 51 so that light is applied to the position in the real space indicated by the clicked position on the image, and outputs the quantities of pivoting as drive signals to the drive sections 52a and 52b. The constant calculating section 54c calculates the constant of proportionality for use in calculating the quantity of pivoting.

The input device 56 and the display device 55 are connected to the central processing unit 54, and the central processing unit 54 is connected to the drive sections 52a and 52b. The camera 53 is connected to the central processing unit 54.

Next, a method for calculating the quantity of pivoting around the pan axis and the quantity of pivoting around the tilt axis of the lighting fixture 51 such that a center point (referred to as a lighting point hereinafter) of an area on which the lighting fixture 51 radiate light coincides with the designated point when the operator designates a point on the display image S3 will be described with reference to FIGS. 21 and 22.

FIG. 21 shows a plane view viewed from above a space of a stage or the like in which a wall C and a person D or an object on which light is radiated exist (the space referred to as a lighting space hereinafter).

Each point of the lighting space picked up by the camera 53 is converged on a point O (a position in the camera 53) and projected on an ideal image pickup plane S1 having a radius f located apart by a focal distance f from the point O. The image projected on the ideal image pickup plane S1 is further projected on a projection plane S2 existing on the surface of the CCD of the camera 53. As shown in FIG. 22, the image projected on the projection plane S2 is further displayed on the display image S3 in the pickup image displaying section A of the display device 55 as expanded or reduced at a specified ratio. Then, a ratio of the size of the image in the projection plane S2 to the size of the image in the display image S3 of the display device 55 is assumed to have conversion ratios $k_x$ and $ky$ corresponding to the constant of proportionality. The conversion ratios $k_x$ and $ky$ will be described later.

In regard to the above-mentioned relation between the lighting space, the ideal image pickup plane S1, the projection plane S2 and the display image S3, the image of the right shoulder of the person D making an angle $\beta_x$ with the optical axis L about the point O is made to pass through the point O and the ideal image pickup plane S1, projected in a position located apart by $n_\beta$ [mm] from the origin O' in the projection plane S2 and further displayed in a position located apart by $x_\beta$ [dot] from the origin O" as multiplied by $k_x$ in the display image S3. The origin O' is the center position of the projection plane S2 and the origin O" is the center position of the display image S3, the origin O' and the origin O" corresponding to the lighting point in the lighting space. Further, as shown in FIG. 20, the upper left-hand coordinates of the display image S3 are (0, 0), the lower right-hand coordinates are ($x_f$, $y_f$), and the center coordinates of the origin O" of the screen are ($x_f/2$, $y_f/2$).

Assuming that, for example, a point P($x_p$, $y_f/2$) on the display image S3 of the display device 55 is designated by the operator as shown in FIG. 20, then a relative distance $x_\beta$ between the origin O" of the display image S3 and the designated point P in FIG. 22 can be obtained as follows. It is to be noted that the relative distance expresses a relative relation by attaching a positive or negative sign to the absolute distance between both points.

$$x_\beta = x_p - \left(\frac{x_f}{2}\right)$$

Assuming that the conversion ratio $k_x$ in the x-direction is known, then from the conversion ratio $k_x$ and the relative distance $x_\beta$ on the display image S3, the corresponding relative distance $n_\beta$ of both points on the projection plane S2 can be obtained from $$n_\beta = \left(\frac{1}{k_x}\right) x_\beta$$

From the above, the pivoting quantity $\beta_x$ around the pan axis for pivoting the lighting direction of the lighting fixture 51 from the current position to a position in the lighting space corresponding to the point P on the display image S3 is as follows.

$$\beta_x = \tan^{-1}\left(\frac{n_\beta}{f}\right) \quad (1)$$

$$= \tan^{-1}\left(\frac{x_\beta}{k_x \cdot f}\right)$$

The above has explained the relation between the pan axis pivoting quantity $\beta_x$ in the x-direction and the relative distance $x_\beta$ in the horizontal direction from the origin O" on the display image S3. However, a relation between the tilt axis pivoting quantity in the y-direction and the relative distance in the vertical direction on the display image S3 is similar to the above.

Next, a method for calculating the conversion ratios $k_x$ and $k_y$ in the constant calculating section 54c will be described with reference to FIG. 23. The conversion ratios $k_x$ and $k_y$ are values depending on the focal distance f. However, the focal distance f is constant unless it is altered, and therefore, it is normally calculated in the initial setting stage before starting the operation of the lighting controller.

Figure 23A:
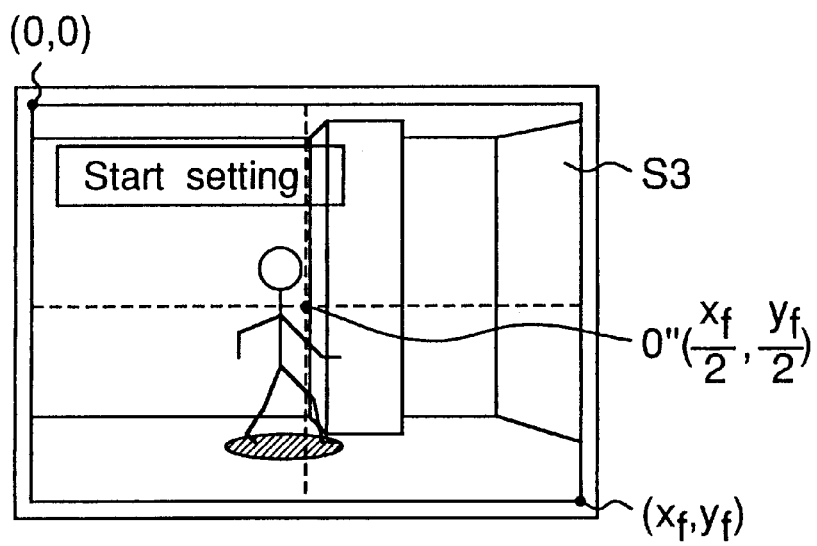
FIGS. 23A an 23B are front views of a display image for explaining a setting method of a constant of proportionality.
Figure 23B:
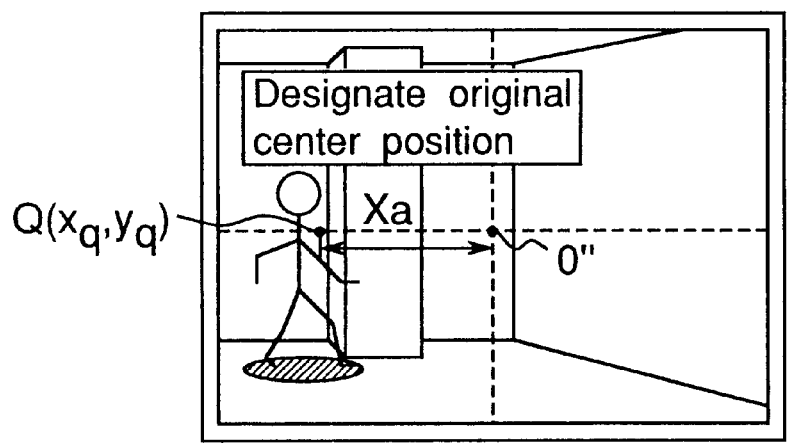

First, the constant calculating section 54c pivots the pan axis of the lighting fixture 51 by a predetermined pivoting quantity $\alpha_x$. Then, the image picked up by the camera 53, which has been a display image S3 as shown in FIG. 23A before the pivoting, becomes a display image S3 as shown in FIG. 23B as a result of the pivoting of the camera 53 consequent upon the pivoting of the lighting fixture 51 by the pivoting quantity $\alpha_x$ around the pan axis.

Then, the constant calculating section 54c requires the operator to make an input for indicating the place where the point on the image, which has been displayed at the origin O" on the display image S3 before the pivoting by the pivoting quantity $\alpha_x$, is displayed after the pivoting. That is, in FIG. 23A before the pivoting, the origin O" has indicated a point displaced slightly to the right-hand side of the neck of the person, and the point that has been displayed at the origin O" is displaced on the left-hand side of the origin O" in FIG. 23 B. Therefore, the operator points by means of the input device 56 a point Q($x_q$, $y_q$) displaced slightly to the right-hand side of the neck of the person displayed on the left-hand side of the origin O". It is to be noted that the camera 53 pivots around only the pan axis in this case, and therefore, $y_q$ does not change to remain ($y_f/2$).

Then, the conversion ratio $k_x$ is obtained from the pivoting quantity $\alpha_x$, the relative distance between the origin O" and the point Q on the display image S3 and the focal distance f as follows.

First, a relative distance $x_\alpha$ between the origin O" and the point Q on the display image S3 is as follows.

$$x_\alpha = x_q - \left(\frac{x_f}{2}\right) \quad (2)$$

Further, the pivoting quantity αx corresponds to the angle $\beta_x$ shown in FIG. 22, and a relative distance $n_\alpha$ corresponds to the relative distance $n_\beta$ shown in FIG. 22. Therefore, from the relative distance $n_\alpha$ [mm] on the projection plane S2 corresponding to the relative distance $x_\alpha$ [dot] on the display image S3, the focal distance f and the pivoting quantity $\alpha_x$, the conversion ratio $k_x$ is derived as follows.

$$k_x = \frac{x_\alpha}{n_\alpha} \quad (3)$$

$$n_\alpha = f \cdot \tan\alpha_x$$

$$k_x = \frac{x_\alpha}{f \cdot \tan\alpha_x}$$

The constant calculating section 54c calculates and holds the value. The constant calculating section 54c also pivots the lighting fixture 1 by a pivoting quantity $\alpha_y$ around the tilt axis to calculate and hold the conversion ratio $k_y$ similarly to the pivoting around the pan axis.

$$k_y = \frac{y_\alpha}{f \cdot \tan\alpha_y} \quad (4)$$

That is, by pivoting the lighting fixture 1 and the camera 53 around the pan axis or the tilt axis by the predetermined quantity of pivoting and obtaining how much the identical point in the lighting space has moved through the pivoting on the display image S3, the conversion ratios $k_x$ and $k_y$ that represent the relations between the quantity of pivoting, the relative distance on the projection plane S2 and the relative distance on the display image S3 can be obtained.

Next, the operation of the lighting controller constructed as above will be described separately for the initial setting stage and the operating stage.

In the initial setting stage, the image picked up by the camera 53 at regular time intervals is displayed as the display image S3 in the pickup image displaying section As shown in FIG. 20, and the operator operates the operating image section B in the display device 55 shown in FIG. 20 so as to provide a setting mode of the conversion ratios $k_x$ and $k_y$. The constant calculating section 54c firstly pivots the pan axis by the pivoting quantity $\alpha_x$ and requires the operator to input the place where the point on the image, which has been displayed at the origin O" on the display image S3 before the pivoting by the pivoting quantity $\alpha_x$, is displayed after the pivoting. When the operator clicks the position by means of the input device 56 on the display image S3 in the pickup image displaying section A, the relative distance between the origin O" and the clicked position can be found, and therefore, the conversion ratio $k_x$ concerning the x-direction is calculated from the relative distance and the pivoting quantity $\alpha_x$.

Next, the constant calculating section 54c pivots the tilt axis by the pivoting quantity $\alpha_y$ and requires the operator to input the place where the point on the image, which has been displayed at the origin O" on the display image S3 before the pivoting by the pivoting quantity $\alpha_y$, is displayed after the pivoting. When the operator clicks the position by means of the input device 56 on the display image S3 in the pickup image displaying section A shown in FIG. 20, the relative distance between the origin O" and the clicked position can be found, and therefore, the conversion ratio $k_y$ concerning the y-direction is calculated from the relative distance and the pivoting quantity $\alpha_y$.

The constant calculating section 54c calculates the conversion ratios $k_x$ and $k_y$ as described above, and the conversion ratios $k_x$ and $k_y$ are used for subsequent calculation of the pivoting quantity calculating section 54b.

The operation of the lighting controller in the operating stage will be described next.

In the operating stage, the image picked up by the camera 53 at regular time intervals is displayed as the display image S3 in the pickup image displaying section A shown in FIG. 20, and the origin O" that is the center of the display image S3 corresponds to the lighting point. When the operator clicks the desired position on the display image S3 by means of the input device 56, the pivoting quantity calculating section 54b calculates the relative distances in the x-direction and the y-direction between the inputted position and the origin O" and calculates the quantity of pivoting around the pan axis and the quantity of pivoting around the tilt axis by substituting the distances into Equations (5) and (6). Then, the pivoting quantity calculating section 54b outputs drive signals having the quantities of pivoting as the contents to the drive sections 52a and 52b, and the drive sections 52a and 52b drive the lighting fixture 51 based on the drive signals, thereby pivoting the lighting fixture 51 around the pan axis and the tilt axis.

As described above, in the operating stage, when the operator designates and clicks a point on the display image S3 of the display device 55 by means of the input device 56, the quantities of pivoting around the pan axis and the tilt axis are calculated so that the position comes into the center position of the display image S3, thereby pivoting the lighting fixture 1. Then, the lighting fixture 51 floodlights the position and its periphery in the lighting space corresponding to the position on the display image S3 designated by the input device 56.

SIXTH EMBODIMENT

Figure 24:
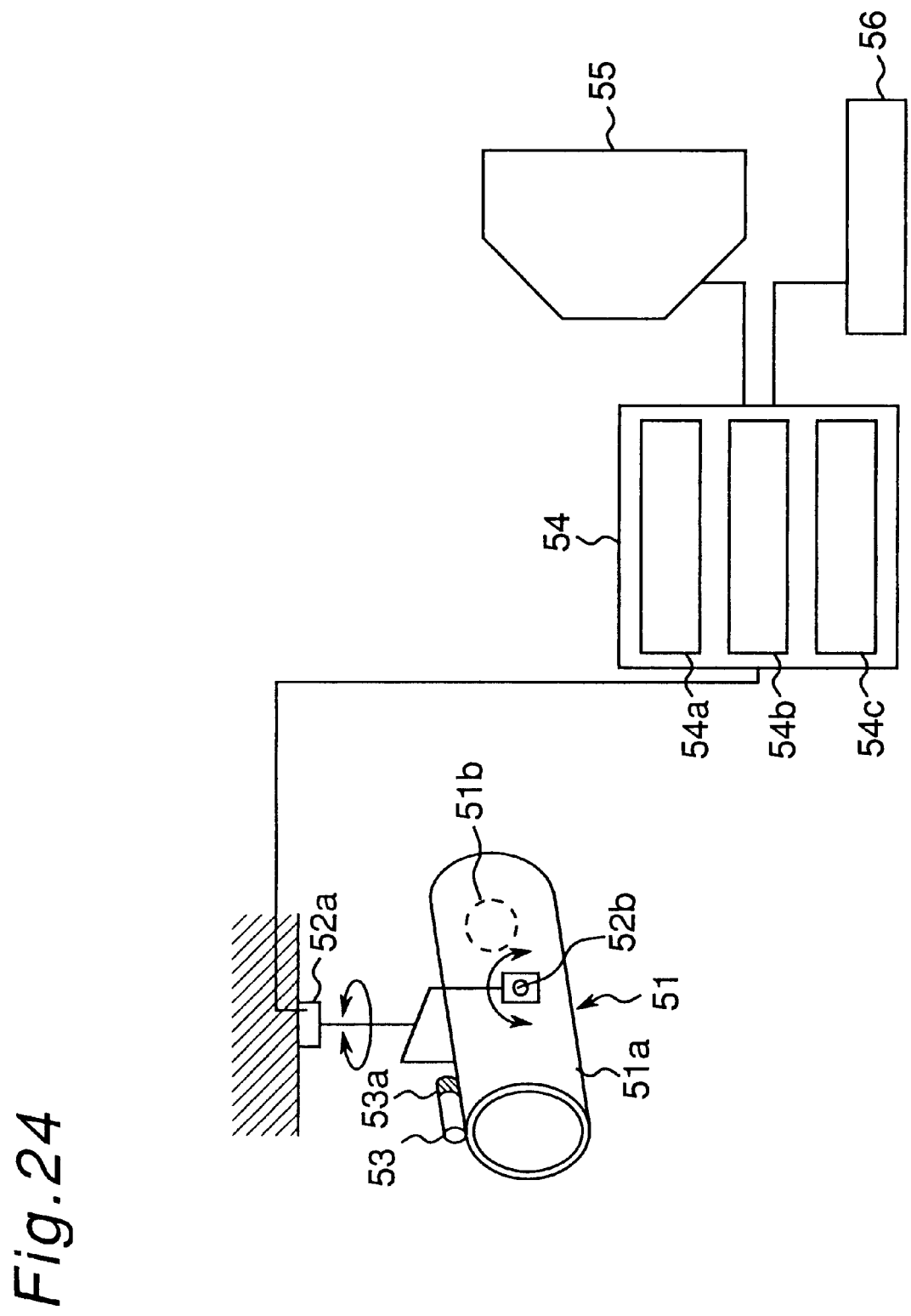
FIG. 24 is a schematic view for explaining the construction of the sixth embodiment of the lighting controller of the present invention.

FIG. 24 is a schematic view showing a lighting controller. FIG. 25 is a front view showing a display device and a display image. It is to be noted that the components equivalent to those of the lighting controller described in connection with the aforementioned fifth embodiment are denoted by the same reference numerals in FIG. 24, and therefore, no detailed description is provided for the equivalent components. The points that the lighting controller of the present second embodiment differs from the lighting controller described in connection with the aforementioned fifth embodiment and is characteristic are the following constructions.

That is, the first characteristic construction is the provision of a focal distance changing means 53a capable of changing the focal distance of the camera 53.

The second characteristic construction is as follows. The constant calculating section 54c holds only one set of conversion ratios in the fifth embodiment, and the conversion ratios vary depending on the focal distance and the like. Therefore, according to the sixth embodiment, a plurality of conversion ratios corresponding to focal distances are held and selectively used by the operator.

Figure 25:
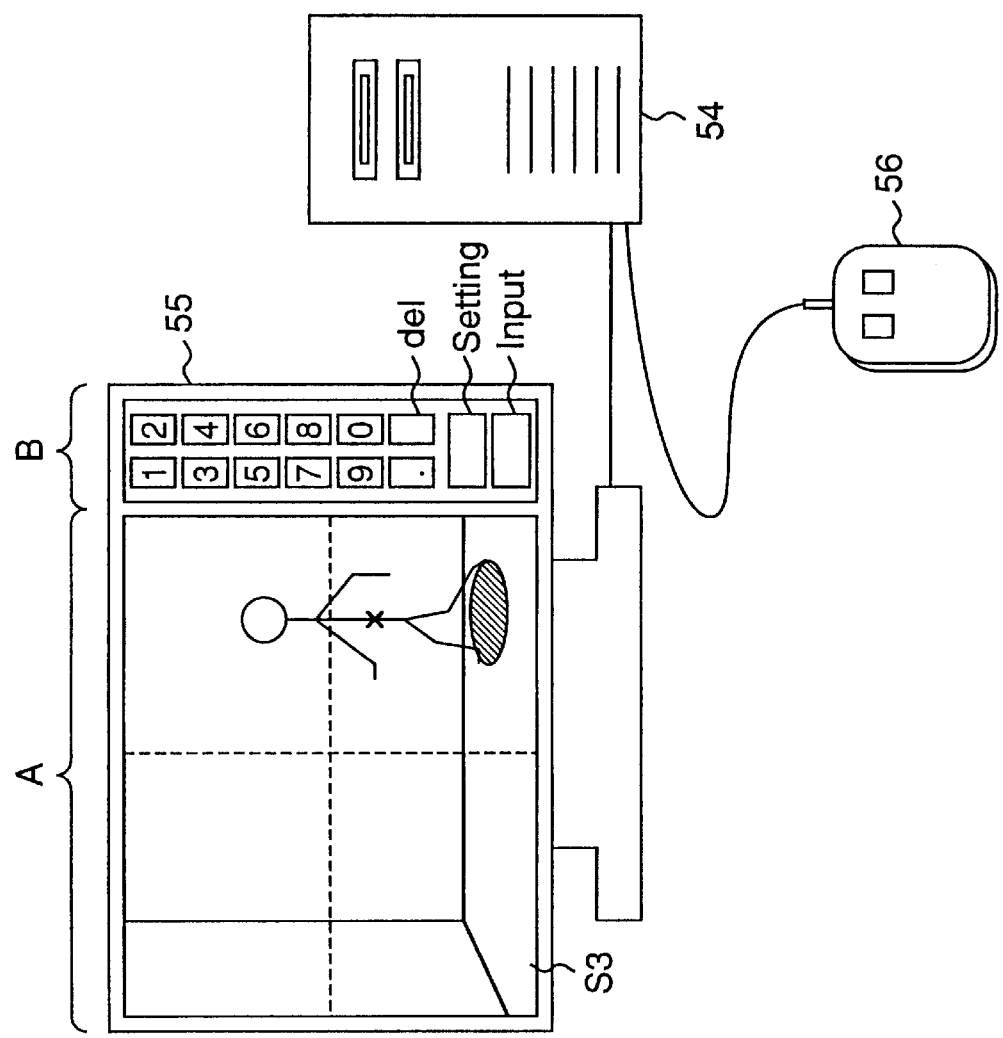
FIG. 25 is a front view for explaining a display device and a display image.

The third characteristic construction is to display icons representing numbers in the operating image section B as shown in FIG. 25 and select a focal distance corresponding to each number by selecting an icon, thereby allowing the conversion ratio corresponding to the lens to be set and selected.

In the lighting controller having the above construction, the conversion ratio is set according to the focal distance in the initial setting stage, and the control of the lighting position can be executed while appropriately selecting the focal distance in the operating stage. Therefore, by increasing the focal distance, an image in a narrow range can be picked up and displayed to the full extent on the display image S3, so that the target lighting position can be more finely designated by the input device 56. Furthermore, by reducing the focal distance, an image in a wide range can be picked up and displayed on the display image S3, so that the operator can designate the target lighting position while viewing the view in the wide range although the position designation accuracy is lowered.

SEVENTH EMBODIMENT

Figure 26:
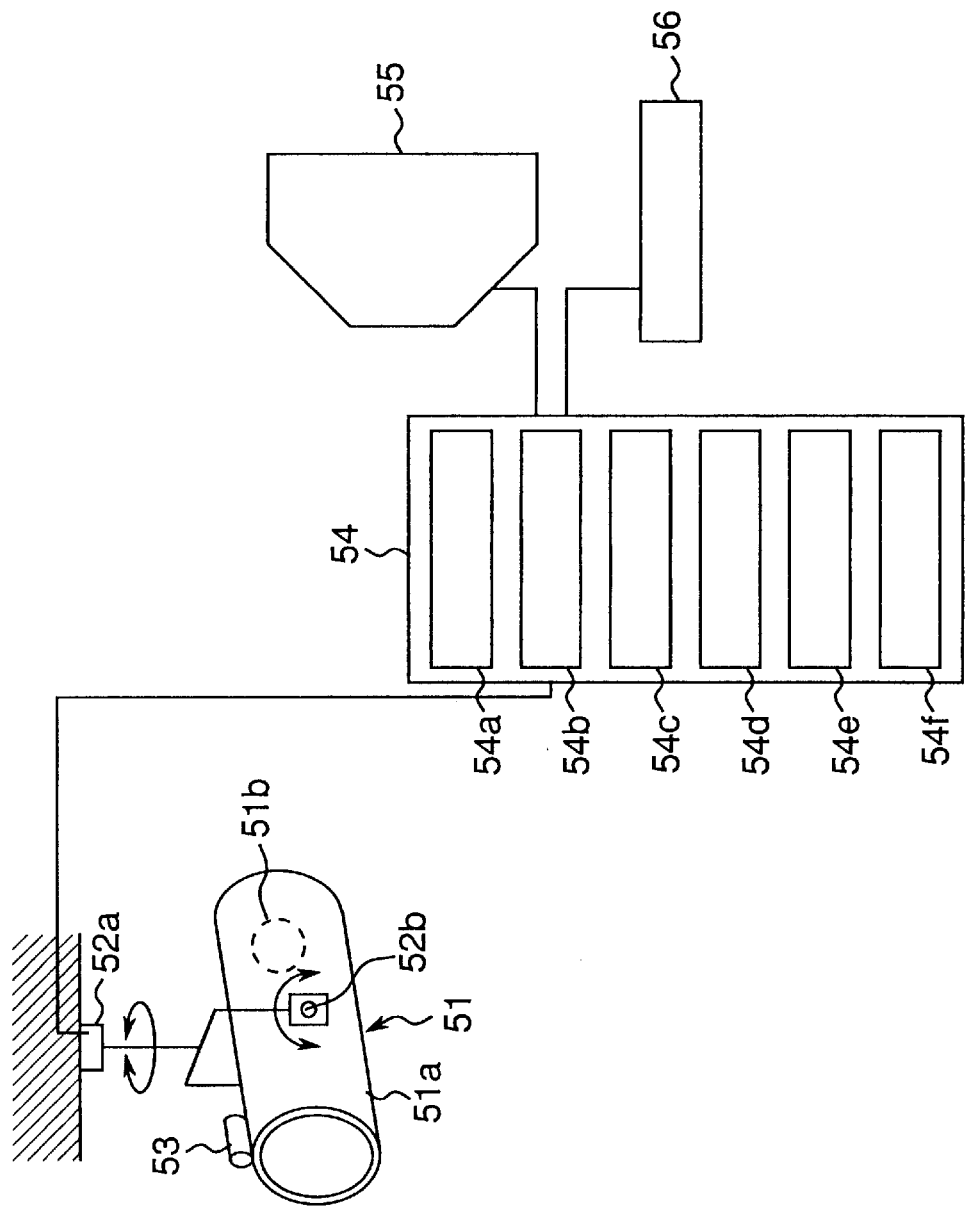
FIG. 26 is a schematic view for explaining the construction of the seventh embodiment of the lighting controller of the present invention.

FIG. 26 is a schematic view showing a lighting controller. FIG. 27 is a front view of a display image. It is to be noted that the components equivalent to those of the lighting controller described in connection with the aforementioned fifth embodiment are denoted by the same reference numerals in FIG. 26, and therefore, no detailed description is provided for the equivalent components. The point that the lighting controller of the present third embodiment differs from the lighting controller described in connection with the aforementioned fifth embodiment and is characteristic is the following construction.

The characteristic construction is the provision of an image extracting means 54d, a searching means 54e and a post-pivoting position calculating means 4f in the central processing unit 54.

Figure 27A:
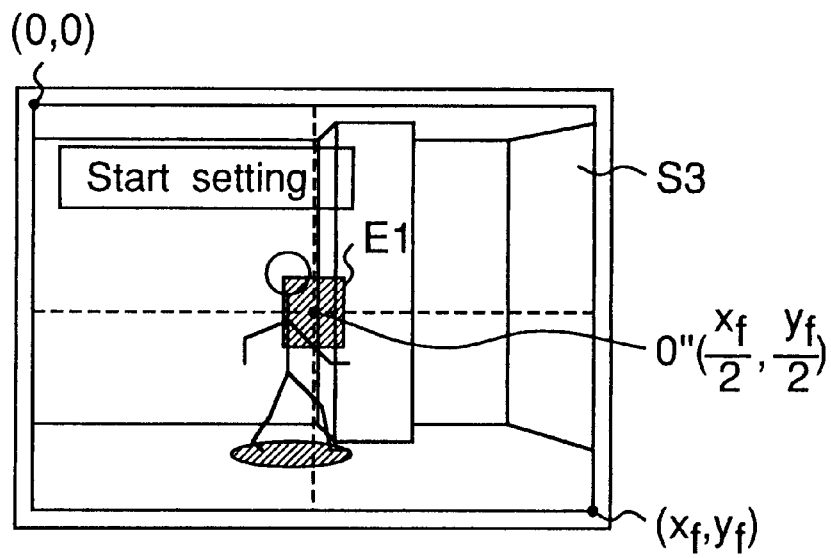
FIGS. 27A and 27B are front views of a display image for explaining a calculating method of the position of a specified point in a lighting space obtained after pivoting a lighting fixture on the display image.

The image extracting means 54d extracts and stores from the display image S3 an image E1 in a specified area centered about the origin O" of the display image S3 as shown in FIG. 27A before the constant calculating section 54c pivots the lighting fixture 51 in calculating the conversion ratios $k_x$ and $k_y$ in the constant calculating section 54c.

Figure 27B:
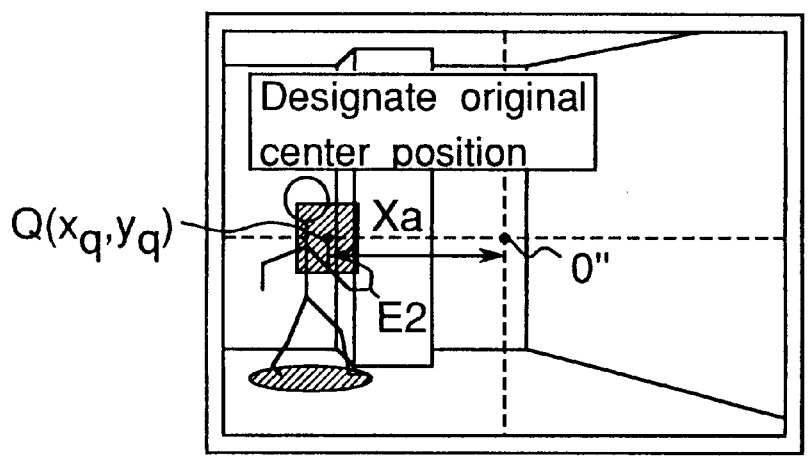

The searching means 54e searches by pattern matching an area of an image E2 approximate to the image E1 in the specified area extracted from the display image S3 obtained after the constant calculating section 54c has pivoted the lighting fixture 51 by the pivoting quantity $\alpha_x$ or the pivoting quantity $\alpha_y$ as shown in FIG. 27B.

The post-pivoting position calculating means 54f calculates the center point $Q(x_q, y_q)$ of the searched area and outputs the same to the constant calculating section 54c.

Therefore, the constant calculating section 54c calculates the conversion ratios $k_x$ and $k_y$ from the relative distance between the origin O" on the display image S3 and the point Q calculated by the post-pivoting position calculating means 54f and the pivoting quantities $\alpha_x$ and $\alpha_y$. Therefore, the operator is not required to input the place where the point on the image, which has been displayed at the origin O" on the display image S3 before the pivoting of the lighting fixture 51, is displayed after the pivoting, so that the conversion ratios $k_x$ and $k_y$ can be easily set.

When the conversion ratio $k_x$ expressed by Equation (3) is substituted into Equation (1), there is derived $$\beta_x = \tan^{-1}\left(\frac{x_\beta}{k_x \cdot f}\right) \quad (5)$$

$$= \tan^{-1}\left(\frac{x_\beta}{\left(\frac{x_\alpha}{f \cdot \tan\alpha_x}\right) \cdot f}\right)$$

$$= \tan^{-1}\left(x_\beta \cdot \frac{\tan\alpha_x}{x_\alpha}\right)$$

The above is an equation including neither the focal distance f nor the conversion ratio $k_x$. Then, as shown in FIG. 22, the Equation (5) means the equation for obtaining the pivoting quantity $\beta_x$ in moving the lighting direction by $x_\beta$ [dot] in the x-direction on the display image S3. Similarly, in the y-direction, the following equation is derived.

$$\beta_y = \tan^{-1}\left(y_\beta \cdot \frac{\tan\alpha_y}{x_\alpha}\right) \quad (6)$$

Therefore, the constant calculating section 54c may calculate $\tan\alpha_y/x_\alpha$ in Equation (5) and $\tan\alpha_y/y_\alpha$ as constants, hold the values and calculate the quantity of pivoting of the lighting fixture 51 by means of the values instead of the focal distance f and the conversion ratios $k_x$ and $k_y$. When this an arrangement is adopted, the calculation is executed without using the focal distance, and therefore, a camera 3 of which focal distance is unknown can be used.

Furthermore, according to the present embodiment, the lighting fixture 1 and the camera 3 are pivoted once by the pivoting quantities of αx and αy degrees around the pan axis or the tilt axis in calculating the conversion ratios kx and ky, and a correspondence with the instantaneously changed distance of the position of one point on the display image S3 is provided. However, this arrangement is not limitative, and it is acceptable to obtain the conversion ratios kx and ky by making them pivot a plurality of times and making the sum total of the quantities of pivoting correspond to the sum total of the relative distances of change on the display image S3.

Furthermore, according to the present embodiment, the values obtained by the aforementioned method are used as the conversion ratios $k_x$ and $k_y$. However, the ratios are not limited to the values, and they may be, for example, a function for correcting a distortion generated between the ideal image pickup plane S1 and the projection plane S2. With this arrangement, the display image S3 becomes distortion free even in its peripheral portions, thereby allowing a more correct position to be designated.

Furthermore, according to the description of the present embodiment, a CRT display is used as the display device 55, and a mouse, joystick or the like is used as the input device 56. However, they are not limited to these devices, and it is acceptable to use, for example, a liquid crystal display as the display device 55 and use a touch panel as the input device 56. In this case, the arrangement has the advantage that the entire apparatus can be compacted.

Furthermore, according to the description of the present embodiment, the searching means 54e uses the pattern matching method in searching the area approximate to the image E1 in the specified area from the display image S3 obtained after the pivoting of the lighting fixture 51. However, the method is not limited to the pattern matching, and it is only required to be a method for searching an area approximate to the image E1. Therefore, it is acceptable to extract the characteristic quantity of the image E1 and search the area to be approximated paying attention to the characteristic quantity.

EIGHTH EMBODIMENT

Figure 28:
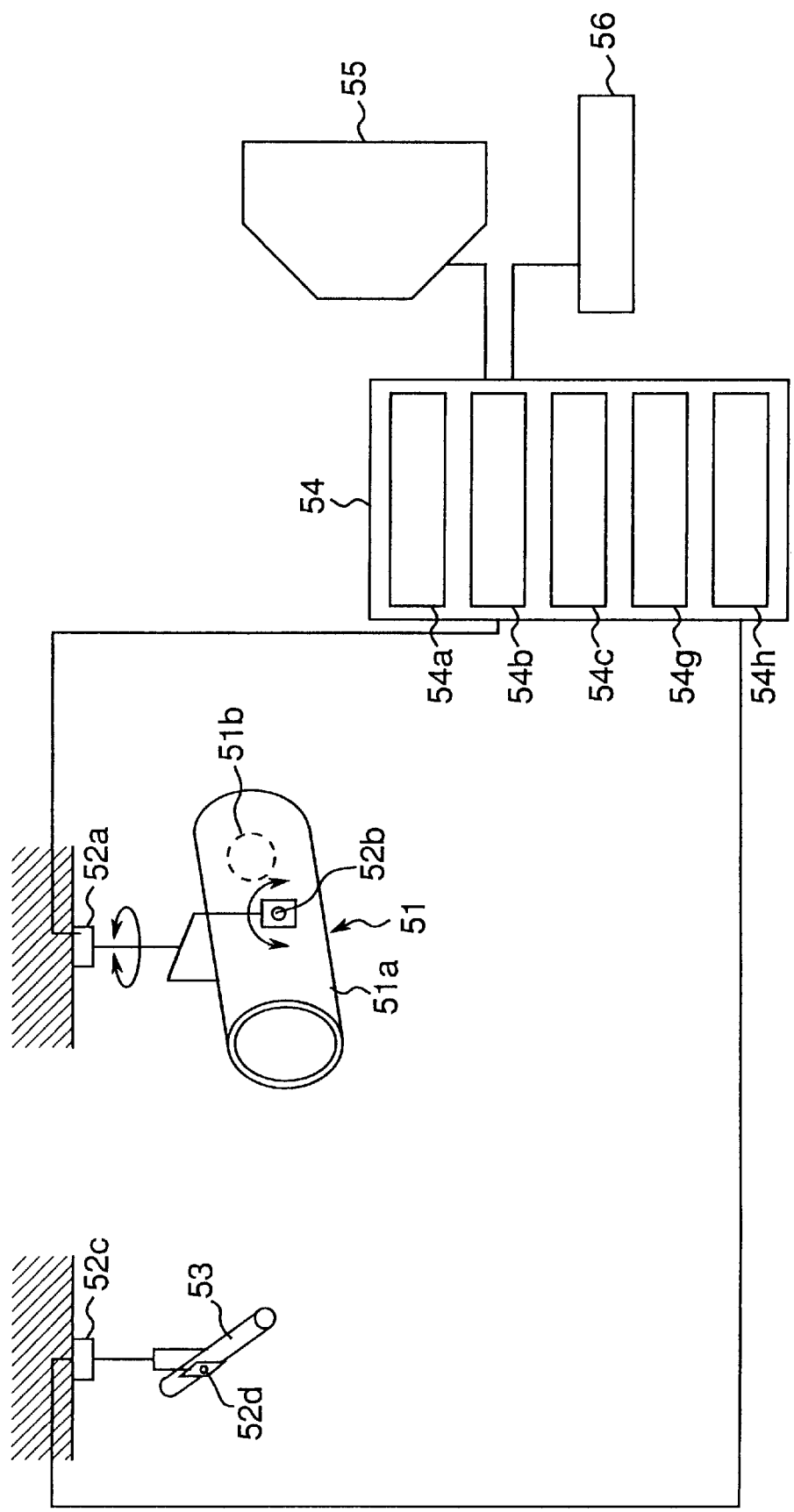
FIG. 28 is a schematic view for explaining the construction of the eighth embodiment of the lighting controller of the present invention.

FIG. 28 is a schematic view showing a lighting controller in accordance with the eighth embodiment of the present invention. It is to be noted that the components equivalent to those of the lighting controller described in connection with the aforementioned fifth embodiment are denoted by the same reference numerals in FIG. 26, and therefore, no detailed description is perform for the equivalent components.

In the embodiments shown in FIGS. 18, 24 and 26, the image pickup means 53 is mounted to the outer surface of the body 51a of the lighting fixture 51 parallel to the optical axis of light radiated from the lighting fixture 51, while, in this embodiment, as shown in FIG. 28, the image pickup means 53 and the lighting fixture 51 being pivotable respectively are provided separately each other.

The lighting controller shown in FIG. 28 comprises; drive sections 52c, 52d for pivoting the image pickup means 53 aroud a pan axis (in the horizontal direction) and a tilt axis (in the vertical direction) respectively; a direction calculating section 54g for calculating a horizontal angle and a vertical angle of the image pickup means 53 by calculating a quantity of pivoting of the image pickup means 53; and a coordinate calculating section 54h for calculating a coordinate of the target to be lighted based on the calculation result of the direction calculating section 54g and outputting tha calculation result of the coordinate into the pivoting quantity calculating section 54b.

The operation of this lighting controller will be described with reference to FIGS. 12 and 13, as follows. Now, the lighting fixture 51 and the image pickup means 53 are corresponding to the spotlight 1 and the CCD camera 4 in FIGS. 12 and 13 respectively.

Figure 12:
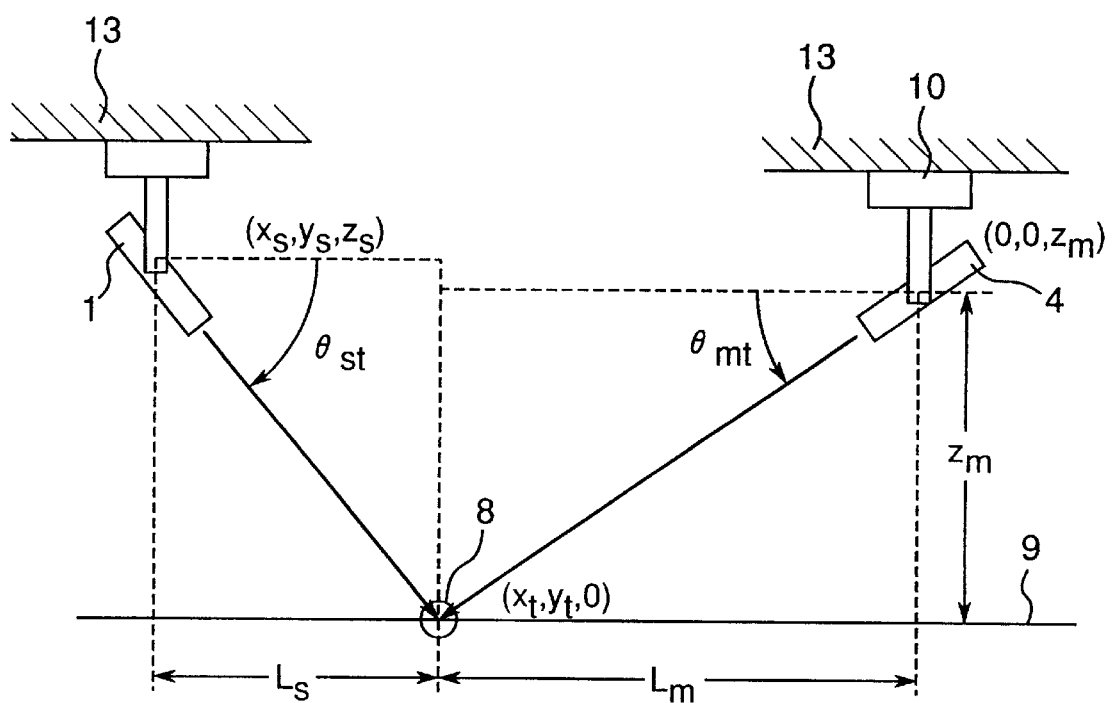
FIG. 12 is a side view showing a positional relation between the above automatic tracking lighting equipment and a target to be lighted.

A horizontal angle $\theta_{mp}(t)$ and a vertical angle $\theta_{mt}(t)$ of the image pickup means 53 are angles from the y-axis direction shown in FIG. 12 and the horizontal direction shown in FIG. 13 served as a reference, and those values are obtained by the direction culculating section 54g being input from the input device 56.

As shown in FIG. 13, when the lighting fixture 51 and the image pickup means 53 are projected on the floor surface of the lighting space 9, a distance $L_m$ from a point (0, 0, 0) at which the image pickup means 53 is projected on the floor surface to the target to be lighted 8 can be expressed by means of the vertical angle $\theta_{mt}(t)$ of the image pickup means 53 by the following equation.

$$L_m = z_m/\tan(\theta_{mt}(t))$$

Further, the coordinates $(x_t, y_t, 0)$ of the target to be lighted 8 can be expressed by the following equations. The coordinate of the target is calculated by the coordinate calculating section 54h and output into the pivoting quantity calculating section 54b.

$$x_t = L_m \cdot \cos(\theta_{mp}(t))$$

$$y_t = L_m \cdot \sin(\theta_{mp}(t))$$

In this case, assuming that the coordinates of the lighting fixture 51 are $(x_s, y_s, z_s)$, then the coordinates of the target to be lighted 8 viewed from the lighting fixture 51 become $(x_t-x_s, y_t-y_s, -z_s)$, and a distance $L_s$ from a point $(x_s, y_s, 0)$ at which the coordinates of the lighting fixtuer 51 are projected on the floor surface of the lighting space 9 to the target to be lighted 8 can be expressed by the following equation.

$$L_s = ((x_t-x_s)^2 + (y_t-y_s)^2)^{1/2}$$

By means of this distance $L_s$, a horizontal angle $\theta_{sp}$ and a vertical angle $\theta_{st}$ of the lighting fixture 51 can be expressed respectively by the following equations.

$$\theta_{sp} = \cos^{-1}((y_c - y_s)/L_s)$$

$$\theta_{st} = \tan^{-1}(z_s/L_s)$$

After the horizontal angle $\theta_{sp}$ and the vertical angle $\theta_{st}$ of the lighting fixture 51 are thus obtained, the lighting fixture 51 is pivoted to the direction of the target to be lighted by activating the driving section 52a and 52b.

Preferred embodiments of the tracking apparatus in accordance with the present invention will be described below with reference to the drawings.

(Ninth Embodiment)

Figure 29:
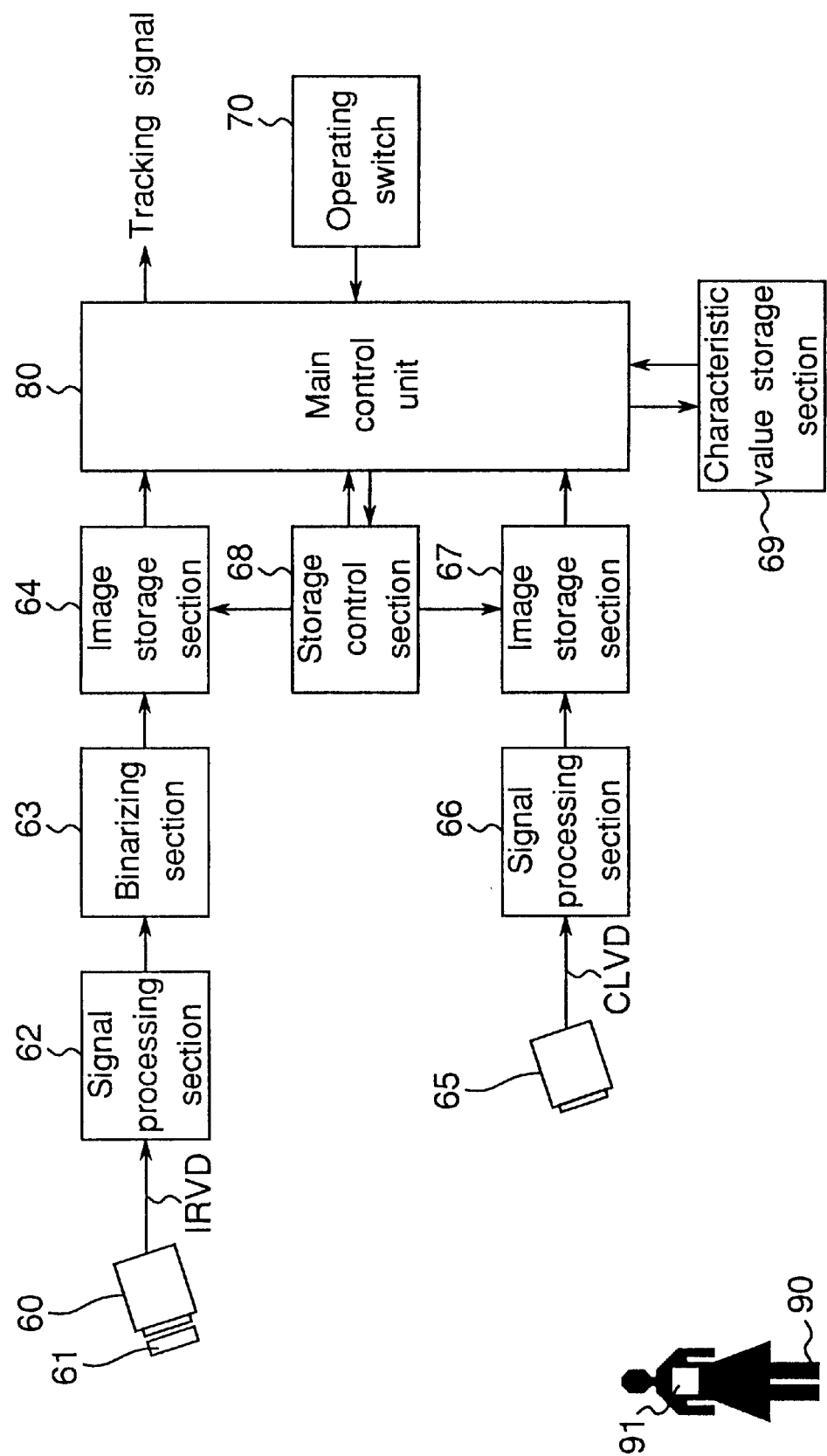
FIG. 29 is a block diagram showing a ninth embodiment.

FIG. 29 shows a block diagram of the tracking apparatus of the present embodiment. The present tracking apparatus is provided with a monochrome CCD camera 60 and a color CCD camera 65 which serve as image pickup means, and comprises: a signal processing section 62 for signal processing a video signal from the CCD camera 10; a binarizing section 63 for binarizing an output from the signal processing section 62; an image storage section 64 for storing an output from the binarizing section 63 as IR image data; a signal processing section 66 for signal processing a video signal from the CCD camera 65; an image storage section 67 for storing an output from the signal processing section 66 as color image data; a main control unit 80 for executing control of the above sections and processing described later; a storage control section 68 for controlling the image storage sections 64 and 67 on the instructions of the main control unit 80; and a characteristic value storage section 69 for storing a characteristic value of an object to be tracked obtained on the basis of the color image. In this case, an infrared light transmitting filter 61 for transmitting only infrared light is provided on the front surface of the monochrome CCD camera 60.

According to the present tracking apparatus, an infrared light transmitter 91 which serves as a marker is preparatorily attached to an object to be tracked 90 and outputs the position of the object to be tracked 90 by combining a process for extracting the infrared light outputted from the infrared light transmitter 91 from an image picked up by the CCD camera 60 for the detection of the position of the object to be tracked with a process for detecting the position of an object to be tracked from a color image picked up by the CCD camera 65 based on the image characteristic of the object to be tracked 90, the image characteristic having been extracted and stored in initial setting. By repeating these processes, the object to be tracked is continuously tracked. In this case, the infrared light transmitter 91 is provided by an infrared light emitting diode (referred to as an infrared LED hereinafter) having a peak in an infrared region (e.g., in the vicinity of a wavelength of 890 nm) or the like, and the infrared LED is made to consistently emit light by flowing a DC current through it. Thus, according to the present tracking apparatus, the object to be tracked 90 can be tracked even when the shape and color of the object to be tracked 90 is changed in the case where the marker can be detected, and the object to be tracked 90 is tracked based on the color image in the case where the marker cannot be detected, so that the object to be tracked 90 can be continuously tracked. In this case, the aforementioned main control unit 80 is implemented by a microcomputer.

In order to execute the aforementioned operation, an operating switch 70 for instructing the start and end of tracking is connected to the main control unit 80. It is a matter of course that the operating switch 70 may be constructed of separate tracking starting switch and tracking ending switch. Furthermore, according to the tracking apparatus of the present embodiment, the lens focus distance, CCD size and so forth of the CCD camera 60 and the CCD camera 65 are approximately identical, and the CCD cameras 60 and 65 pick up an image in an approximately identical region.

Figure 30:
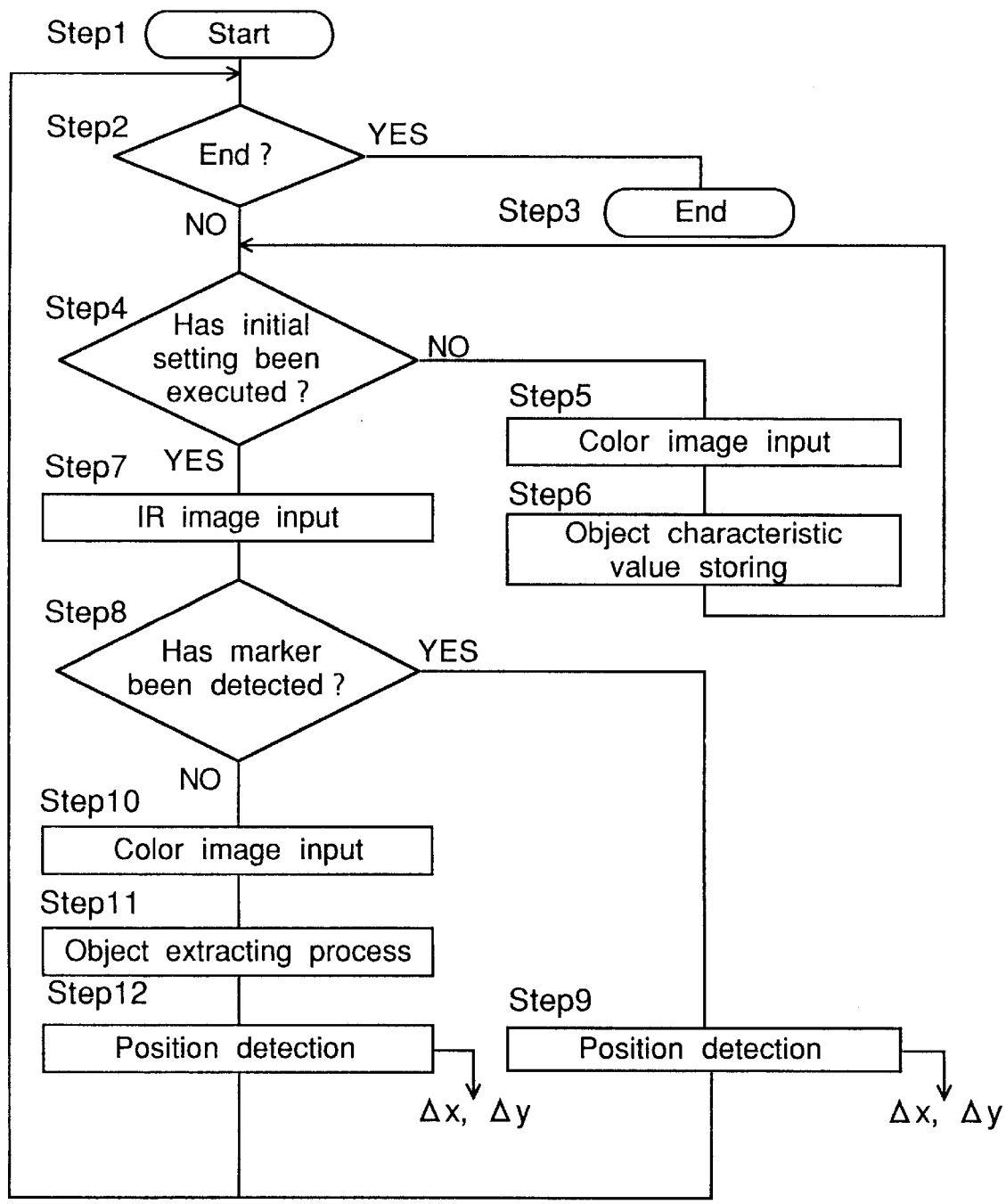
FIG. 30 is an explanatory view of the operation of the above embodiment.

The operation of the main control unit 80 will be described below with reference to FIG. 30.

First, when the start of tracking is instructed by the operating switch 70 (Step 1), it is confirmed whether or not the end of tracking is instructed by the operating switch 70 (Step 2). When the end of tracking is instructed, the tracking ends (Step 3). When the end of tracking is not instructed, it is confirmed whether or not the initial setting has been executed (Step 4). When the initial setting has not been executed, a process for storing the characteristics (color, shape and so forth) of the image of the object to be tracked 90 is executed as initial setting.

In this case, when executing the initial setting, the main control unit 80 instructs the storage control section 68 to input a color image from the CCD camera 65 and store it into the image storage section 67 (Step 5). Then, a video signal CLVD picked up by the CCD camera 65 is separated into three primary color components of red (R), green (G) and blue (B) (converted into RGB signals) in the signal processing section 66 and subjected to analog-to-digital conversion (referred to as an A/D conversion hereinafter) and so forth and then stored as color image data into the image storage section 67. When the storage of the color image data into the image storage section 67 is completed, the storage control section 68 informs the main control unit 80 of the event. In order to extract the image characteristic value owned by the object to be tracked 90 in the initial position of the object to be tracked 90, e.g., a specified range (storage region) at, for example, the center of the screen, the main control unit 80 reads the data at the corresponding address of the storage region in the image storage section 67, processes the data thereby calculating the characteristic value of the object to be tracked and stores the result into the characteristic value storage section 69 (Step 6). It is proper to use the image data itself in the storage region of the image storage section 67 or a histogram as the characteristic value. According to the present embodiment, the image data itself $(R(i,j), G(i,j), B(i,j))$ is stored as a template. It is to be noted that $R(i,j)$, $G(i,j)$, $B(i,j)$ are respectively the value of the R component, the value of G component and the value of B component at coordinates $(i,j)$ when the upper left-hand coordinates are assumed to be $(0,0)$, and the template size is I×J (i.e., $0 \leq i < I$, $0 \leq j < J$).

When the initial setting is completed, the main control unit 80 executes a process for detecting the infrared light outputted from the infrared light transmitter 91 attached to the object to be tracked 90.

Figure 31:
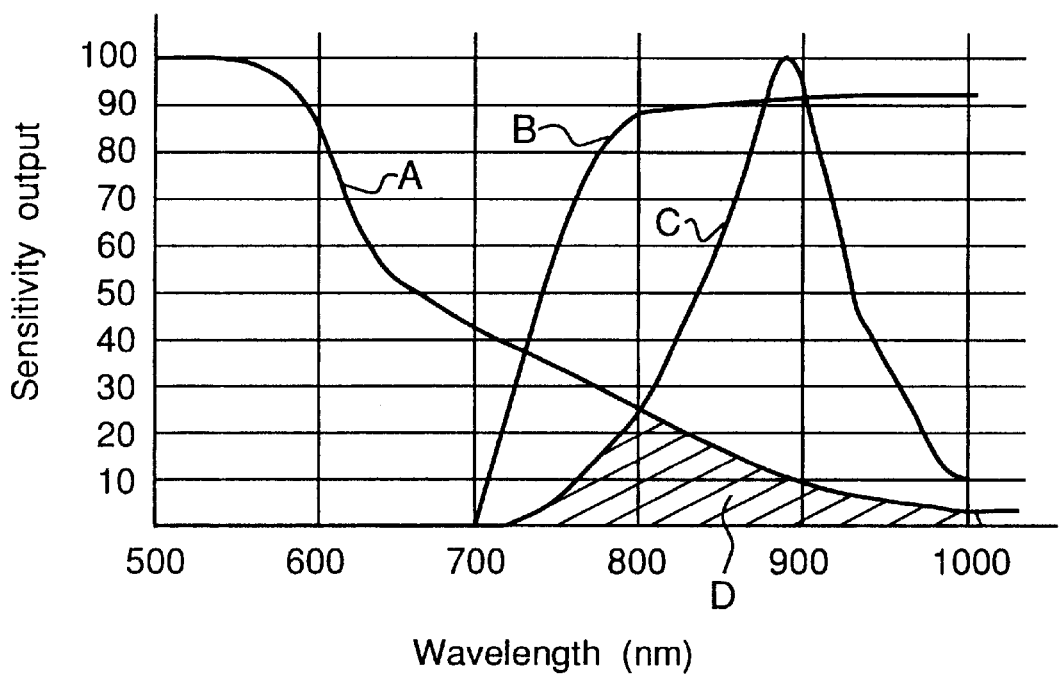
FIG. 31 is an explanatory view of the operation of an essential part of the above embodiment.

A video signal IRVD picked up by the CCD camera 60 through the infrared light transmitting filter 11 is subjected to A/D conversion and so forth in the signal processing section 62, thereafter binarized with a specified threshold value in the binarizing section 63 and stored as IR image data into the image storage section 64 (Step 7). In this case, according to the present tracking apparatus, the sensitivity of the monochrome CCD, the sensitivity of the infrared light transmitting filter 61, and the characteristic of the output of the infrared light transmitter 91 are constructed of those having characteristics as indicated by, for example, A, B and C, respectively in FIG. 31 (note that A and B indicate relative sensitivities and C indicates a relative output), and infrared light is inputted to the CCD camera 60 with a sensitivity indicated by a portion D in FIG. 31. Therefore, only the light having a wavelength of 700 nm to 1000 nm is transmitted, so that only the region having the above wavelength can be extracted through the binarizing process. When the storage of the IR image data into the image storage section 64 is completed, the storage control section 68 informs the main control unit 80 of the event, and the main control unit 80 calculates the marker on the screen, i.e., the position of the infrared light transmitter 91 by the marker detecting means (Step 8).

The main control unit 80 executes so-called the labelling process for segmenting the binarized IR image data in the image storage section 64 in order to detect the marker, calculates the position of the center of gravity (center position) and the area every labelled region and stores the obtained center of gravity and area. When the infrared light transmitter 91 is in the field of view of the CCD camera 60, normally one region is extracted as the proposed object region in which the marker exists. When the infrared light transmitter 91 is hidden behind another object or out of the field of view of the CCD camera 60, the region is not extracted. Furthermore, it is sometimes the cases where a plurality of regions are extracted due to the influence of an infrared light source or reflected light other than the infrared light transmitter 91. If a plurality of proposed object regions are extracted, the proposed object regions which are obviously not ascribed to the output light of the infrared light transmitter 91 will be excluded according to the following procedures.

Procedure 1: When the area of the extracted proposed object region is within a specified size, the area is selected as a proposed object region.

Procedure 2: The proposed object region the distance of which center of gravity from the center of gravity of the previously selected object region is the minimum is selected as a proposed object region. That is, the main control unit selects the region ascribed to the light of the infrared light transmitter 91 in Procedure 2 based on the center of gravity of the region that has been selected as the proposed object to be tracked in Procedure 1 and outputs the position of the object to be tracked 90 (Step 9). That is, the main control unit 80 obtains displacement $\Delta x$, $\Delta y$ from the center of the screen with regard to the center of gravity (center position) of the selected region and outputs the same as a tracking signal.

When no extraction region exists, i.e., when the marker (the infrared light transmitter 91) is not detected in Step 8, the main control unit 80 instructs the storage control section 68 to input a color image (Step 10).

Then, the video signal CLVD picked up by the CCD camera 65 is converted into three primary color signals (converted into RGB signals) in the signal processing section 66, subjected to A/D conversion and so forth and stored as color image data into the image storage section 67. When the storing of the color image data into the image storage section 67 is completed, the storage control section 68 informs the main control unit 80 of the event. Then, the main control unit 80 executes a process for searching a screen block having a characteristic value similar to the characteristic value of the object to be tracked 90 stored in the characteristic value storage section 69 in the initial setting stage. That is, the main control unit reads the image data of each screen block from the image storage section 67, calculates the characteristic value similarly to the initial setting, compares the characteristic value of each screen block with the characteristic value of the object to be tracked 90 (stored in the characteristic value storage section 69 in the initial setting stage) thereby calculating an evaluation value and executes an object extracting process for obtaining the position (screen block) in which the object to be tracked 90 exists (Step 11). When the image data is utilized as the characteristic value, the calculation of the evaluation value cor(x,y) is executed by utilizing a cumulative sum of the absolute values of the difference between the image data (template) of the object to be tracked 90 and the pixel value at the corresponding coordinates of the screen block (input image). In this case, assuming that the value of the R component at the coordinates (i,j) of the input image is Rin(i,j), the value of the G component at the coordinates (i,j) of the input image is Gin(i,j), the value of the B component at the coordinates (i,j) of the input image is Bin(i,j), the value of the R component at the coordinates (i, j) of the template is Rtp(i,j), the value of the G component at the coordinates (i,j) of the template is Gty(i,j), the value of the B component at the coordinates (i,j) of the template is Bty(i,j) and an offset of the screen block when the upper left-hand is the origin is x,y, then the evaluation value cor(x,y) is obtained according to:

$$cor(x, y) = \sum_{i=1}^{I-1} \sum_{j=0}^{J-1} (|Rin(x+i, y+j) - Rtp(i, j)| +$$
$$|Gin(x+i, y+j) - Gty(i, j)| +$$
$$|Bin(x+i, y+j) - Bty(i, j)|)$$

where the further the image of the screen block is similar to the image of the template, the smaller the value is. Therefore, by executing the calculation of the above equation for all the screen blocks and obtaining the screen block which takes the smallest value and the offset x,y of the screen block, the position where the object to be tracked 90 exists can be known. Then, the main control unit 80 obtains the displacement $\Delta x$, $\Delta y$ obtained by shifting the reference of this offset value from the upper left-hand portion of the screen to the center of the screen (i.e., executes position detection) and outputs the same as the tracking signal (Step 12).

After outputting the displacement $\Delta x$, $\Delta y$ in Step 12 or Step 9, the main control unit 80 returns the program flow to Step 2 to confirm whether the end of tracking is instructed, and continues the tracking by repeating the above processing until the end of tracking is instructed.

That is, the infrared light transmitter 91 which serves as the marker is detected based on the IR image according to the video signal from the CCD camera 60, and the processing is executed with the color image according to the video signal from the CCD camera 65 when the infrared light transmitter 91 cannot be detected. Therefore, the object to be tracked 90 can be tracked with high reliability when the infrared light transmitter 91 can be detected. When the infrared light transmitter 91 cannot be detected, the tracking of the object to be tracked 90 is continued through the color image processing. The tracking based on the color image processing can obtain a sufficient tracking performance so long as the tracking is effected in a short time, and the tracking error through the color image processing can be canceled when the infrared light transmitter 91 is detected again, so that the object to be tracked 90 can be surely tracked with high accuracy.

(Tenth Embodiment)

The tracking apparatus of the present embodiment is characterized in that the object to be tracked is tracked by detecting the marker similarly to the eighth embodiment; the object to be tracked is tracked based on the characteristic value of the input image when the marker cannot be detected, the marker is provided by an infrared light transmitter and this infrared light transmitter intermittently transmits in synchronization with the video signal from the image pickup means. That is, the present tracking apparatus increases the tracking accuracy by controlling the timing of the emission of light from the infrared light transmitter 91 in the case where infrared light (noise) from other than the infrared light transmitter 91 exists.

Figure 32:
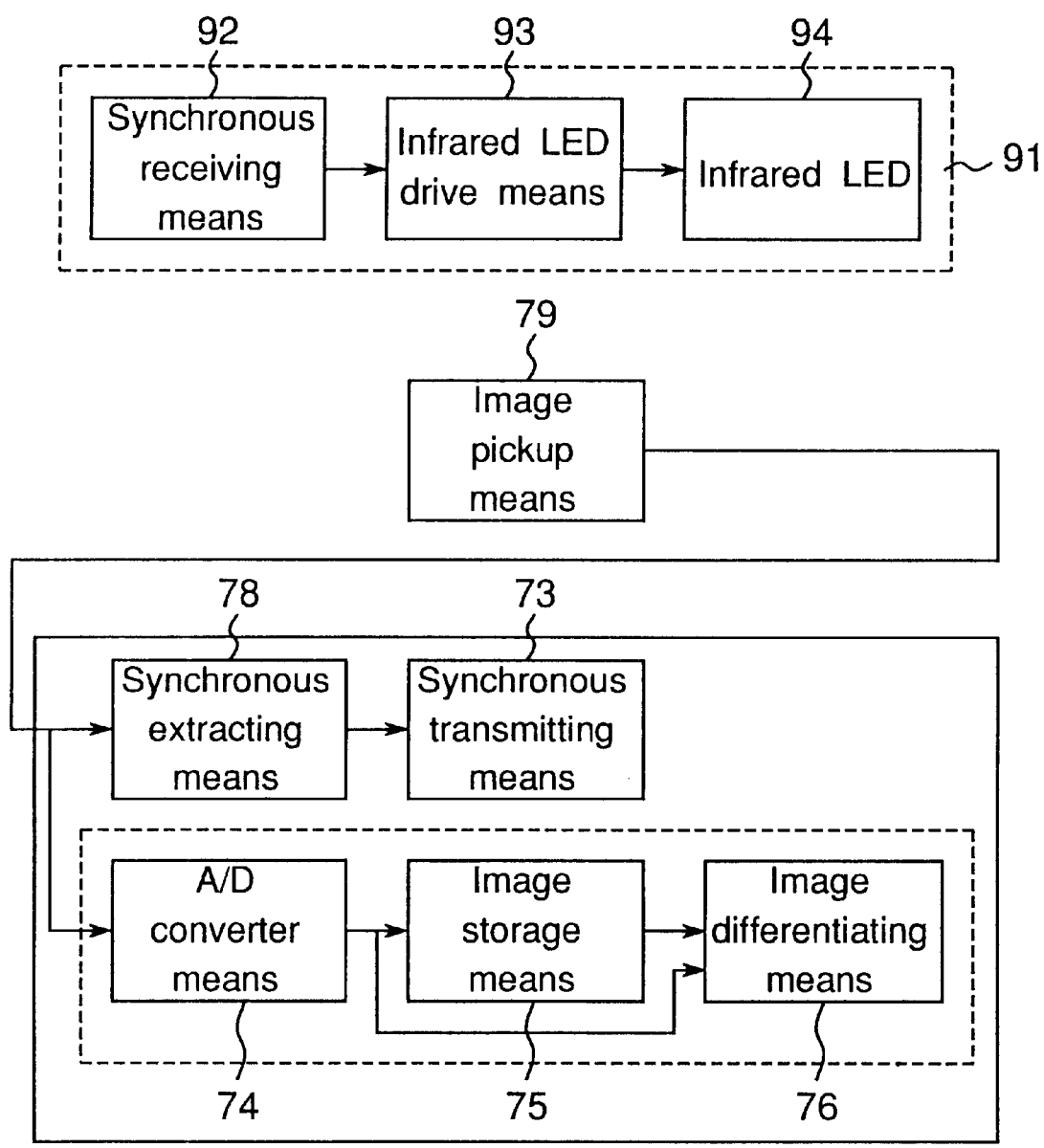
FIG. 32 is a block diagram showing an essential part of a tenth embodiment.

FIG. 32 shows a block diagram of a part which is characteristic of the tracking apparatus of the present embodiment, and the operation characteristic of the present tracking apparatus will be described.

A video signal from an image pickup means 79 provided by a monochrome CCD camera having a sensitivity to light in the infrared light region is inputted to a synchronous extracting means 78 and an A/D conversion means 74. Then, the synchronous extracting means 78 extracts a vertical synchronization signal as shown in FIG. 32A from the video signal. This vertical synchronization signal (pulse signal) is yielded at intervals of 1/60 sec, and it represents the time of one field of the image. The thus extracted vertical synchronization signal is transmitted to a synchronous transmitting means 73 and transmitted as a radio wave. It is to be noted that the system of transmitting the radio wave from the synchronous transmitting means 73 may be a generic modulation system such as FM or AM, and the output may be low to such an extent that it reaches several tens meters. The synchronization signal (vertical synchronization signal) transmitted from the synchronous transmitting means 73 is demodulated by a synchronous receiving means 92 of the infrared light transmitter 91 and inputted to an infrared LED drive means 93. The infrared LED drive means 93 generates an intermittent infrared LED drive signal of which signal level switches between a high level and a low level every pulse of the synchronization signal and outputs the signal as shown in FIG. 33B. Therefore, the infrared LED 94 is repetitively turned on and off in synchronization with the timing of the field of the image pickup means 79. Therefore, when the image pickup means 79 picks up the image of the infrared light transmitter 91, the image of the infrared light from the infrared LED 94 is picked up in a certain field throughout the entire field interval, and the image of the infrared light is not picked up at all in the next field.

The video signal that is inputted from the image pickup means 79 to the A/D conversion means 74 is converted into a digital signal by the A/D conversion means 74, and the digital signal is once inputted to an image storage means 75.

In this case, the image storage means 75 stores data of one field. This kind of memory is so called the field memory, and this may be one that is generally used in a television set or the like which executes digital processing. The data stored in the image storage means 75 is read in the next frame and inputted to an image differentiating means 76. The image differentiating means 76 extracts the changed portion of the image by obtaining the difference between the data from the image storage means 75, i.e., the Image of the preceding frame and the current image.

Figure 34A:
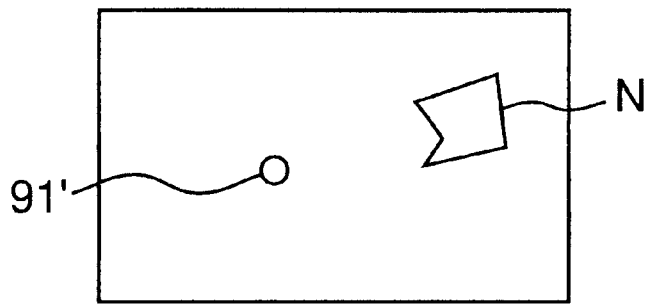
FIGS. 34A, 34B, and 34C are explanatory views of the operation of the above embodiment.
Figure 34B:
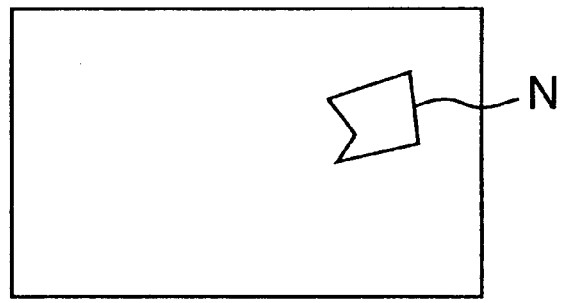
Figure 34C:
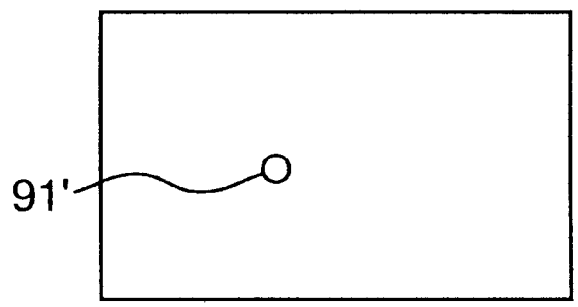

For example, as shown in FIG. 34A, even when a noise component N consisting of infrared light 91' from the infrared light transmitter 91 and infrared light from other than the infrared light transmitter 91 exists in the image in a field E shown in FIG. 33A, only the noise component N exists in the image in a field F shown in FIG. 33A (the infrared light transmitter 91 is turned off). Therefore, by extracting the difference between the image in the field E (FIG. 34A) and the image in the field F (FIG. 34B) by the image differentiating means 76, an image as shown in FIG. 34C can be obtained, so that only the infrared light 91' from the infrared light transmitter 91 can be detected as a marker. That is, it is often the case where the noise component N comprised of the infrared light from other than the infrared light transmitter 91 is consistently lighted, and even when flashing, it is not flashing in synchronization with the field of the image pickup means 79. Therefore, the noise component N can be canceled through the differentiating process by the image differentiating means 76, so that only the Infrared LED 94 can be extracted.

It is possible that even noise light is erroneously extracted through the differentiating process between continuous two fields similarly to the infrared light 91' from the synchronized infrared LED 94 particularly at the moment of starting lighting. Therefore, it is preferable to execute the differentiating process further in the subsequent continuous two fields and decide that the light is the infrared light 91' from the infrared LED 94 only when it is extracted continuously two times.

Thus, the present tracking apparatus can detect only the lighting of the infrared LED 94 from the image including a disturbance noise and specify the position of the light. Therefore, by directing the spotlight or the like to the position, a person can be tracked and floodlighted.

(Eleventh Embodiment)

Figure 35:
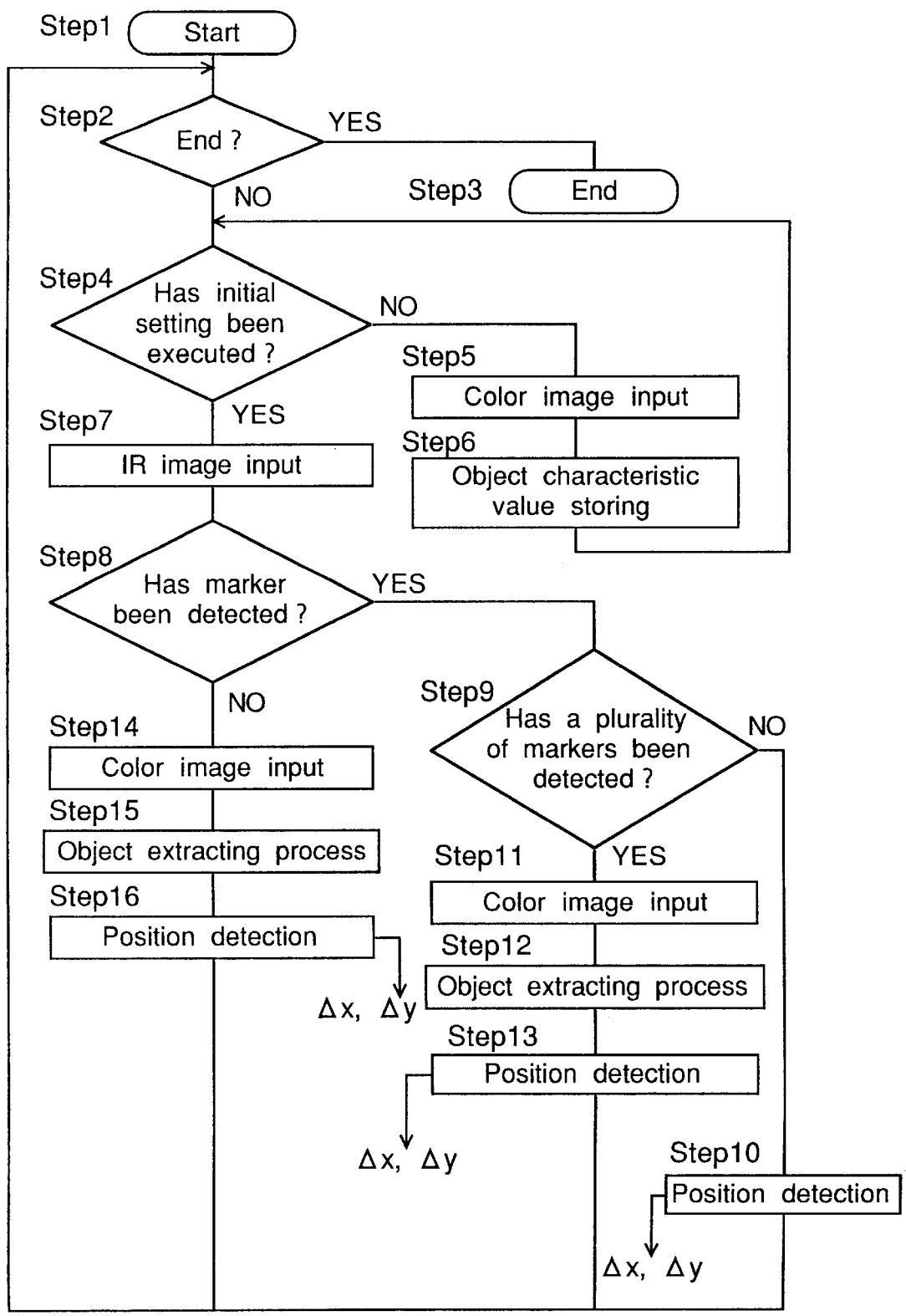
FIG. 35 is an explanatory view of the operation of a eleventh embodiment.

The basic construction and basic operation of the tracking apparatus of the present embodiment are approximately similar to those of the ninth embodiment, and therefore, its characteristic operation will be described with reference to FIG. 35.

When at least one proposed object region as a marker is detected in Step 8, the main control unit 80 of the present tracking apparatus decides whether or not a plurality of markers have been detected (Step 9), selects the center of gravity of the region selected similarly to the eighth embodiment as infrared light from the infrared light transmitter 91 when one marker exists similarly to the eighth embodiment, executes position detection for obtaining the displacement Δx, Δy of the center of gravity of the selected region from the center of the screen and outputs the displacement Δx, Δy (Step 10). When a plurality of markers are detected in Step 9, the main control unit instructs the storage control section 68 to input a color image (Step 11). Then, the main control unit executes the object extracting process for calculating the evaluation value cor(x,y) of each screen block similarly to the eighth embodiment (Step 12). Subsequently, based on this evaluation value cor(x,y) and the position in which the proposed marker is found, the position which has the highest possibility that it is the marker is obtained according to the following procedures.

Procedure 1: When no proposed marker exists in the screen block, the screen block is excluded from the proposed object regions.

Procedure 2: Any screen block of which evaluation value cor(x,y) is greater than a specified value is excluded from the proposed object regions.

Procedure 3: Among the remaining screen blocks, the screen block located closest to the position of the object to be tracked 90, which has been selected in the preceding processing, is selected.

Then, the main control unit 80 obtains the screen block selected through the above procedures 1 through 3 and its offset x,y, further executes position detection for obtaining the displacement $\Delta x$, $\Delta y$ obtained by shifting the reference of this offset value from the upper left-hand portion of the screen into the center of the screen (Step 13) and outputs the displacement $\Delta x$, $\Delta y$ as a tracking signal.

When no extraction region exists, i.e., when no marker (proposed marker) is detected in Step 8, the same operations as those of the eighth embodiment (Step 10 through Step 12) are executed in Steps 14 through 16.

After outputting the displacement $\Delta x$, $\Delta y$ in Steps 10, 13 and 16, the main control unit 80 returns the program flow to Step 2 to confirm whether the end of tracking is instructed similarly to the eighth embodiment, and continues the tracking by repeating the aforementioned processing until the end of tracking is instructed.

That is, when the infrared light transmitter 91 can be detected, the present tracking apparatus executes the processing with the IR image, and executes the processing with the color image when the infrared light transmitter 91 cannot be detected or when a plurality of proposed markers are detected. Therefore, the tracking can be executed with high reliability when the infrared light transmitter 91 can be singly detected, and the tracking is continued through the color image processing even when it cannot be detected. Further, when a plurality of proposed markers are detected, the proposed marker which has the highest possibility that it is the marker is selected as the marker through the color image processing. Therefore, the tracking reliability can be increased.

(Twelfth Embodiment)

Figure 36:
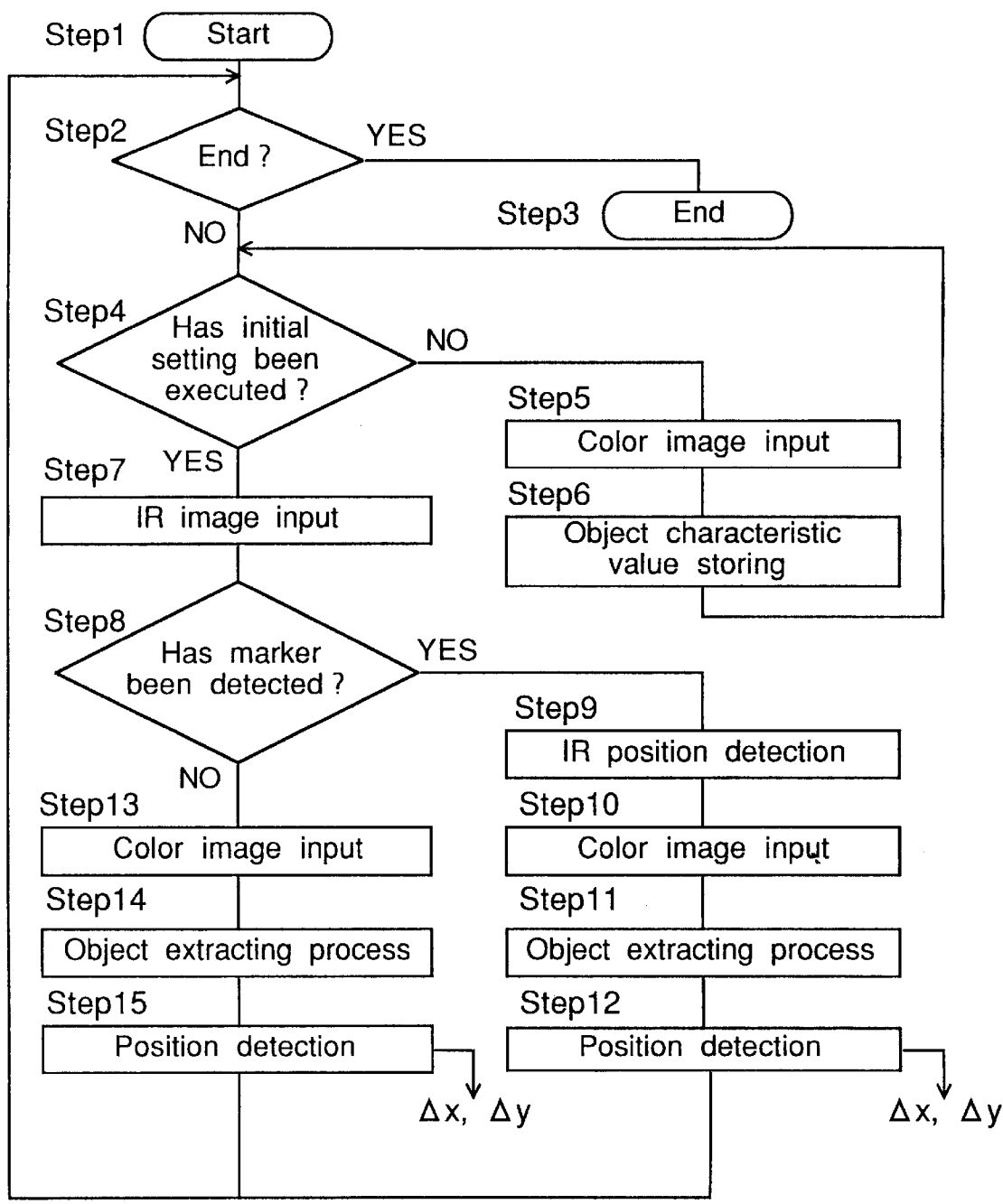
FIG. 36 is an explanatory view of the operation of a twelfth embodiment.

The basic construction and basic operation of the tracking apparatus of the present embodiment are approximately similar to those of the ninth embodiment, and therefore, its characteristic operation will be described with reference to FIG. 36.

When a proposed object region which is a proposed marker is detected in Step 8, the main control unit 80 of the present tracking apparatus executes position detection based on the IR image (Step 9) and thereafter instructs the input of the color image (Step 10). Then, the main control unit 80 executes an object extracting process for calculating the evaluation value cor(x,y) of each screen block similarly to the eighth embodiment (Step 11). Based on this evaluation value and the position where the proposed marker is found, the position which has the highest possibility that it is the marker is obtained according to the following procedures.

Procedure 1: When no proposed marker exists in a screen block, the screen block is excluded from the proposed object regions.

Procedure 2: Any screen block of which evaluation value cor(x,y) is greater than a specified value is excluded from the proposed object regions.

Procedure 3: Among the remaining screen blocks, the screen block located closest to the object position that has been selected in the preceding processing time is selected Then, the main control unit 80 obtains the screen block selected through the above procedures 1 through 3 and its offset x,y, further executes position detection for obtaining the displacement $\Delta x$, $\Delta y$ obtained by shifting the reference of this offset value from the upper left-hand portion of the screen into the center of the screen (Step 12) and outputs the displacement $\Delta x$, $\Delta y$ as a tracking signal.

When no extraction region exists, i.e., when no marker (proposed marker) is detected in Step 8, the same operations as those of the eighth embodiment (step 10 through Step 12) are executed in Steps 13 through 15. The displacement $\Delta x$, $\Delta y$ from the center of the screen of the screen block having the smallest evaluation value is outputted as a tracking signal.

After outputting the displacement $\Delta x$, $\Delta y$ in Steps 12 and 15, the main control unit 80 returns the program flow to Step 2 to confirm whether the end of tracking is instructed similarly to the eighth embodiment, and continues the tracking by repeating the aforementioned processing until the end of tracking is instructed.

That is, even when the marker is detected, the present tracking apparatus executes the processing with both the IR image and color image and calculates the position of the object to be tracked 90 by combining the results, and therefore, the tracking reliability can be improved.

(Thirteenth Embodiment)

Figure 37:
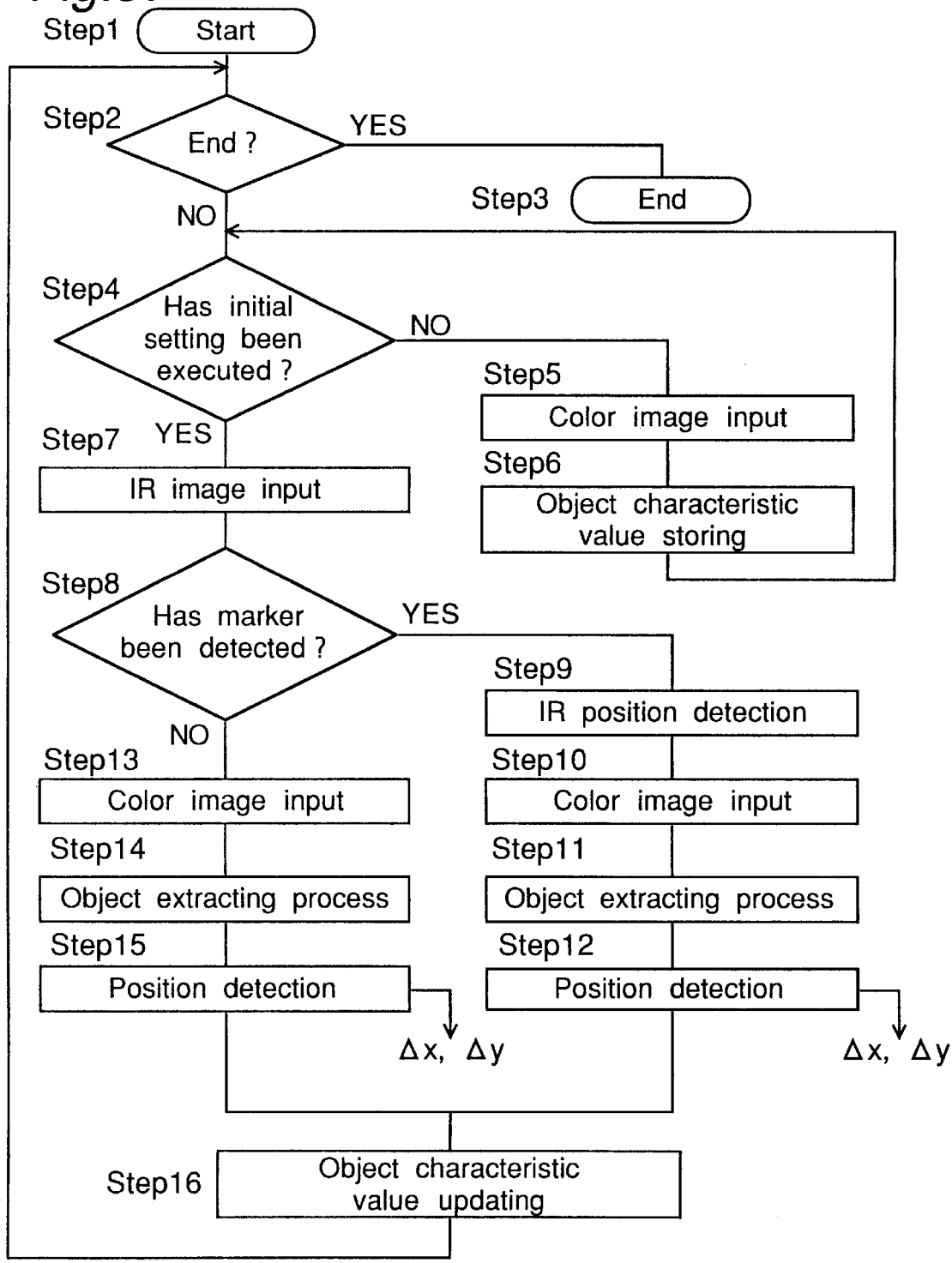
FIG. 37 is an explanatory view of the operation of a thirteenth embodiment.

The basic construction and basic operation of the tracking apparatus of the present embodiment are approximately similar to those of the twelfth embodiment, and therefore, its characteristic operation will be described with reference to FIG. 37.

After outputting the displacement $\Delta x$, $\Delta y$ in Step 12 or Step 15, the main control unit 80 of the present tracking apparatus stores the characteristic value (image data) of the screen block which is decided to include the object to be tracked 90 in Step 12 or Step 15 instead of the object characteristic value stored in the initial setting stage, i.e., updates the characteristic value (Step 16) and returns the program flow to Step 2 to confirm whether the end of tracking is instructed, and continues the tracking by repeating the aforementioned processing until the end of tracking is instructed.

As described above, the present tracking apparatus executes the processing with the IR image or the color image and updates the characteristic value of the object to be tracked 90 based on the result. Therefore, even when the contents of the template are destroyed in the course of the color image processing, the characteristic value is updated, so that the tracking reliability can be improved.

(Fourteenth Embodiment)

Figure 38:
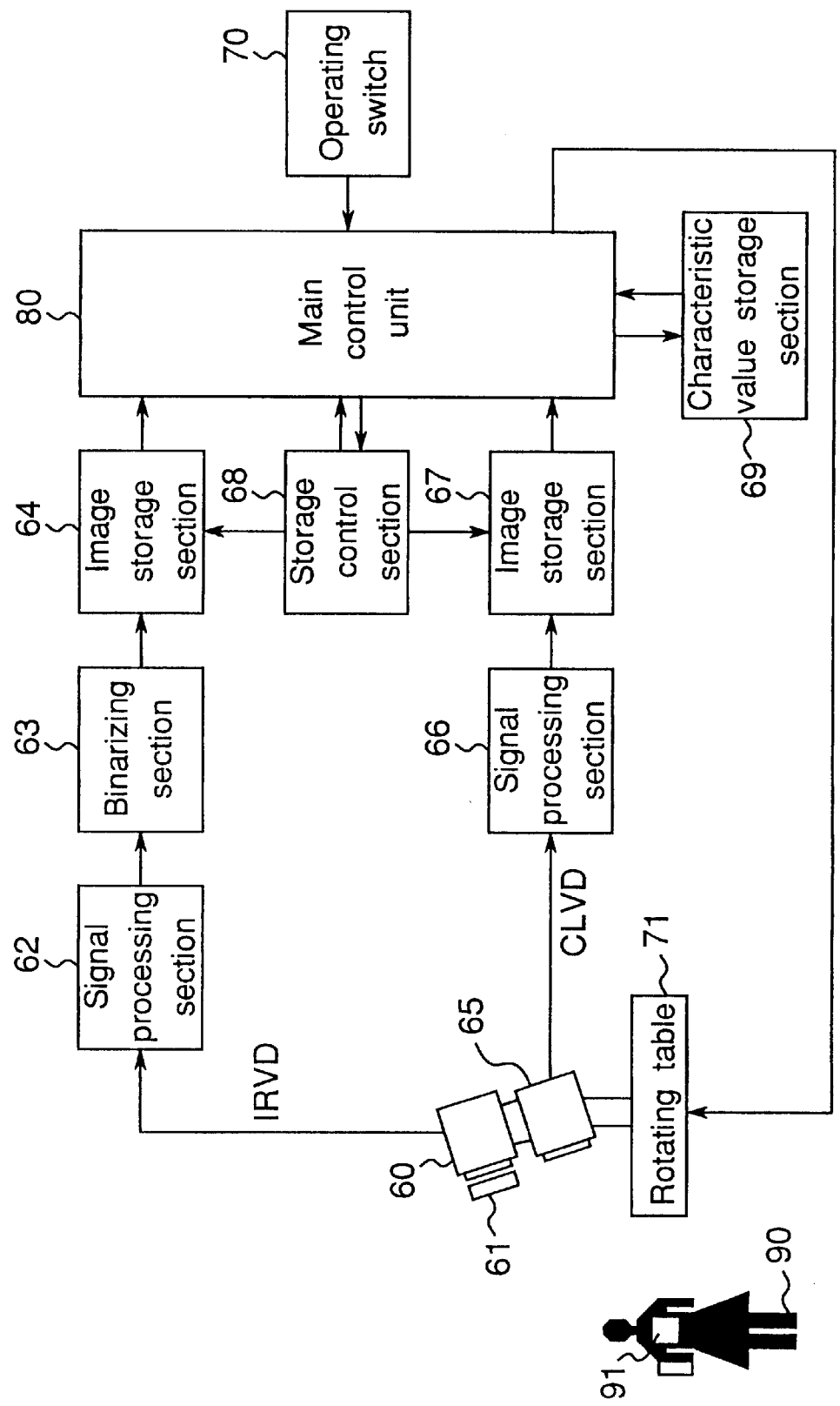
FIG. 38 is a block diagram showing a fourteenth embodiment.

FIG. 38 shows a block diagram of the tracking apparatus of the present embodiment. The basic construction and basic operation of the present tracking apparatus are approximately similar to those of the eighth embodiment, and it is characterized in that a rotating table 71 provided with motors for controlling the two axes of a pan axis (in the horizontal direction) and a tilt axis (in the vertical direction) is provided, the CCD cameras 60 and 65 are placed on the rotating table 71 and the rotating table 71 is rotated in the panning and tilting directions by a control signal (tracking signal) from the main control unit 80.

Figure 39:
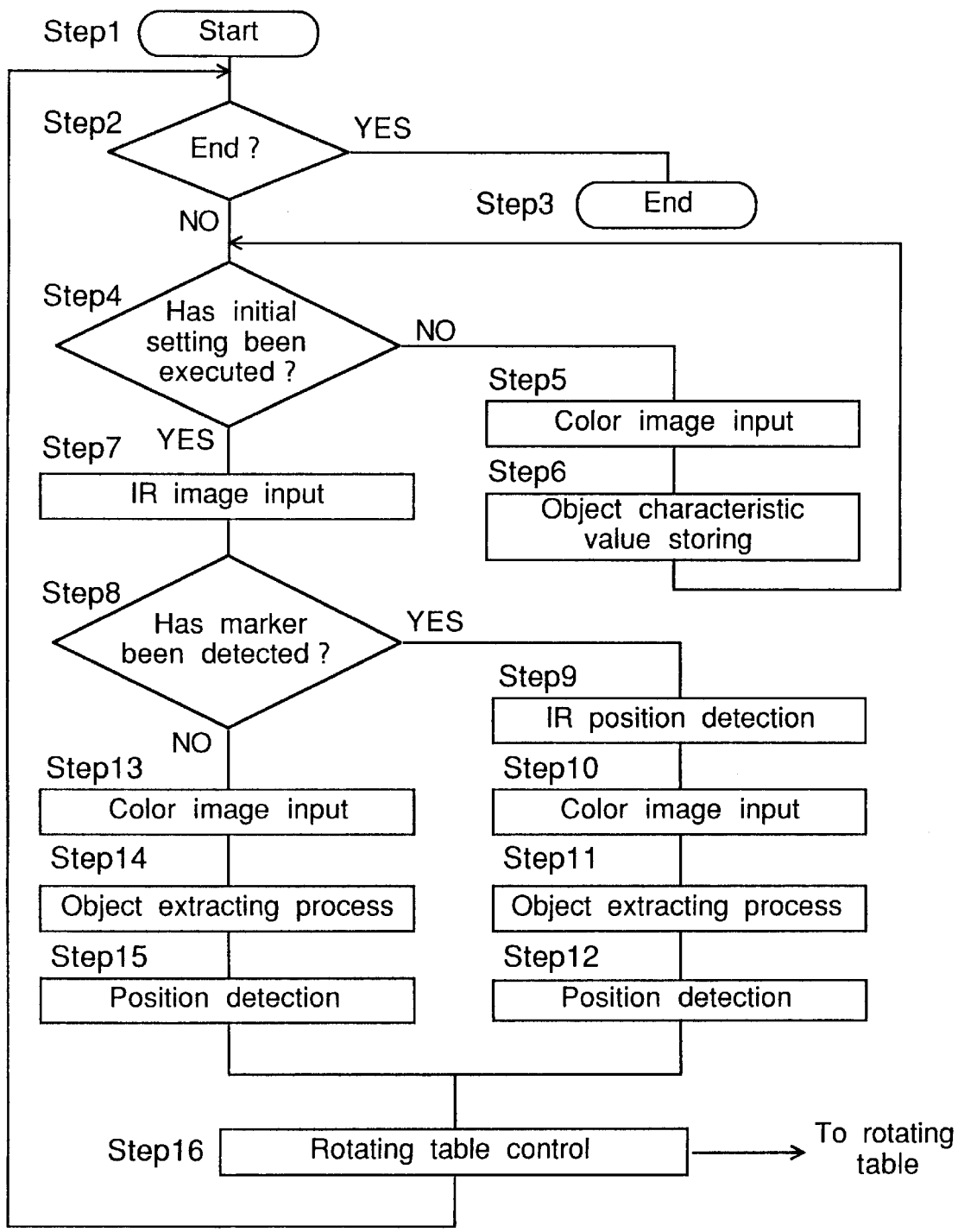
FIG. 39 is an explanatory view of the operation of the above embodiment.

The operation of the main control unit of the present tracking apparatus will be described below with reference to FIG. 39, and no description will be provided for the operations in Step 1 through Step 15 since they are the same as the operations of the twelfth embodiment.

According to the present tracking apparatus, the main control unit 80 calculates the position of the object to be tracked 90 and outputs the displacement Δx, Δy from the center of the screen in Step 12 or Step 15. Then, based on this output, the main control unit 80 controls the rotating table 71 so that the object to be tracked 90 existing in the position of Δx, Δy displaced from the center of the screen is shifted into the center of the screen (Step 16). In this case, Δx and Δy are made to correspond respectively to the panning direction and the tilting direction, thereby executing feedback control with Δx and Δy served as a deviation. It is to be noted that the control signal outputted from the main control unit 80 may be implemented by providing the rotating table 71 with a serial communication function and executing data transmission by serial communication or controlled to be turned on and off.

After controlling the rotating table 71 in Step 16, the main control unit 80 returns the program flow to Step 2 to confirm whether the end of tracking is instructed and continues the tracking by subsequently repeating the aforementioned processing.

The present tracking apparatus controls the rotating table 71 on which the CCD cameras 60 and 65 are installed based on the position of the object to be tracked 90, and therefore, the object to be tracked 90 can be tracked in a wider range.

It is a matter of course that the rotating table 71 may be attached to the tracking apparatus of any other embodiment.

(Fifteenth Embodiment)

Figure 40:
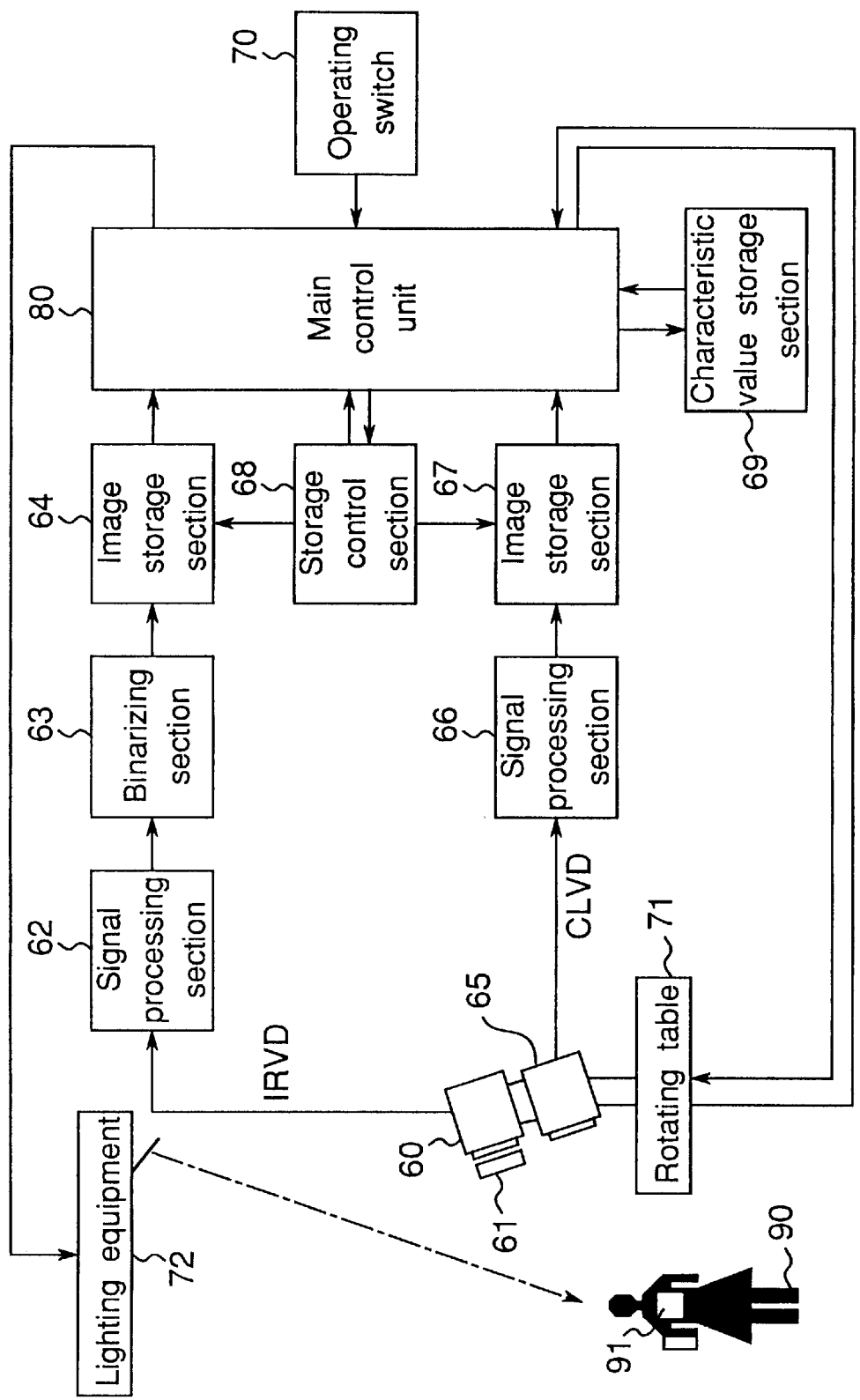
FIG. 40 is a block diagram showing a fifteenth embodiment.

FIG. 40 shows a block diagram of the tracking apparatus of the present embodiment. The basic construction of the present tracking apparatus is approximately the same as that of the thirteenth embodiment, and it is characterized in that the rotating table 71 is provided with a potentiometer, the current posture is outputted by a control signal from the main control unit 80 and lighting equipment 72 which floodlights the object to be tracked 90 while it is controlled as interlocked with the rotating table 71 is provided. In this case, the lighting equipment 72 has a directivity and is placed in a position located apart from the rotating table 71.

Figure 41:
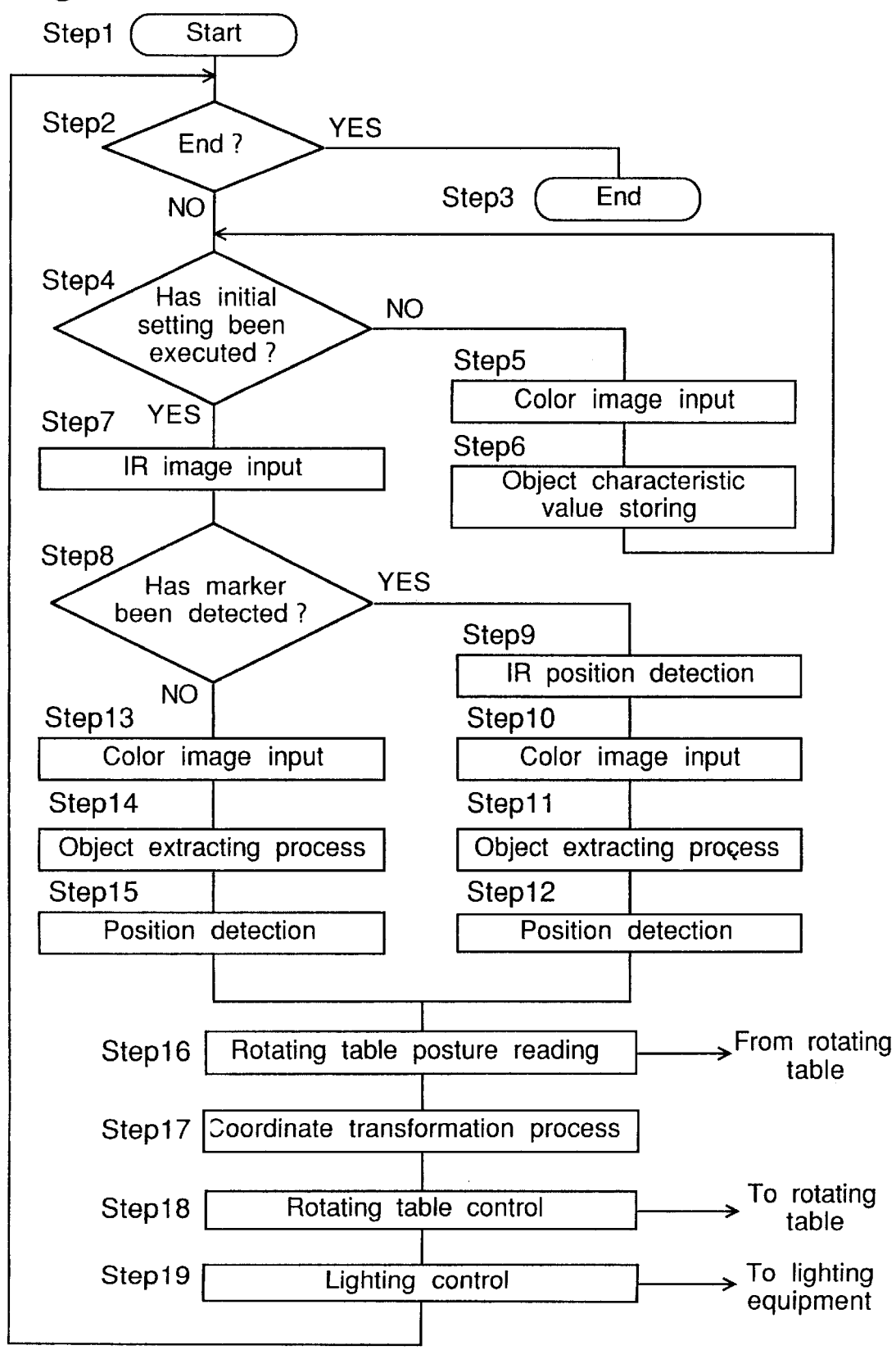
FIG. 41 is an explanatory view of the operation of the above embodiment.

The operation of the present tracking apparatus will be described below with reference to FIG. 41, and no description will be provided for the operations in Step 1 through Step 15 since they are the same as the operations of the eleventh embodiment.

The main control unit 80 calculates the position of the object to be tracked 90 and outputs the displacement Δx, Δy from the center of the screen in Step 12 or Step 15.

Then, the main control unit 80 reads the value of the potentiometer corresponding to the angles of rotation in the panning and tilting directions from the rotating table 71 and obtains the posture of the rotating table 71, and in its turn, the postures of the attached CCD cameras 60 and 65 (Step 16). Subsequently, in Step 17, from the position of the CCD camera 60 or the CCD camera 65 and the posture of one of the CCD cameras 60 and 65, the main control unit calculates an intersection of the optical axis of the CCD camera and the floor surface or an intersection of the optical axis and a specified height and then executes a coordinate transformation process for calculating the direction of the lighting equipment from the intersection and the position of the lighting equipment 72. Further, subsequently, the main control unit 80 controls the rotating table 71 similarly to Step 16 of the fourteenth embodiment (Step 18). Then, the main control unit controls the lighting equipment 72 so that the lighting is directed toward the object to be tracked 90 (Step 19).

After executing the processing in Step 19, the main control unit 80 returns the program flow to Step 2 to confirm whether the end of tracking is instructed. By subsequently repeating the aforementioned processing, the object to be tracked 90 can be continuously floodlighted even when the object to be tracked moves.

It is a matter of course that the rotating table 71 and the lighting equipment 72 may be attached to the tracking apparatus of any other embodiment.

(Sixteenth Embodiment)

According to the present embodiment, there provided two sets of camera units being constructed by mounting a monochrome CCD camera having a sensitivity to light in the infrared light rigion (Hereinafter, it is called a "infrared camera".) and a color CCD camera (Hereinafter, it is called a "color camera".) to a rotating table. And, by calculating the three-dimensional coordinate of the object to be tracked, whether a proposed marker can be detected by a infrared camera or not, the position of the object to be tracked can be detected with high accuracy.

Figure 42:
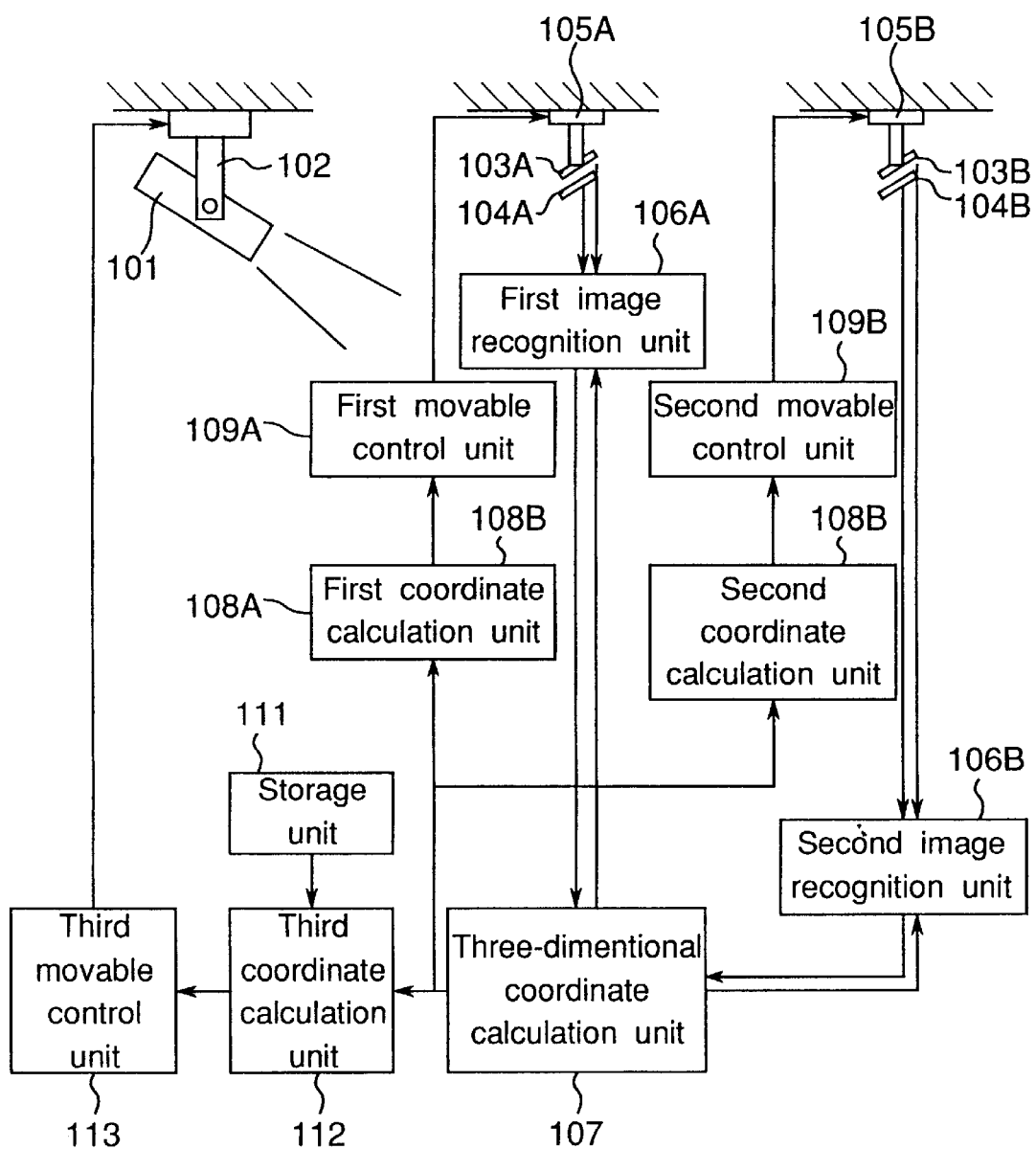
FIG. 42 is a block diagram showing a sixteenth embodiment.

FIG. 42 shows the block diagram of the tracking apparatus in accordance with the sixteenth embodiment. As shown in this drawing, the tracking apparatus is provided with first(1st) and second(2nd) infrared camera 103A and 103B; 1st and 2nd color camera 104A and 104B; 1st camera rotating table 105A which has motors for controlling the two axes of a pan axis (in the horizontal direction) and a tilt axis (in the vertical direction), and supports the 1st infrared camera 103A and 1st color camera 104A pivotally in a horizontal direction and a vertical direction; and the 2nd camera rotating table 105B which has motors for controlling the two axes of a pan axis (in the horizontal direction) and a tilt axis (in the vertical direction), and supports the 2nd infrared camera 103B and 2nd color camera 104B pivotally in a horizontal direction and a vertical direction. Also, a spotlight 101 for floodlighting the target to be lighted (the object to be tracked) in the lighting space is supported pivotally in a horizontal direction and a vertical direction by a spotlight rotating table 102 which has motors for controlling the two axes of a pan axis (in the horizontal direction) and a tilt axis (in the vertical direction).

Further, the tracking apparatus is provided with the 1st image recognition unit 106A into which video signal is input from 1st infrared camera 103A and 1st color camera 104A; and the 2nd image recognition unit 106B into which video signal is input from 2nd infrared camera 103B and 2nd color camera 104B. These image recognition units 106A,106B have the same constitution and function, explainning about 1st image recognition unit 106A for example, it can recognize the proposed markers by the existing image processing techniques from a video signal from the infrared camera 103A and detect the coordinates, and it can recognize the proposed objects to be tracked by the existing image processing techniques from a video signal from the color camera 104A and detect the coordinates. In the embodiment, more preferably, the detection of the object to be tracked based on the video signal from the color camera will be conducted only when a proposed marker is not detected by the infrared camera.

Furthermore, the tracking apparatus is provided with a three-dimentional coordinate calculation unit 107 which selects a position coordinate of the highest conforming in position as a selected point among the position coordinate of proposed points detected by 1st and 2nd image recognition units 106A and 106B; the 1st coordinate calculation unit 108A which calculates the quantities of movement (operating parameter in direction) of the 1st infrared camera 103A and 1st color camera 104A based on the calculated result of the three-dimentional coordinate calculation unit 107; the 2nd coordinate calculation unit 108B which calculates the quantities of movement (operating parameter in direction) of the 2nd infrared camera 103B and 2nd color camera 104B based on the calculated result of the three-dimentional coordinate calculation unit 107; and the 1st and 2nd movable control units 109A and 109B which drive and control the 1st and 2nd camera rotating table 105A and 105B based on the calculated results of the 1st and 2nd coordinate calculation units 108A and 108B.

Furthermore, the tracking apparatus is provided with a storage unit 111 for storing the lighting direction of the spotlight 101; the 3rd coordinate calculation unit 112 which calculates the quantities of movement (operating parameter in direction) of the spotlight 101 based on the data of the lighting direction stored by the storage unit 111 and the calculated result of the three-dimentional coordinate calculation unit 107; and the 3rd movable control unit 113 which drives and controls the spotlight rotating table 102 based on the calculated result of the 3rd coordinate calculation unit 112.

Figure 43:
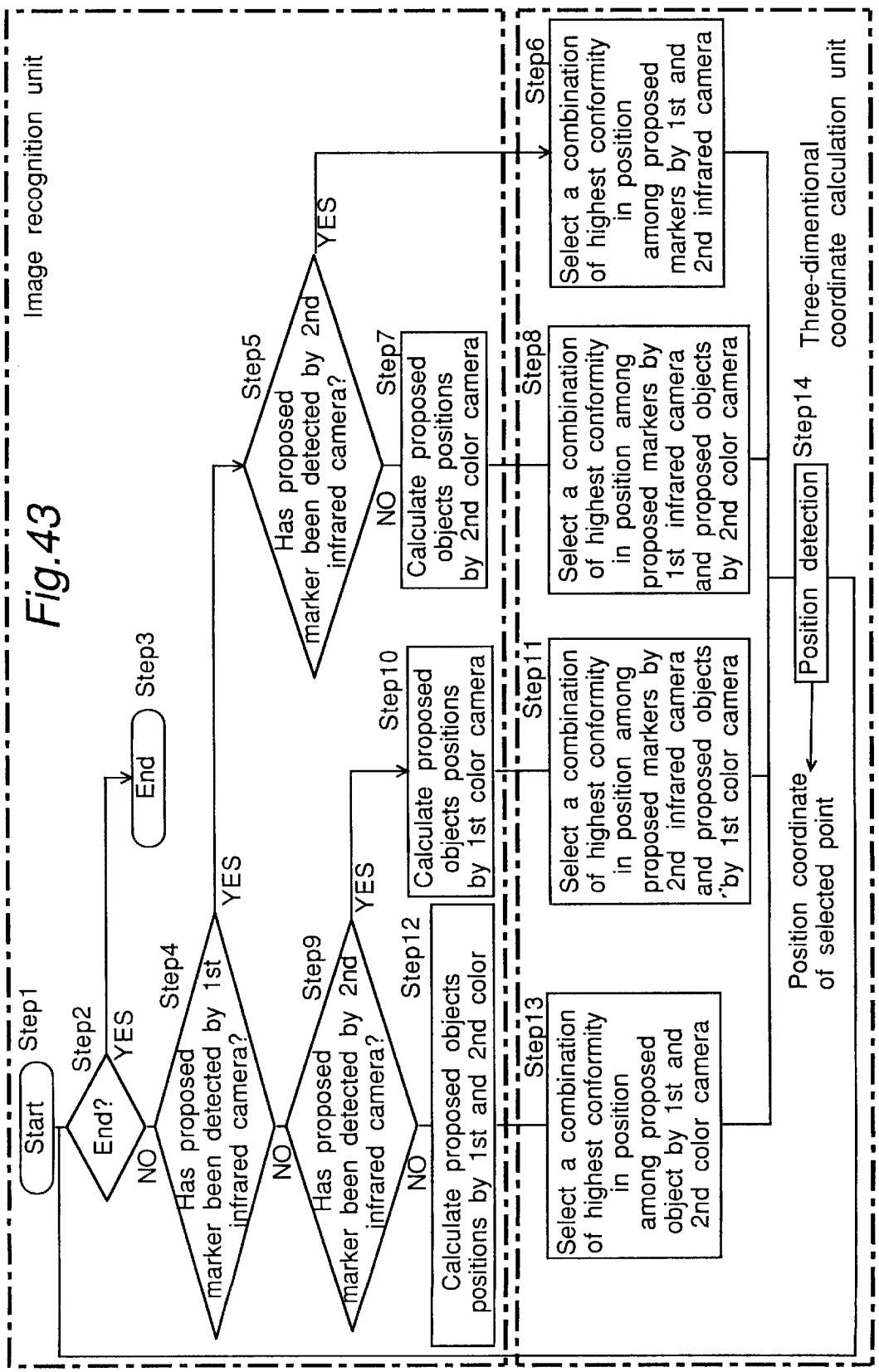
FIG. 43 is an explanatory view of the operation of the above embodiment.
Figure 44:
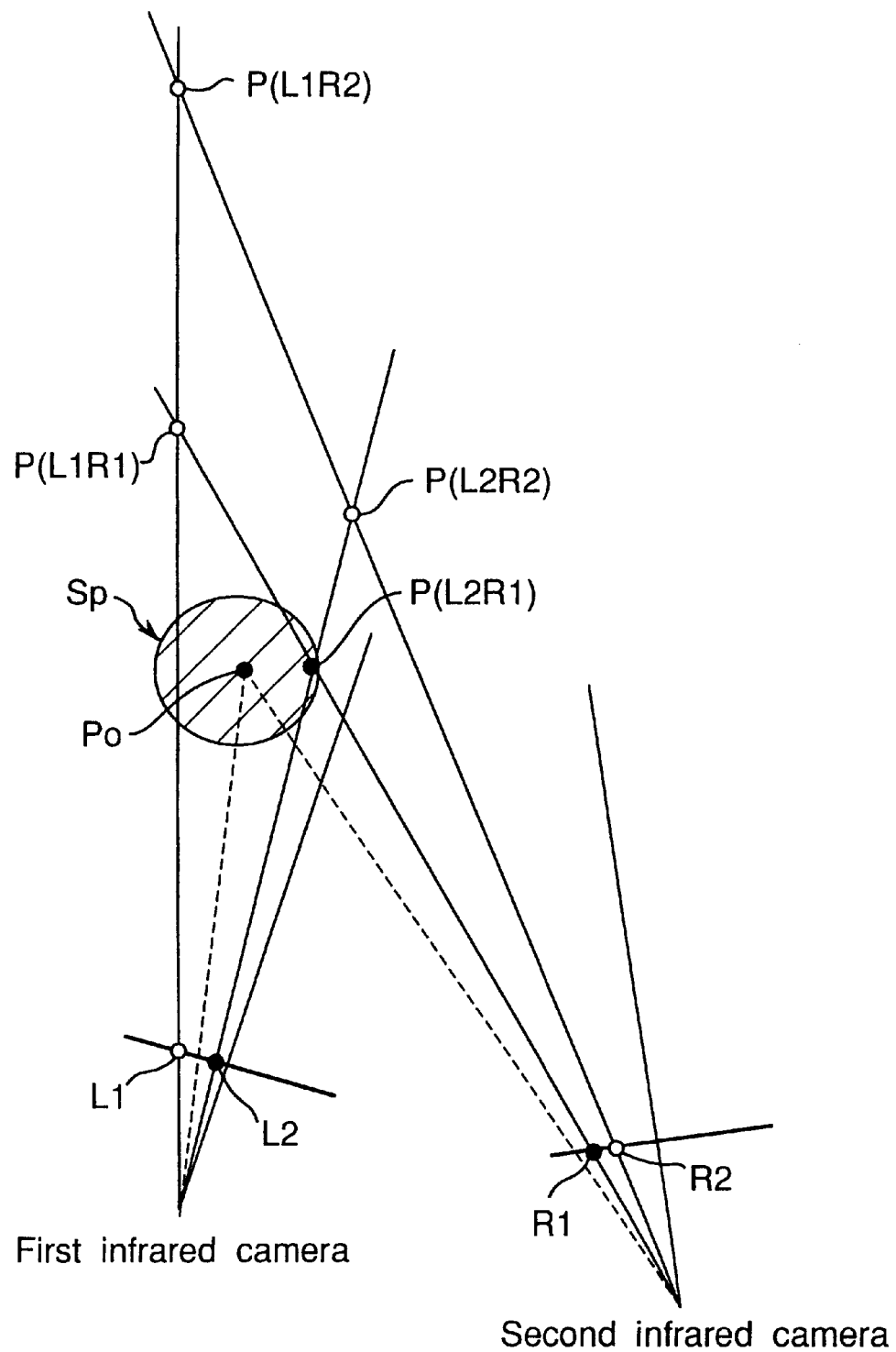
FIG. 44 is an explanatory view of the operation of the above embodiment.

The operation of this automatic tracking lighting equipment will be described with reference to FIGS. 43 and 44.

First, when the start of tracking is instructed by the operating switch (Step 1), it is confirmed whether or not the end of tracking is instructed by the operating switch (Step 2). When the end of tracking is instructed, the tracking ends (Step 3). On the other hand, when the end of tracking is not instructed, it is confirmed whether or not proposed markers are detected by the 1st infrared camera 103A (Step 4). When at least one proposed marker is detected (Step 4:Yes), it is confirmed whether or not proposed markers are detected by the 2nd infrared camera 103B (Step 5). And, when proposed markers are also detected by the 2nd infrared camera 103B (Step 5:Yes), the combination of the highest conforming in position among the coordinates of the proposed markers detected by the 1st and the 2nd infrared cameras 103A and 103B is selected as a selected point (Step 6).

On the other hand, in Step 5, when any proposed markers are not detected by the 2nd infrared camera 103B (Step 5:No), the position coordinates of the proposed objects to be tracked detected by 2nd color camera 104B are calculated (Step 7). And, the comination of the highest conforming in position among the coordinates of the proposed markers detected by the 1st infrared cameras 103A and the coordinates of the proposed objects detected by the 2nd color camera 104B is selected as a selected point (Step 8).

Further, in Step 4, when any proposed markers are not detected by the 1nd infrared camera 103A (Step 4:No), it is confirmed whether or not proposed markers are detected by the 2nd infrared camera 103B (Step 9). When at least one proposed marker is detected by the 2nd infrared camera 103B (Step 9:Yes), the position coordinates of the proposed objects to be tracked detected by 1st color camera 104A are calculated (Step 10). And, the comination of the highest conforming in position among the coordinates of the proposed markers detected by the 2nd infrared cameras 103B and the coordinates of the proposed objects detected by the 1st color camera 104A is selected as a selected point (Step 11) .

On the other hand, in Step 9, when any proposed markers are not detected by the 2nd infrared camera 103B (Step 9:No), the position coordinates of the proposed objects to be tracked detected by the 1st and the 2nd color camera 104A and 104B are calculated (Step 12). And, the comination of the highest conforming in position among the coordinates of the proposed objects detected by the 1st and the 2nd color camera 104A and 104B is selected as a selected point (Step 13).

As mentioned the above, based on the extracted results by the 1st and the 2nd infrared cameras 103A and 103B (Step 6); by the 1st infrared cameras 103A and the 2nd color camera 104B (Step 8); by the 2nd infrared cameras 103B and the 1st color camera 104A (Step 11); and by the 1st and the 2nd color camera 104A and 104B (Step 13); the position of the selected point is detected (Step 14), and its position coordinate is to be determined, by the three-dimentional coordinate calculation unit 112.

The determination of the selected point among the proposed points, explaining for example the determination of the selected point among the proposed markers detected by the 1st and the 2nd infrared cameras 103A and 103B (Step 6), is executesd as follows. The basically same method is used in Step 8, Step 11 and Step 13.

First, the possible moving region Sp (refer to FIG. 44) of the object is determined from the three-dimentional position coordinate Po and moving velocity of the object to be tracked obtained in the proceeding calculation cycle. Assume that the position coordinate on the screen of e.g.two proposed markers extracted by image recognition of the image signal from the 1st infrared camera 103A to be L1 and L2, and that the position coordinate on the screen of e.g.two proposed markers extracted by image recognition of the image signal from the 2nd infrared camera 103B to be R1 and R2. Then, by combining those proposed marker points, 4 caluculated three-dimentional coordinates of P(L1R1), P(L1R2), P(L2R1) and P(L2R2) are obtained. Regarding each three-dimentional position coordinate, it is confirmed whether it exists within the possible moving region Sp or not, further the comformity of the moving direction or the like are taken into consideration, then the most appropriate point is to be selected as a selected point. In the case of the example shown in FIG. 43, since 3 points except for P(L2R1) are out of the possible moving region Sp, the proposed marker point P(L2R1) is selected as the selected point.

As mentioned the above, according to the embodiment, there provided two sets of camera units being constructed by mounting a infrared camera and a color camera to a rotating table. And, by calculating the three-dimensional coordinate of the object to be tracked, the position of the object can be detected with high accuracy, especially, even if any proposed markers can not be detected by a infrared camera, the position of the object to be tracked can be detected with high accuracy.

In the embodiment, the detection of the object to be tracked based on the video signal from the color camera is conducted only when a proposed marker is not detected by the infrared camera, but it does not limit the extent of the n. The detection of the object based on the video signal from the color camera may be conducted independently of the detection of proposed markers based on the infrared camera, and also, the determination of the selected point may be conducted based on the extracted results by the color cameras prior to the extracted results by the infrared cameras.

As described above, the first aspect of the present invention comprises: a lighting means having a directivity; a drive means for changing a lighting direction of the lighting means; an image pickup means for picking up an image in a direction identical to the lighting direction while changing its image pickup direction together with the lighting direction; an image recognizing means for recognizing a target to be lighted from an image from the image pickup means and specifying coordinates of the target to be lighted; a calculating means for calculating a quantity of movement in the lighting direction from a quantity of movement of the target to be lighted in the image recognizing means; and a control means for controlling driving of the drive means based on a result of calculation of the calculating means. Therefore, this arrangement has the effect that it can also cope with a target to be lighted having neither transmitter nor the like. Furthermore, there is no need to provide a receiver or the like on the ceiling surface, and this also produces the effect that the workability can be improved. Furthermore, the lighting direction of the lighting means is visually made to coincide with the coordinates of the target to be lighted of the image recognizing means in the initial setting stage. This arrangement also produces the effect that it obviates the need for inputting the coordinates of the lighting means and the image pickup means, thereby allowing the labor in the working time to be saved. Furthermore, by the method of inputting the coordinates of the lighting means and the image pickup means in the initial setting stage, an error is generated in the lighting direction of the lighting means due to the displacement of the mounting positions of the lighting means and the image pickup means. However, according to the present invention, the lighting direction of the lighting means is visually made to coincide with the coordinates of the target to be lighted of the image recognizing means in the initial setting stage. Therefore, the displacement of the mounting positions in the working time can be absorbed, and this also produces the effect that the lighting means can track the target to be lighted with higher accuracy.

Further, the second aspect of the present invention comprises: a lighting means having a directivity; a drive means for changing a lighting direction of the lighting means; an image pickup means provided in a lighting space so as to be able to pick up an image in the lighting space of the lighting means; an image recognizing means for recognizing a target to be lighted from an image from the image pickup means and specifying coordinates of the target to be lighted; a calculating means for calculating a quantity of movement in the lighting direction from coordinates of the target to be lighted in the image recognizing means and a positional relation between the lighting means and the image pickup means in the lighting space; and a control means for controlling driving of the drive means based on a result of calculation of the calculating means. Therefore, this arrangement also produces the effect that the equipment can also cope with, for example, a lighting fixture of which lighting direction is changed through reflection on a mirror, and it can control a plurality of lighting means. Furthermore, this arrangement also produces the effect that the lighting means can track the target to be lighted with higher accuracy by absorbing the displacement of the mounting positions of the lighting means and the image pickup means similarly to the first aspect of the present invention.

Furthermore, the third aspect of the present invention comprises: a lighting means having a directivity; a first drive means for changing a lighting direction of the lighting means; an image pickup means provided in a lighting space so as to be able to pick up an image in the lighting space of the lighting means; a second drive means for changing an image pickup direction of the image pickup means; a storage means for storing the image pickup direction of the image pickup means; an image recognizing means for recognizing a target to be lighted from an image from the image pickup means and specifying coordinates of the target to be lighted; a second calculating means f or calculating a quantity of movement of the second drive means from a quantity of movement of the target to be lighted in the image recognizing means; a first calculating means for calculating a quantity of movement in the lighting direction of the lighting means from a result of calculation of the second calculating means, a positional relation between the image pickup means and the lighting means in the lighting space and an image pickup direction of the image pickup means stored in the storage means; a first control means for controlling driving of the first drive means based on a result of calculation of the first calculating means; and a second control means for controlling driving of the second drive means based on a result of calculation of the second calculating means. Therefore, this arrangement produces the effect that a lens having not so wide angle can be used for the image pickup means, thereby allowing even the image of a target to be lighted located far away to be clearly picked up and allowing image recognition to be easily executed. Furthermore, this arrangement also produces the effect that the lighting means can track the target to be lighted with higher accuracy by absorbing the displacement of the mounting positions of the lighting means and the image pickup means similarly to the first aspect of the present invention.

Furthermore, the fourth aspect of the present invention comprises a plurality of the image pickup means, whereby the second calculating means calculates three-dimensional coordinates of the target to be lighted in the lighting space from image pickup directions of the plurality of the image pickup means. Therefore, this arrangement produces the effect that the target to be lighted can be correctly captured even when the floor surface of the lighting space has an unevenness.

Also, since the lighting controller of the present invention is constructed as above, according to the fifth aspect of the present invention, the pivoting quantity calculating section calculates the quantity of pivoting of the lighting fixture for floodlighting the designated point from the relative distance between the position on the display image designated by the input device and the position of origin of the display image, and the drive section pivots the lighting fixture based on the quantity of pivoting. Therefore, the operator can determine the target lighting position while viewing the lighting position on the display image even when the operator is not located in the vicinity of the lighting position, and the lighting position can be moved into the target lighting position only by designating once the target lighting position. Therefore, this arrangement produces the effect that a lighting controller which imposes a light burden on the operator can be provided.

Further, according to the sixth aspect of the present invention, the pivoting quantity calculating section calculates the quantity of pivoting around the pan axis of the lighting fixture for floodlighting the designated point from the relative distance in the horizontal direction between the position on the display image designated by the input device and the position of origin of the display image, calculates the quantity of pivoting around the tilt axis of the lighting fixture for floodlighting the designated point from the relative distance in the vertical direction between the position on the display image designated by the input device and the position of origin of the display image, and the drive section pivots the lighting fixture based on the quantities of pivoting. Therefore, the operator can determine the target lighting position while viewing the lighting position on the display image even when the operator is not located in the vicinity of the lighting position, and the lighting position can be moved into the target lighting position only by designating once the target lighting position. Therefore, this arrangement produces the effect that a lighting controller which imposes a light burden on the operator can be provided.

Furthermore, according to the seventh aspect of the present invention, the image pickup means is mounted to the lighting fixture parallel to an optical axis of light radiated from the lighting fixture, and pivots together with the lighting fixture. Therefore, in addition to the effect of the fifth or sixth aspect of the present invention, this arrangement produces the effect that a lighting controller which imposes a light burden on the operator, obviates the need for inputting the mounting positions of the lighting fixture, image pickup means and so forth and requires no substantial labor for the initial setting can be provided.

Furthermore, according to the eighth aspect of the present invention, in addition to the effect of any one of the fifth through seventh aspect of the present invention, the pivoting quantity calculating section multiplies the relative distance between the position on the display image designated by the input device and the position of origin of the display image by a specified constant of proportionality so as to calculate the relative distance between both points on a projection plane formed in the image pickup means, thereby calculating the quantity of pivoting of the image pickup means from the relative distance on the projection plane and the focal distance of the image pickup means, and calculating the quqntity of pivoting of the lighting fixture. Therefore, this arrangement produces the effect that a lighting controller which imposes a light burden on the operator can be provide.

Furthermore, according to the ninth aspect of the present invention, in addition to the effect of the eighth aspect of the present invention, the constant calculating section pivots the lighting fixture by a specified quantity of pivoting and calculates the constant of proportionality from the relative distance between the position of the specified point of the lighting space before pivoting on the display image and the position of the point after pivoting on the display image and the specified quantity of pivoting. Therefore, this arrangement produces the effect that a lighting controller which allows the operator to set the constant of proportionality can be provided.

Furthermore, according to the tenth aspect of the present invention, in addition to the effect of the eighth or ninth aspect of the present invention, the focal distance changing means changes the focal distance of the image pickup means, and a plurality of constants of proportionality are held in correspondence with the focal distance. Therefore, this arrangement produces the effect that a lighting controller which is able to finely designate the target lighting position by picking up the image in a narrow range and displaying it to the full extent of the display image when the focal distance is increased, and is able to allow the operator to designate the target lighting position while viewing the pickup image in a wide range by picking up the image in the wide range and displaying it as the display image when the focal distance is reduced can be provided.

Furthermore, according to the eleventh aspect of the present invention, in addition to the effect of the ninth or tenth aspect of the present invention, the constant calculating section pivots the lighting fixture by a specified quantity of pivoting and requires the operator to input the place where the point on the image, which has been displayed at the origin on the display image before the pivoting, is displayed after the pivoting, and calculates the constant of proportionality from the relative distance between the input position and the origin of the display image and the specified quantity of pivoting. Therefore, this arrangement produces the effect that a lighting controller which allows the constant of proportionality to be easily set and requires no substantial labor for the initial setting can be provided.

Furthermore, according to the twelfth aspect of the present invention, in addition to the effect of the ninth or tenth aspect of the present invention, the image extracting means extracts an image in a specified area including the position of the specified point before the pivoting of the lighting space on the display image from the display image, the searching means searches an area approximate to the image in the specified area extracted from the display image after the pivoting, and the post-pivoting position calculating means calculates the position of the specified point after the pivoting of the lighting space on the display image from the position of the searched area on the display image. Therefore, this arrangement produces the effect that a lighting controller which allows the operator to easily set the constant of proportionality without performing any special operation and requires no substantial labor for the initial setting can be provided.

Also, since the tracking apparatus of the present invention is constructed as above, according to the thirteenth aspect of the present invention comprises: an image pickup means for picking up an image in a specified area; a marker detecting means for detecting a marker attached to an object to be tracked based on a first video signal from the image pickup means; a tracking object setting means for setting a region including the object to be tracked in a second video signal from the image pickup means as a tracking object region; a characteristic value storage means for storing a characteristic value of the tracking object region set by the tracking object setting means; an object extracting means for calculating a similarity with respect to the characteristic value of the object to be tracked stored in the characteristic value storage means from the second video signal from the image pickup means and obtaining a position in which the object to be tracked exists based on a result of calculation; and a position detecting means for detecting the position of the object to be tracked in the video signal inputted successively by using the marker detecting means and/or the object extracting means. With this arrangement, the object to be tracked can be stably tracked even when the shape or color of it is changed in the case where the marker can be detected. In the case where the marker cannot be detected, the object to be tracked is tracked by utilizing the characteristic values of color, shape and the like of the object to be tracked. Therefore, this arrangement produces the effect that the object to be tracked can be surely continuously tracked with high accuracy.

Further, according to the fourteenth aspect of the present invention, based on the thirteenth aspect of the present invention, the marker is provided by an infrared light transmitter, and the infrared light transmitter transmits in synchronization with the video signal. With this arrangement, the marker can be stably extracted without being influenced by the infrared light from other than the infrared light transmitter, and therefore, this arrangement produces the effect that the object to be tracked can be tracked with high accuracy.

Furthermore, according to the fifteenth aspect of the present invention, based on the thirteenth aspect of the present invention, the position detecting means uses the object extracting means when the marker detecting means cannot detect the marker. With this arrangement, the object extraction, which takes much time for processing, is not required to be executed when the marker is detected, and therefore, this arrangement produces the effect that the position of the object to be tracked can be detected at high speed.

Furthermore, according to the sixteenth aspect of the present invention, based on the thirteenth aspect of the present invention, the position detecting means uses the object extracting means when the marker detecting means detects a plurality of proposed markers. With this arrangement, the object extraction, which takes much time for processing, is not required to be executed when only one marker is detected. Therefore, this arrangement produces the effect that the position of the object to be tracked can be detected at high speed, and the tracking reliability can be improved by executing object extraction when a plurality of proposed markers exist.

Furthermore, according to the seventeenth aspect of the present invention, based on the thirteenth aspect of the present invention, the position detecting means obtains the position of the object to be tracked by using the position of a proposed marker detected by the marker detecting means and an output result of the object extracting means. Therefore, this arrangement produces the effect that the tracking reliability can be improved.

Furthermore, according to the eighteenth aspect of the present invention, based on the thirteenth aspect of the present invention, a characteristic value updating means for updating the characteristic value stored in the characteristic value storage means based on the position of the object to be tracked detected by the position detecting means is incorporated. Therefore, this arrangement produces the effect that the tracking reliability can be improved.

Furthermore, according to the nineteenth aspect of the present invention, based on any of the thirteenth through eighteenth aspects of the present invention, an image pickup direction adjusting means for adjusting an image pickup direction of the image pickup means is incorporated, and the image pickup direction of the image pickup direction adjusting means is adjusted based on an output of the position detecting means. Therefore, this arrangement produces the effect that the object to be tracked can be tracked in a wide range.

Furthermore, according to the twentyth aspect of the present invention, based on any of the thirteenth through nineteenth aspects of the present invention, lighting equipment which is installed in a place located apart from the image pickup means, has a directivity and is capable of changing its lighting direction and a lighting control means for controlling the lighting direction of the lighting equipment based on the position of the object to be tracked detected by the position detecting means so that the lighting equipment floodlights the object to be tracked are incorporated. Therefore, this arrangement produces the effect that the object to be tracked can be tracked with high accuracy and the object to be tracked can be surely floodlighted.

What is claimed is:

1. A lighting controller for a system including a lighting fixture for radiating light from a light source, a drive section for pivoting the lighting fixture around a pan axis and about a tilt axis, an image pickup means, pivotable around an axis, for picking up an image in an image pickup region and outputting an image, a display device which displays the image, and an input device for designating a point on the display image displayed on the display device, the lighting controller comprising:

a pivoting quantity calculating section which calculates a first pivoting quantity about the pan axis of the lighting fixture for illuminating the designated point based upon a relative distance in a horizontal direction between the position on the display image designated by the input device and the position of origin of the display image, and which calculates a second pivoting quantity about the tilt axis of the lighting fixture for illuminating the designated point based upon a relative distance in a vertical direction between the position on the display image designated by the input device and the position of origin of the display image, whereby the drive section pivots the lighting fixture based on the first and second pivoting quantities.

2. Automatic tracking lighting equipment comprising:

lighting means for projecting light in a lighting direction;

drive means for changing said lighting direction of said lighting means;

image pickup means provided in a lighting space to pick up an image of a pattern in a lighting space;

image recognizing means for recognizing a target based upon a presence of said pattern in said image of said image pickup means and for specifying coordinates of said target;

calculating means for calculating an amount of movement of said lighting direction based upon coordinates of said target specified by said image recognizing means, and a distance between said lighting means and said image pickup means in said lighting space; and control means for driving said drive means based on a result of said calculating means.

3. Automatic tracking lighting equipment comprising:

lighting means for projecting light in a lighting direction;

first drive means for changing said lighting direction of said lighting means;

image pickup means provided in a lighting space for picking up an image in said lighting space;

second drive means for changing an image pickup direction of said image pickup means;

storage means for storing the image pickup direction of said image pickup means;

image recognizing means for recognizing a target based upon an image picked up by said image pickup means and for specifying coordinates of said target;

second calculating means for calculating an amount of movement of said second drive means based on a distance of said target recognized by said image recognizing means;

first calculating means for calculating an amount of movement of the lighting direction of said lighting means based upon an output of said second calculating means, a positional relation between said image pickup means and said lighting means, and an image pickup direction of said image pickup means stored in said storage means;

first control means for controlling said first drive means based on an output of said first calculating means; and second control means for controlling said second drive means based on an output of said second calculating means.

4. Automatic tracking lighting equipment as claimed in claim 3, further comprising a plurality of image pickup means, whereby said second calculating means calculates three-dimensional coordinates of said target in said lighting space from image pickup directions of each of the plurality of said image pickup means.

5. A lighting controller for a system including a lighting fixture for radiating light from a light source; a drive section for pivoting the lighting fixture about an axis; image pickup means pivotable about an axis, for picking up an image in an image pickup region and outputting an image; a display device which displays the image; an input device for designating a point on the image as displayed on the display device, the lighting controller comprising a pivoting quantity calculating section which calculates a quantity of pivoting of the lighting fixture for illuminating the designated point based upon a relative distance between the point on the display image designated by the input device and the position of origin of the display image, whereby the drive section pivots the lighting fixture based on the quantity of pivoting.

6. A lighting controller as claimed in claim 5, wherein said image pickup means is mounted to the lighting fixture parallel to an optical axis of light radiated from the lighting fixture, and pivots together with the lighting fixture.

7. A lighting controller according to claim 5, wherein said pivoting quantity calculating section multiplies the relative distance between the point of the display image designated by the input device and the position of origin of the display image by a specified constant of proportionality to calculate a relative distance between both points in a projection plane formed in the image pickup means, thereby calculating a quantity of pivoting of the image pickup means from the relative distance in the projection plane and a focal distance of the image pickup means, and calculating a quantity of pivoting of the lighting fixture.

8. A lighting controller as claimed in claim 7, further comprising a focal distance changing means for changing the focal distance of said image pickup means, and a plurality of constants of proportionality correspond with the focal distance to be changed.

9. A lighting controller as claimed in claim 7, further comprising a constant calculating section for calculating said constant of proportionality by pivoting the image pickup means by a specified quantity based on a relative distance between the position of a specified point of the lighting space before pivoting on the display image and the position of the specified point after pivoting on the display image and said specified pivoting quantity.

10. A lighting controller as claimed in claim 9, further comprising image extracting means for extracting an image in a specified area, including the position of the specified point before the pivoting of the lighting space on the display image, from the display image; a searching means for searching an area approximate to the image in said specified area extracted from the display image after pivoting; and a post-pivoting position calculating means for calculating the position of the specified point after the pivoting of the lighting space on the display image based upon the position of the searched area on the display image.

11. A lighting controller as claimed in claim 9, wherein the position of the specified point after the pivoting of said lighting space on the display image is input by an operator using the input device.

12. A tracking apparatus comprising:
image pickup means for picking up an image in a specified area;
marker detecting means for detecting a marker attached to an object to be tracked based on a first video signal from said image pickup means;
tracking object setting means for setting a tracking object region including the object to be tracked in a second video signal from said image pickup means;
characteristic value storage means for storing a characteristic value of the tracking object region set by said tracking object setting means;
object extracting means for calculating a degree of respect to the characteristic value of the object to be tracked stored in said characteristic value storage means from the second video signal from said image pickup means and obtaining a position of the object to be tracked based on a result of calculation; and
position detecting means for detecting the position of the object to be tracked in the video signal input successively by using at least one of said market detecting means and said object extracting means.

13. A tracking apparatus as claimed in claim 12, wherein the position detecting means uses the object extracting means when the marker detecting means cannot detect the marker.

14. A tracking apparatus as claimed in claim 13, further comprising image pickup direction adjusting means for adjusting an image pickup direction of the image pickup means based on an output of the position detecting means.

15. A tracking apparatus as claimed in claim 13, further comprising lighting equipment spaced from the image pickup means, and is capable of changing its lighting direction; and lighting control means for controlling the lighting direction of the lighting equipment based on the position of the object to be tracked detected by the position detecting means so that the lighting equipment illuminates the object to be tracked.

16. A tracking apparatus as claimed in claim 12, wherein the marker comprises an infrared light transmitter, which transmits in synchronization with the video signal.

17. A tracking apparatus as claimed in claim 16, further comprising image pickup direction adjusting means for adjusting an image pickup direction of the image pickup means based on an output of the position detecting means.

18. A tracking apparatus as claimed in claim 16, further comprising lighting equipment spaced from the image pickup means, direction; and lighting control means for controlling the lighting direction of the lighting equipment based on the position of the object to be tracked detected by the position detecting means so that the lighting equipment illuminates the object to be tracked.

19. A tracking apparatus as claimed in claim 12, further comprising image pickup direction adjusting means for adjusting an image pickup direction of the image pickup means based on an output of the position detecting means.

20. A tracking apparatus as claimed in claim 12, further comprising:
lighting equipment spaced from the image pickup means, and capable of changing its lighting direction; and
lighting control means for controlling the lighting direction of the lighting equipment based on the position of the object to be tracked detected by the position detecting means so that the lighting equipment illuminates the object to be tracked.

21. A tracking apparatus as claimed in claim 12, wherein the position detecting means uses the object extracting means when the marker detecting means detects a plurality of proposed markers.

22. A tracking apparatus as claimed in claim 21, further comprising lighting equipment spaced from the image pickup means, and is capable of changing its lighting direction; and lighting control means for controlling the lighting direction of the lighting equipment based on the position of the object to be tracked detected by the position detecting means so that the lighting equipment illuminates the object to be tracked.

23. A tracking apparatus as claimed in claim 21, further comprising image pickup direction adjusting means for adjusting an image pickup direction of the image pickup means based on an output of the position detecting means.

24. A tracking apparatus as claimed in claim 12, wherein the position detecting means obtains the position of the object to be tracked by using the position of a proposed marker detected by the marker detecting means and an output of the object extracting means.

25. A tracking apparatus as claimed in claim 24, further comprising lighting equipment spaced from the image pickup means, and is capable of changing its lighting direction; and lighting control means for controlling the lighting direction of the lighting equipment based on the position of the object to be tracked detected by the position detecting means so that the lighting equipment illuminates the object to be tracked.

26. A tracking apparatus as claimed in claim 24, further comprising image pickup direction adjusting means for adjusting an image pickup direction of the image pickup means based on an output of the position detecting means.

27. A tracking apparatus as claimed in claim 12, further comprising a characteristic value updating means for updating the characteristic value stored in the characteristic value storage means based on the position of the object to be tracked detected by the position detecting means.

28. A tracking apparatus as claimed in claim 27, further comprising lighting equipment spaced from the image pickup means, and is capable of changing its lighting direction; and lighting control means for controlling the lighting direction of the lighting equipment based on the position of the object to be tracked detected by the position detecting means so that the lighting equipment illuminates the object to be tracked.

29. A tracking apparatus as claimed in claim 27, further comprising image pickup direction adjusting means for adjusting an image pickup direction of the image pickup means based on an output of the position detecting means.

* * * * *

UNITED STATES PATENT AND TRADEMARK OFFICE
CERTIFICATE OF CORRECTION

PATENT NO.    : 6,079,862
DATED         : June 27, 2000
INVENTOR(S)   : T. Kawashima et al.

It is certified that error appears in the above-identified patent and that said Letters Patent is hereby corrected as shown below:

Title page,
Item [30], Foreign Application Priority Data, delete "Feb. 22, 1996 [JP] Japan 8-034770".

Column 44,
Line 34, after "means" insert -- and is capable of changing its lighting --.

Signed and Sealed this

Twenty-fifth Day of June, 2002

*Attest:*

JAMES E. ROGAN
*Attesting Officer*   *Director of the United States Patent and Trademark Office*